United States Patent
Yedid et al.

(10) Patent No.: US 12,520,025 B2
(45) Date of Patent: Jan. 6, 2026

(54) POP-OUT MOBILE CAMERAS AND ACTUATORS

(71) Applicant: Corephotonics Ltd., Tel Aviv (IL)

(72) Inventors: Itay Yedid, Tel Aviv (IL); Ephraim Goldenberg, Tel Aviv (IL); Yiftah Kowal, Tel Aviv (IL); Kobi Goldstein, Tel Aviv (IL); Daniel Boltinsky, Tel Aviv (IL); Dana Deutsch, Tel Aviv (IL); Oriel Grushka, Tel Aviv (IL); Itay Manor, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 18/254,867

(22) PCT Filed: Jul. 19, 2022

(86) PCT No.: PCT/IB2022/056646
§ 371 (c)(1),
(2) Date: May 29, 2023

(87) PCT Pub. No.: WO2023/002371
PCT Pub. Date: Jan. 26, 2023

(65) Prior Publication Data
US 2024/0040226 A1 Feb. 1, 2024

Related U.S. Application Data

(60) Provisional application No. 63/298,335, filed on Jan. 11, 2022, provisional application No. 63/293,274, (Continued)

(51) Int. Cl.
*H04N 23/57* (2023.01)
*F03G 7/06* (2006.01)

(52) U.S. Cl.
CPC .......... *H04N 23/57* (2023.01); *F03G 7/0614* (2021.08)

(58) Field of Classification Search
CPC ........ H04N 23/54; H04N 23/55; H04N 23/57; H04N 2205/0076; F03G 7/0614–06147
(Continued)

(56) References Cited

U.S. PATENT DOCUMENTS 3,085,354 A 4/1963 Rasmussen et al.
3,584,513 A 6/1971 Gates
(Continued)

FOREIGN PATENT DOCUMENTS

CN 101276415 A 10/2008
CN 201514511 U 6/2010
(Continued)

OTHER PUBLICATIONS

International Search Report and Written Opinion in related PCT application PCT/IB2022/056646, dated Oct. 28, 2022.
(Continued)

*Primary Examiner* — Anthony J Daniels
(74) *Attorney, Agent, or Firm* — Nathan & Associates; Menachem Nathan

(57) ABSTRACT

Pop-out cameras brought to at least an extended operational position and a collapsed position by pop-out mechanisms that include shape-memory alloy (SMA) materials. A camera may comprise a lens including a plurality of lens elements, an image sensor, and a pop-out mechanism configured to control at least one air-gap between the lens elements or between a lens element and the image sensor to bring the camera to an operative pop-out state and to a collapsed state, wherein the pop-out mechanism includes at least one component made from a SMA material.

16 Claims, 47 Drawing Sheets

Related U.S. Application Data filed on Dec. 23, 2021, provisional application No. 63/276,072, filed on Nov. 5, 2021, provisional application No. 63/243,256, filed on Sep. 13, 2021, provisional application No. 63/224,131, filed on Jul. 21, 2021.

(58) Field of Classification Search
USPC .................................................. 348/207.99
See application file for complete search history.

(56) References Cited

U.S. PATENT DOCUMENTS

| | | |
|---|---|---|
| 3,941,001 A | 3/1976 | LaSarge |
| 4,199,785 A | 4/1980 | Mccullough et al. |
| 4,792,822 A | 12/1988 | Akiyama et al. |
| 5,005,083 A | 4/1991 | Grage et al. |
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,331,465 A | 7/1994 | Miyano |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,502,537 A | 3/1996 | Utagawa |
| 5,657,402 A | 8/1997 | Bender et al. |
| 5,682,198 A | 10/1997 | Katayama et al. |
| 5,768,443 A | 6/1998 | Michael et al. |
| 5,892,855 A | 4/1999 | Kakinami et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,201,533 B1 | 3/2001 | Rosenberg et al. |
| 6,208,765 B1 | 3/2001 | Bergen |
| 6,211,668 B1 | 4/2001 | Duesler et al. |
| 6,215,299 B1 | 4/2001 | Reynolds et al. |
| 6,222,359 B1 | 4/2001 | Duesler et al. |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,350,959 B2 | 1/2013 | Topliss et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,441,749 B2 | 5/2013 | Brown et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,752,969 B1 | 6/2014 | Kane et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 10,063,752 B2 | 8/2018 | Topliss et al. |
| 10,920,755 B2* | 2/2021 | Miller .................. G02B 27/646 |
| 11,073,675 B2 | 7/2021 | Köpfer |
| 2002/0005902 A1 | 1/2002 | Yuen |
| 2002/0030163 A1 | 3/2002 | Zhang |
| 2002/0054214 A1 | 5/2002 | Yoshikawa |
| 2002/0063711 A1 | 5/2002 | Park et al. |
| 2002/0075258 A1 | 6/2002 | Park et al. |
| 2002/0122113 A1 | 9/2002 | Foote |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0156751 A1 | 8/2003 | Lee et al. |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0169772 A1* | 9/2004 | Matsui .................. H04N 23/55 |
| | | 348/E5.025 |

(56) References Cited

U.S. PATENT DOCUMENTS

| | | |
|---|---|---|
| 2004/0239313 A1 | 12/2004 | Godkin |
| 2004/0240052 A1 | 12/2004 | Minefuji et al. |
| 2005/0013509 A1 | 1/2005 | Samadani |
| 2005/0046740 A1 | 3/2005 | Davis |
| 2005/0134697 A1 | 6/2005 | Mikkonen et al. |
| 2005/0141390 A1 | 6/2005 | Lee et al. |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2005/0248667 A1 | 11/2005 | Schweng et al. |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0126737 A1 | 6/2006 | Boice et al. |
| 2006/0170793 A1 | 8/2006 | Pasquarette et al. |
| 2006/0175549 A1 | 8/2006 | Miller et al. |
| 2006/0181619 A1 | 8/2006 | Liow et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0058070 A1 | 3/2007 | Chen |
| 2007/0126911 A1 | 6/2007 | Nanjo |
| 2007/0127040 A1 | 6/2007 | Davidovici |
| 2007/0159344 A1 | 7/2007 | Kisacanin |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0088942 A1 | 4/2008 | Seo |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0102948 A1 | 4/2009 | Scherling |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0168135 A1 | 7/2009 | Yu et al. |
| 2009/0200451 A1 | 8/2009 | Conners |
| 2009/0219547 A1 | 9/2009 | Kauhanen et al. |
| 2009/0234542 A1 | 9/2009 | Orlewski |
| 2009/0252484 A1 | 10/2009 | Hasuda et al. |
| 2009/0295949 A1 | 12/2009 | Ojala |
| 2009/0295986 A1 | 12/2009 | Topliss et al. |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0134621 A1 | 6/2010 | Namkoong et al. |
| 2010/0165131 A1 | 7/2010 | Makimoto et al. |
| 2010/0196001 A1 | 8/2010 | Ryynänen et al. |
| 2010/0202068 A1 | 8/2010 | Ito |
| 2010/0238327 A1 | 9/2010 | Griffith et al. |
| 2010/0246024 A1 | 9/2010 | Aoki et al. |
| 2010/0259836 A1 | 10/2010 | Kang et al. |
| 2010/0265331 A1 | 10/2010 | Tanaka |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0121666 A1 | 5/2011 | Park et al. |
| 2011/0128288 A1 | 6/2011 | Petrou et al. |
| 2011/0164172 A1 | 7/2011 | Shintani et al. |
| 2011/0217031 A1 | 9/2011 | Eromäki |
| 2011/0221599 A1 | 9/2011 | Högasten |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0285714 A1 | 11/2011 | Swic et al. |
| 2011/0298966 A1 | 12/2011 | Kirschstein et al. |
| 2012/0014682 A1 | 1/2012 | David et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0148215 A1 | 6/2013 | Mori et al. |
| 2013/0148854 A1 | 6/2013 | Wang et al. |
| 2013/0155176 A1 | 6/2013 | Paripally et al. |
| 2013/0163085 A1 | 6/2013 | Lim et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0222685 A1 | 8/2013 | Topliss et al. |
| 2013/0229544 A1 | 9/2013 | Bando |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0258048 A1 | 10/2013 | Wang et al. |
| 2013/0270419 A1 | 10/2013 | Singh et al. |
| 2013/0278785 A1 | 10/2013 | Nomura et al. |
| 2013/0286221 A1 | 10/2013 | Shechtman et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0160311 A1 | 6/2014 | Hwang et al. |
| 2014/0192224 A1 | 7/2014 | Laroia |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2014/0376090 A1 | 12/2014 | Terajima |
| 2014/0379103 A1 | 12/2014 | Ishikawa et al. |
| 2015/0002683 A1 | 1/2015 | Hu et al. |
| 2015/0002684 A1 | 1/2015 | Kuchiki |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0103147 A1 | 4/2015 | Ho et al. |
| 2015/0110345 A1 | 4/2015 | Weichselbaum |

(56) References Cited

U.S. PATENT DOCUMENTS

| | | |
|---|---|---|
| 2015/0124059 A1 | 5/2015 | Georgiev et al. |
| 2015/0138381 A1 | 5/2015 | Ahn |
| 2015/0145965 A1 | 5/2015 | Livyatan et al. |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0198464 A1 | 7/2015 | El Alami |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0296112 A1 | 10/2015 | Park et al. |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154066 A1 | 6/2016 | Hioka et al. |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0238834 A1 | 8/2016 | Erlich et al. |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0301868 A1 | 10/2016 | Acharya et al. |
| 2016/0342095 A1 | 11/2016 | Bieling et al. |
| 2016/0353008 A1 | 12/2016 | Osborne |
| 2016/0353012 A1 | 12/2016 | Kao et al. |
| 2016/0381289 A1 | 12/2016 | Kim et al. |
| 2017/0001577 A1 | 1/2017 | Seagraves et al. |
| 2017/0019616 A1 | 1/2017 | Zhu et al. |
| 2017/0070731 A1 | 3/2017 | Darling et al. |
| 2017/0094187 A1 | 3/2017 | Sharma et al. |
| 2017/0124987 A1 | 5/2017 | Kim et al. |
| 2017/0150061 A1 | 5/2017 | Shabtay et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0219749 A1 | 8/2017 | Hou et al. |
| 2017/0230552 A1* | 8/2017 | Eromäki ............... H02N 2/02 |
| 2017/0242225 A1 | 8/2017 | Fiske |
| 2017/0276954 A1 | 9/2017 | Bajorins et al. |
| 2017/0289458 A1 | 10/2017 | Song et al. |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0109660 A1 | 4/2018 | Yoon et al. |
| 2018/0109710 A1 | 4/2018 | Lee et al. |
| 2018/0115688 A1 | 4/2018 | Lin |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0184010 A1 | 6/2018 | Cohen et al. |
| 2018/0198897 A1 | 7/2018 | Tang et al. |
| 2018/0241922 A1 | 8/2018 | Baldwin et al. |
| 2018/0295292 A1 | 10/2018 | Lee et al. |
| 2018/0300901 A1 | 10/2018 | Wakai et al. |
| 2018/0329281 A1 | 11/2018 | Ye |
| 2018/0368656 A1 | 12/2018 | Austin et al. |
| 2019/0100156 A1 | 4/2019 | Chung et al. |
| 2019/0121103 A1 | 4/2019 | Bachar et al. |
| 2019/0121216 A1 | 4/2019 | Shabtay et al. |
| 2019/0130822 A1 | 5/2019 | Jung et al. |
| 2019/0213712 A1 | 7/2019 | Lashdan et al. |
| 2019/0215440 A1 | 7/2019 | Rivard et al. |
| 2019/0222758 A1 | 7/2019 | Goldenberg et al. |
| 2019/0228562 A1 | 7/2019 | Song |
| 2019/0297238 A1 | 9/2019 | Klosterman |
| 2020/0103726 A1 | 4/2020 | Shabtay et al. |
| 2020/0104034 A1 | 4/2020 | Lee et al. |
| 2020/0134848 A1 | 4/2020 | El-Khamy et al. |
| 2020/0221026 A1 | 7/2020 | Fridman et al. |
| 2020/0264403 A1 | 8/2020 | Bachar et al. |
| 2020/0314224 A1* | 10/2020 | Yang .................... H04N 23/57 |
| 2020/0386968 A1* | 12/2020 | Uno ....................... G03B 5/02 |
| 2020/0389580 A1 | 12/2020 | Kodama et al. |
| 2021/0180989 A1 | 6/2021 | Fukumura et al. |
| 2021/0333521 A9 | 10/2021 | Yedid et al. |
| 2021/0352197 A1* | 11/2021 | Qu ........................ H04M 1/0264 |
| 2022/0004085 A1 | 1/2022 | Shabtay et al. |
| 2022/0008701 A1* | 1/2022 | Langer .................. A61M 37/00 |
| 2022/0252963 A1 | 8/2022 | Shabtay et al. |
| 2022/0368814 A1 | 11/2022 | Topliss et al. |
| 2022/0412325 A1* | 12/2022 | Köpfer ................. F03G 7/06143 |
| 2023/0022701 A1 | 1/2023 | Li et al. |

FOREIGN PATENT DOCUMENTS

| | | | |
|---|---|---|---|
| CN | 102215373 A | 10/2011 | |
| CN | 102739949 A | 10/2012 | |
| CN | 102982518 A | 3/2013 | |
| CN | 103024272 A | 4/2013 | |
| CN | 203406908 U | 1/2014 | |
| CN | 103841404 A | 6/2014 | |
| CN | 205301703 U | 6/2016 | |
| CN | 105827903 A | 8/2016 | |
| CN | 105847662 A | 8/2016 | |
| CN | 107608052 A | 1/2018 | |
| CN | 107682489 A | 2/2018 | |
| CN | 109729266 A | 5/2019 | |
| CN | 212004937 U * | 11/2020 | ............ F16M 11/06 |
| EP | 1536633 A1 | 6/2005 | |
| EP | 1780567 A1 | 5/2007 | |
| EP | 2523450 A1 | 11/2012 | |
| JP | S59191146 A | 10/1984 | |
| JP | 04211230 A | 8/1992 | |
| JP | H07318864 A | 12/1995 | |
| JP | 08271976 A | 10/1996 | |
| JP | 2002010276 A | 1/2002 | |
| JP | 2003186089 A * | 7/2003 | |
| JP | 2003298920 A | 10/2003 | |
| JP | 2003304024 A | 10/2003 | |
| JP | 2004056779 A | 2/2004 | |
| JP | 2004133054 A | 4/2004 | |
| JP | 2004245982 A | 9/2004 | |
| JP | 2005099265 A | 4/2005 | |
| JP | 2005122084 A | 5/2005 | |
| JP | 2005321592 A | 11/2005 | |
| JP | 2006038891 A | 2/2006 | |
| JP | 2006237914 A | 9/2006 | |
| JP | 2006238325 A | 9/2006 | |
| JP | 2008083377 A | 9/2006 | |
| JP | 2007228006 A | 9/2007 | |
| JP | 2007306282 A | 11/2007 | |
| JP | 2008076485 A | 4/2008 | |
| JP | 2008185618 A | 8/2008 | |
| JP | 2008245142 A | 10/2008 | |
| JP | 2008271026 A | 11/2008 | |
| JP | 2010204341 A | 9/2010 | |
| JP | 2011055246 A | 3/2011 | |
| JP | 2011085666 A | 4/2011 | |
| JP | 2011138407 A | 7/2011 | |
| JP | 2011203283 A | 10/2011 | |
| JP | 2012132739 A | 7/2012 | |
| JP | 2013101213 A | 5/2013 | |
| JP | 2013106289 A | 5/2013 | |
| JP | 2016105577 A | 6/2016 | |
| JP | 2017146440 A | 8/2017 | |
| KR | 200330380 Y1 * | 10/2003 | |
| KR | 20070005946 A | 1/2007 | |
| KR | 20090058229 A | 6/2009 | |
| KR | 20100008936 A | 1/2010 | |
| KR | 20110080590 A | 7/2011 | |
| KR | 20130104764 A | 9/2013 | |
| KR | 1020130135805 A | 11/2013 | |

(56) References Cited

FOREIGN PATENT DOCUMENTS

| KR | 20140014787 A | 2/2014 | |
|---|---|---|---|
| KR | 101428042 B1 | 8/2014 | |
| KR | 101477178 B1 | 12/2014 | |
| KR | 20140144126 A | 12/2014 | |
| KR | 20150118012 A | 10/2015 | |
| KR | 20170105236 A | 9/2017 | |
| KR | 20180120894 A | 11/2018 | |
| KR | 20130085116 A | 6/2019 | |
| WO | 2000027131 A2 | 5/2000 | |
| WO | 2004084542 A1 | 9/2004 | |
| WO | 2006008805 A1 | 1/2006 | |
| WO | 2010122841 A1 | 10/2010 | |
| WO | 2014072818 A2 | 5/2014 | |
| WO | 2017025822 A1 | 2/2017 | |
| WO | 2017037688 A1 | 3/2017 | |
| WO | 2018130898 A1 | 7/2018 | |
| WO | WO-2020192517 A1 * | 10/2020 | |
| WO | WO-2021023221 A1 * | 2/2021 | ........... G02B 13/001 |

OTHER PUBLICATIONS

Office Action in related KR patent application 2023-7005353, dated Jul. 18, 2023.

Statistical Modeling and Performance Characterization of a Real-Time Dual Camera Surveillance System, Greienhagen et al., Publisher: IEEE, 2000, 8 pages.

A 3MPixel Multi-Aperture Image Sensor with 0.7 μm Pixels in 0.11 μm CMOS, Fife et al., Stanford University, 2008, 3 pages.

Dual camera intelligent sensor for high definition 360 degrees surveillance, Scotti et al., Publisher: IET, May 9, 2000, 8 pages.

Dual-sensor foveated imaging system, Hua et al., Publisher: Optical Society of America, Jan. 14, 2008, 11 pages.

Defocus Video Matting, McGuire et al., Publisher: ACM SIGGRAPH, Jul. 31, 2005, 11 pages.

Compact multi-aperture imaging with high angular resolution, Santacana et al., Publisher: Optical Society of America, 2015, 10 pages.

Multi-Aperture Photography, Green et al., Publisher: Mitsubishi Electric Research Laboratories, Inc., Jul. 2007, 10 pages.

Multispectral Bilateral Video Fusion, Bennett et al., Publisher: IEEE, May 2007, 10 pages.

Super-resolution imaging using a camera array, Santacana et al., Publisher: Optical Society of America, 2014, 6 pages.

Optical Splitting Trees for High-Precision Monocular Imaging, McGuire et al., Publisher: IEEE, 2007, 11 pages.

High Performance Imaging Using Large Camera Arrays, Wilburn et al., Publisher: Association for Computing Machinery, Inc., 2005, 12 pages.

Real-time Edge-Aware Image Processing with the Bilateral Grid, Chen et al., Publisher: ACM SIGGRAPH, 2007, 9 pages.

Superimposed multi-resolution imaging, Carles et al., Publisher: Optical Society of America, 2017, 13 pages.

Viewfinder Alignment, Adams et al., Publisher: EUROGRAPHICS, 2008, 10 pages.

Dual-Camera System for Multi-Level Activity Recognition, Bodor et al., Publisher: IEEE, Oct. 2014, 6 pages.

Engineered to the task: Why camera-phone cameras are different, Giles Humpston, Publisher: Solid State Technology, Jun. 2009, 3 pages.

ESR in related EP patent application 22845535.8, dated Jun. 7, 2024.

Office Action in related TW patent application 113122927, dated Feb. 3, 2025.

* cited by examiner

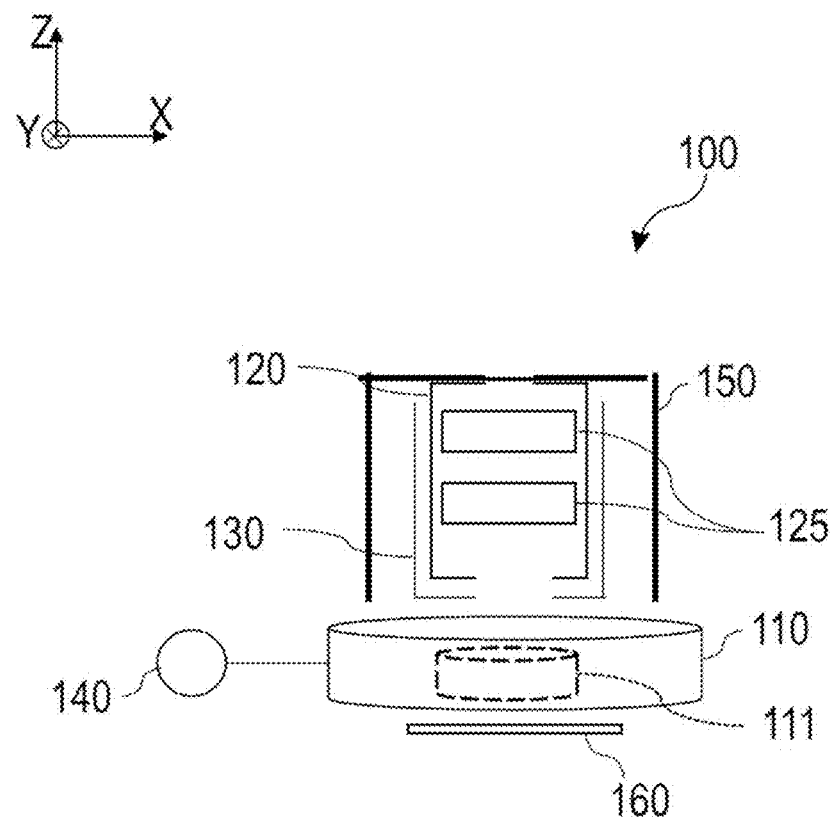
FIG. 1A  KNOWN ART
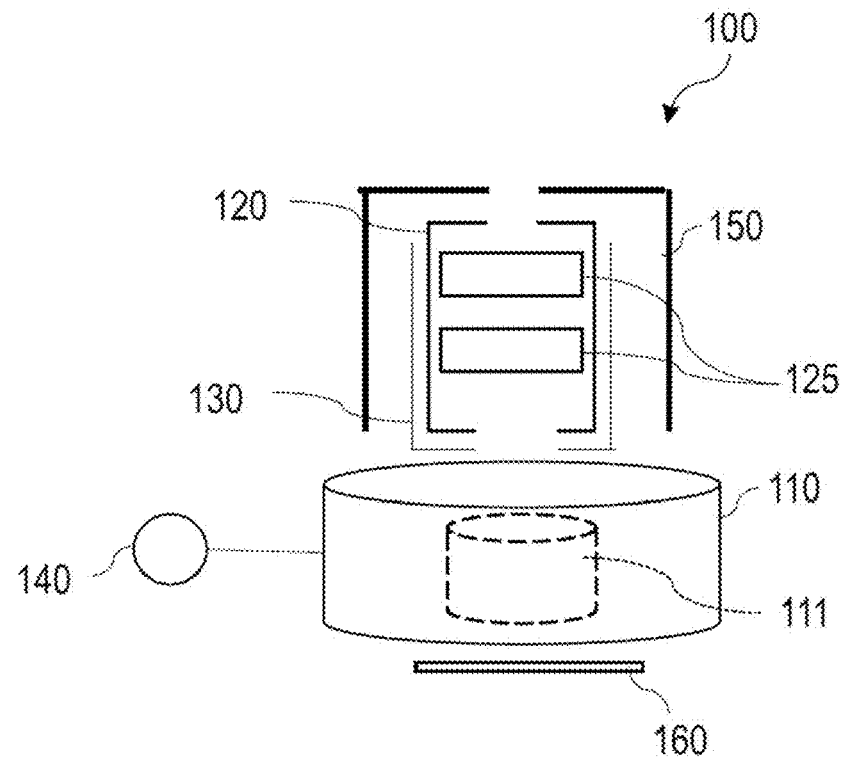
FIG. 1B  KNOWN ART

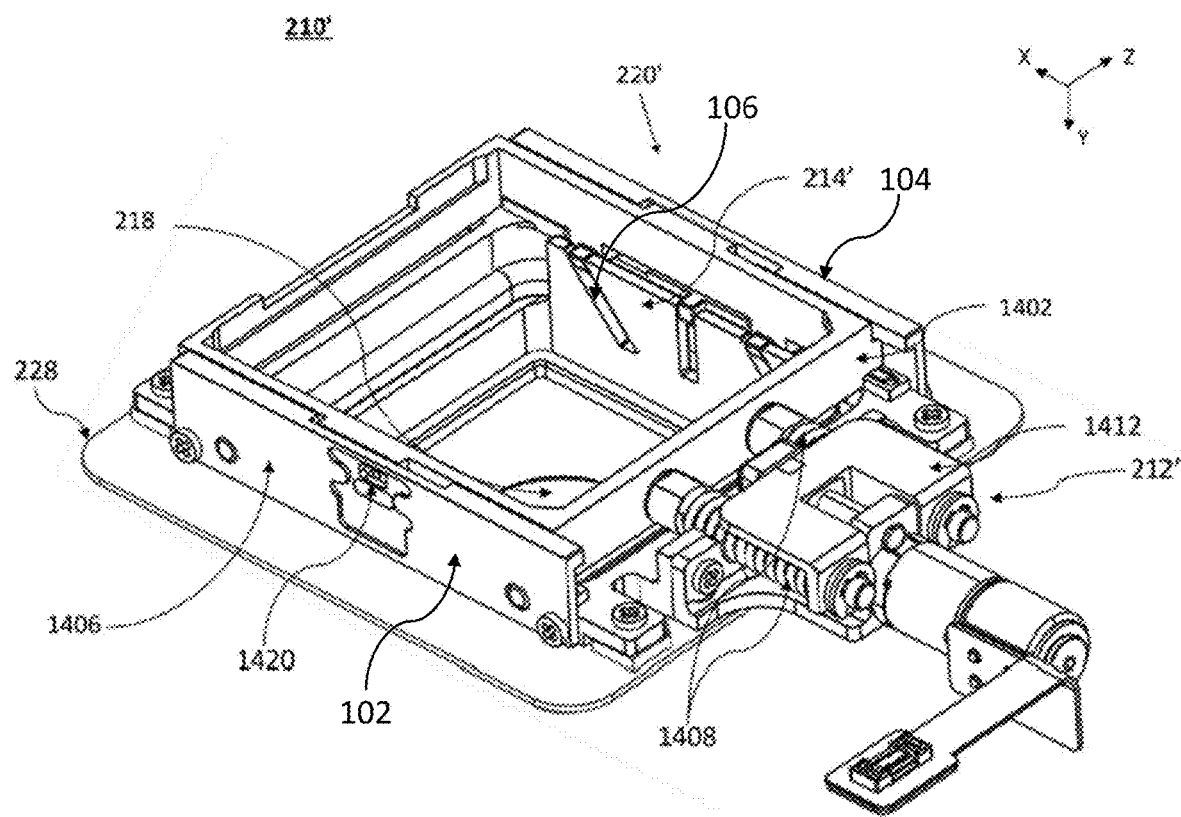
FIG. 1C  KNOWN ART

POP-OUT MOBILE CAMERAS AND ACTUATORS

CROSS REFERENCE TO RELATED APPLICATIONS

This is a 371 application from international patent application PCT/IB2022/056646 filed Jul. 19, 2022, which claims the benefit of priority from U.S. provisional patent applications No. 63/224,131 filed Jul. 21, 2021, 63/243,256 filed Sep. 13, 2021, 63/276,072 filed Nov. 5, 2021, 63/293,274 filed Dec. 23, 2021, and 63/298,335 filed Jan. 11, 2022, all of which are incorporated herein by reference in their entirety.

FIELD

The presently disclosed subject matter is generally related to the field of digital cameras and in particular to pop-out compact multi-aperture cameras including shape memory alloy (SMA) actuators.

Definitions

In this application and for optical and other properties mentioned throughout the description and figures, the following symbols and abbreviations are used, all for terms known in the art:
- Total track length (TTL): the maximal distance, measured along an axis parallel to the optical axis of a lens, between a point of the front surface S1 of a first lens element L1 and an image sensor, when the system is focused to an infinity object distance.
- Back focal length (BFL): the minimal distance, measured along an axis parallel to the optical axis of a lens, between a point of the rear surface S2N of a last lens element LN and an image sensor, when the system is focused to an infinity object distance.
- Effective focal length (EFL): in a lens (assembly of lens elements L1 to LN), the distance between a rear principal point P' and a rear focal point F' of the lens.
- f-number, (f/#): the ratio of the EFL to an entrance pupil diameter.

BACKGROUND

Compact multi-cameras as well their incorporation in mobile electronic devices (also referred to herein as "host devices") such as tablets and mobile phones (the latter referred to hereinafter generically as "smartphones") are known. A typical multi-camera system includes an ultra-wide-angle (or "Ultra-Wide" or "UW") camera, a wide-angle (or "Wide" or "W") camera and a telephoto (or "Tele" or "T") camera, wherein their fields of view (FOVs) fulfill $FOV_{UW} > FOV_W > FOV_T$.

In a continuous attempt to improve the obtained image quality, there is a need to incorporate larger image sensors into multi-cameras. Larger sensors allow for improved low-light performance and larger number of pixels, hence improving spatial resolution as well. Other image quality characteristics, such as noise characteristics, dynamic range and color fidelity may also improve as the sensor size increases. To provide large zoom factors in Tele cameras, there is a need to incorporate lenses having a large EFL. Both the incorporation of large image sensors and the realization of large EFLs require lenses with a large TTL. A large TTL is undesired in terms of a host device's industrial design, as it increases the host device's thickness.

Pop-out cameras allow for incorporating large sensors and/or realizing large zoom factors without increasing a host device's thickness. They combine the advantages of providing a large TTL when the camera is in use ("pop-out state"), and a slim design by collapsing the TTL to a collapsed TTL ("c-TTL") when the camera is not in use ("collapsed state"). Pop-out cameras are described for example in co-owned international patent applications PCT/IB2020/058697 and PCT/IB2022/052194.

SUMMARY

In various embodiments or examples, there are provided cameras, comprising: a lens including a plurality of lens elements separated by air-gaps therebetween; an image sensor; a pop-out mechanism configured to control at least one air-gap between the lens elements or between a lens element and the image sensor, to bring the camera to an operative pop-out state and to a collapsed state; and a SMA actuator that includes at least two antagonistic SMA wires and a lever, wherein the SMA actuator is configured to move the pop-out mechanism to bring the camera to the operative pop-out state and to the collapsed state using the at least two antagonistic SMA wires and the lever.

In various embodiments or examples, there are provided cameras, comprising: a lens including a plurality of lens elements; an image sensor; a pop-out mechanism configured to control at least one air-gap between the lens elements or between a lens element and the image sensor to bring the camera to an operative pop-out state and to a collapsed state; and a SMA actuator that includes two, first and second antagonistic groups, wherein at least one of the two antagonistic groups includes at least one SMA component made from a SMA material, and wherein the SMA actuator is configured to move the pop-out mechanism to bring the camera to the operative pop-out state and to the collapsed state using the two antagonistic groups.

In some examples, a SMA actuator configuration to move the pop-out mechanism to bring the camera to the operative pop-out state and to the collapsed state using the two antagonistic groups includes a configuration to pass a current through the at least one SMA component for moving the pop-out mechanism in a first pop-out direction, and to not pass a current through the at least one SMA component for moving the pop-out mechanism in a second pop-out direction that is opposite to the first pop-out direction.

In some examples, a camera further includes a locking mechanism, wherein the locking mechanism is configured to prevent a movement of the pop-out mechanism when the camera is in the pop-out state or in the collapsed state. In some examples, the locking mechanism is a mechanical locking mechanism. In some examples, the locking mechanism is a magnetic locking mechanism. In some examples, the mechanical locking mechanism includes a first dent, a second dent, and a circular margin, wherein the circular margin is configured to enter the first dent in the pop-out state and to enter the second dent in the collapsed state to prevent the movement of the pop-out mechanism. In some examples, the circular margin is further configured to perform a rotational movement around a pivot point.

In some examples, the magnetic locking mechanism includes at least one magnetic locker, the at least one magnetic locker including a magnet and a yoke. In some examples, the magnetic locking mechanism includes at least one magnetic locker, the at least one magnetic locker including two magnets.

In some examples, the at least two antagonistic SMA wires have an identical SMA wire length (LW) and an identical SMA wire diameter (DW). In some examples, LW may be in the range 10-100 mm. In other examples, LW may be in the range 30-70 mm. In some examples, DW may be in the range 0.025-0.5 mm. In other examples, DW may be in the range 0.1-0.2 mm.

In some examples, the lever has a short arm, a long arm, and a pivot point, and the configuration of the SMA actuator includes a configuration to pass a current through a first of the at least two SMA wires and to not pass a current through a second of the at least two SMA to actuate the short arm of the lever along a first stroke, which causes the long arm of the lever to move along a second stroke to move the pop-out mechanism in a first pop-out direction for popping out the camera, and to pass a current through the second of the at least two SMA wires and to not pass a current through the first of the at least two SMA wires to actuate the short arm of the lever along a third stroke, which causes the long arm of the lever to move along a fourth stroke to move the pop-out mechanism in a second pop-out direction for collapsing the camera, wherein the first and third strokes are antiparallel and wherein the second and fourth strokes are antiparallel.

In some examples, a length LSA of the short arm of the lever and a length LLA of the long arm of the lever have a lever ratio LSA/LLA in the range 1:10-1:2. In some examples, the lever ratio is in the range 1:3-1:5.

In some examples, the SMA actuator further includes a pull rod actuated by the at least two antagonistic SMA wires, wherein the pull rod is coupled to the short arm of the lever, and wherein the pop-out mechanism is coupled to the long arm of the lever. In some examples, the SMA actuator further includes an actuator frame, a first pin, and a second pin, wherein the first pin connects the lever to the actuator frame and defines a position of the pivot point, wherein the second pin connects the lever to the pull rod and wherein a distance between the first pin and the second pin defines a length LSA of the short arm of the lever. In some examples, the lever includes a slot that connects the lever to the pop-out mechanism, and wherein a distance between the first pin and the slot defines LLA.

In some examples, the SMA actuator further includes at least one Hall sensor and at least one magnet for measuring a relative position between the pull rod and the actuator frame.

In some examples, the least two antagonistic SMA wires are symmetrically folded SMA wires. In some examples, the at least two antagonistic SMA wires are made of Nitinol. In some examples, the at least two antagonistic SMA wires are attached to a heat sink.

In some examples, the pop-out mechanism translates a rotational motion into a linear motion, wherein the linear motion is oriented parallel to a lens optical axis, and wherein the rotational motion is around a rotation axis oriented parallel to the lens optical axis. In some examples, the pop-out mechanism translates a first linear motion into a second linear motion, wherein the first linear motion is oriented perpendicular to a lens optical axis, and wherein the second linear motion is oriented parallel to the lens optical axis.

In some examples, the SMA actuator has a width W=1-10 mm, a height H=2-15 mm and a length L=10-50 mm. In other examples, W=2-4 mm, H=5-9 mm and L=20-40 mm.

A camera as above or below may be included in a multi-camera together with at least one additional camera. The additional camera or cameras may be folded or non-folded (upright) cameras. A camera and/or a multi-camera as above or below may be included in mobile (portable) electronic device such as a smartphone.

In various embodiments or examples, there is provided a method, comprising: providing a metal plate having a L-shape; providing a SMA wire; providing an auxiliary wire; forming a first stamp having a rectangular shape; forming a second stamp having a non-rectangular shape; using the first stamp to form a first indent into the metal plate; bending the metal plate using the auxiliary wire to form a second indent; inserting the SMA wire in the second indent; and using the second stamp to fixate the SMA wire in the second indent so that an arc shape is imposed on the SMA wire, thereby forming a crimp-SMA wire assembly. The crimp-SMA wire assembly may be included in a pop-out camera included in a smartphone.

In some examples, the crimp has a width W=0.25-7.5 mm, a height H=0.25-7.5 mm and a length L=0.5-10 mm. In other examples, W=0.5-2.0 mm, H=0.5-2.0 mm and L=1.5-3.0 mm.

BRIEF DESCRIPTION OF THE DRAWINGS

Non-limiting embodiments of the presently disclosed subject matter are described below with reference to figures attached hereto that are listed following this paragraph. Identical structures, elements or parts that appear in more than one figure may be labeled with the same numeral in the figures in which they appear. The drawings and descriptions are meant to illuminate and clarify examples disclosed herein, and should not be considered limiting in any way.

FIG. 1A shows exemplarily a known example of a pop-out camera module in an active or collapsed state;

FIG. 1B shows exemplarily the known example of FIG. 1A in an inactive or collapsed state;

FIG. 1C shows in a perspective view a known example of a frame of a pop-out camera;

DETAILED DESCRIPTION

Figure 2A:
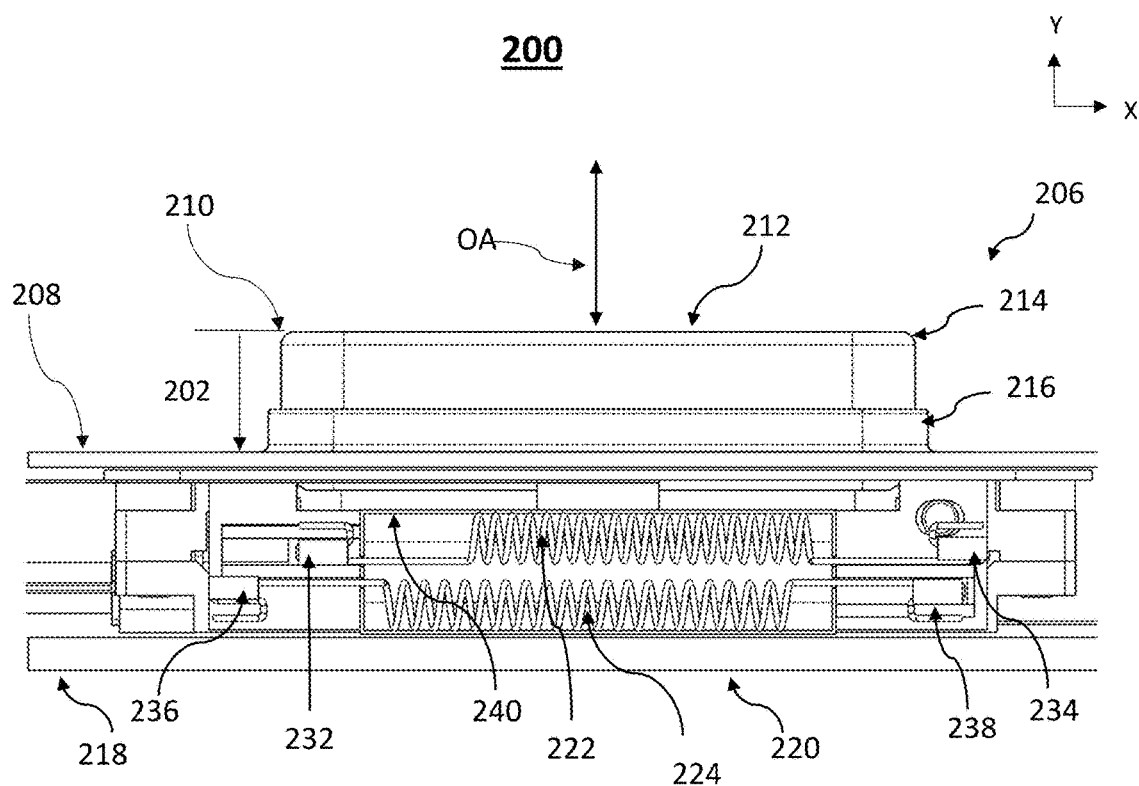
FIG. 2A shows a pop-out camera including a first SMA spring example disclosed herein and incorporated into a host device and in a pop-out state.

FIGS. 1A-1B show a schematic drawing of a known pop-out camera module 100, respectively in an inactive (collapsed) state and in an active (pop-out) state. Camera module 100 may be included in a mobile electronic device such as a smartphone, a tablet, a PDA and the like. It is noted that all examples disclosed herein are beneficially used in mobile devices and they are optimized for being relatively small in size, "relatively" referring here to a comparison with known examples. In general, especially a height (or thickness) of a mobile device poses tight constraints (or limits) to components used within the mobile device. The height of a mobile device is, except for examples such as folded cameras as known in the art, substantially parallel to an optical axis ("OA") of a lens included in a camera of the mobile device, parallel to a TTL of the camera module and parallel to a camera module height. A pop-out actuator such as a pop-out actuator 220, 320, 420, 450, 490, 4020, 520, 620, 720, 1020 and 1420 disclosed herein below may be included in pop-out camera module 100. Pop-out camera module 100 comprises a lens barrel 120, a carrier 130 configured to receive coaxially the lens barrel 120, and an image sensor 160. Lens barrel 120 comprises an objective assembly holding coaxially one or more lens elements 125 defining an optical axis 101 of the camera module (here along axis Z in an exemplary XYZ coordinate system). Pop-out camera module 100 includes a pop-out mechanism configured to translate a rotational motion into a linear motion, wherein the linear motion is oriented parallel to the lens' optical axis. Camera module 100 further comprises a retractable cover window 150. Carrier 130 may be configured to form a sleeve around lens barrel 120. Cover window 150 may generally include a protective surface having an aperture, preferably centrally located on the protective surface. The protective surface of cover window 150 may be exposed to an outside environment i.e. be the most distal element of camera module 100 from image sensor 160. Cover window 150 may be configured to be axially movable between a retracted position and an extended position, corresponding respectively to a proximal axial position and a distal axial position of the cover window relative to image sensor 160. Lens barrel 120 also has a pop-out (or "operative") state and a collapsed state, corresponding respectively to a proximal axial position and a distal axial position of the lens barrel relative to the image sensor 160.

In the operative state of the lens barrel, image sensor 160 may be positioned in a focal plane or in an imaging plane of the objective assembly. In an active mode of the camera module, cover window 150 may be in the extended position and lens barrel 120 may be in the operative state, while in an inactive mode of the camera module, cover window 150 may be in a retracted position and lens barrel 120 may be in a collapsed state. The motion of cover window 150 and lens barrel 120 between the retracted/extended positions and collapsed/operative state may be coordinated to allow camera module 100 to be operated selectively in the active or inactive mode. In the inactive mode, the camera module may be disabled, i.e. the camera module may be unable to image a field of view (FOV) of the objective assembly. The active mode corresponds to a pop-out state of camera module 100 in which the TTL of the camera module (and a module height) is higher than the TTL of the camera module (and the module height) in the collapsed state (also referred to as cTTL).

Camera module 100 further includes an actuator 140 having a driving motor (or "actuator") configured for operating cover window pop-out assembly 110. Cover window 150 may be coupled to the driving cam so that a rotation in a first rotational direction of the driving cam may cause cover window 150 to axially move from the retracted position to the extended position. A rotation in a second opposite rotational direction of the driving cam may cause the cover window 150 to move axially from the retracted position to the extended position. The rotation of the driving cam may be about a rotation axis parallel to the Z-axis, i.e. parallel to the optical axis. Camera module 100 may further include a housing (not shown) configured to receive cover window pop-out assembly 110. Retractable cover window 150 may be arranged axially movable relative to the housing.

Generally, camera module 100 may be configured to be waterproof. The camera module may include a protective seal configured to maintain impermeability of the camera module in the collapsed state and in the operative state as well as in intermediate states of camera module 100. Camera module 100 may also allow dust resistance and be configured to meet the Ingress Protection code IP68 standards.

Generally, dimensions of camera module 100 may be in the following ranges: the camera module including the actuator may fit in a circle having a diameter between 6-50 mm. A diameter of the cover window may be between 5-40 mm. A height of the camera module in the inactive (collapsed) state may be between 6-18 mm while in the active (pop-out) state it may be between 7-30 mm. A variation of height between the inactive and active mode of the camera module may be between 1-15 mm.

Figure 14A:
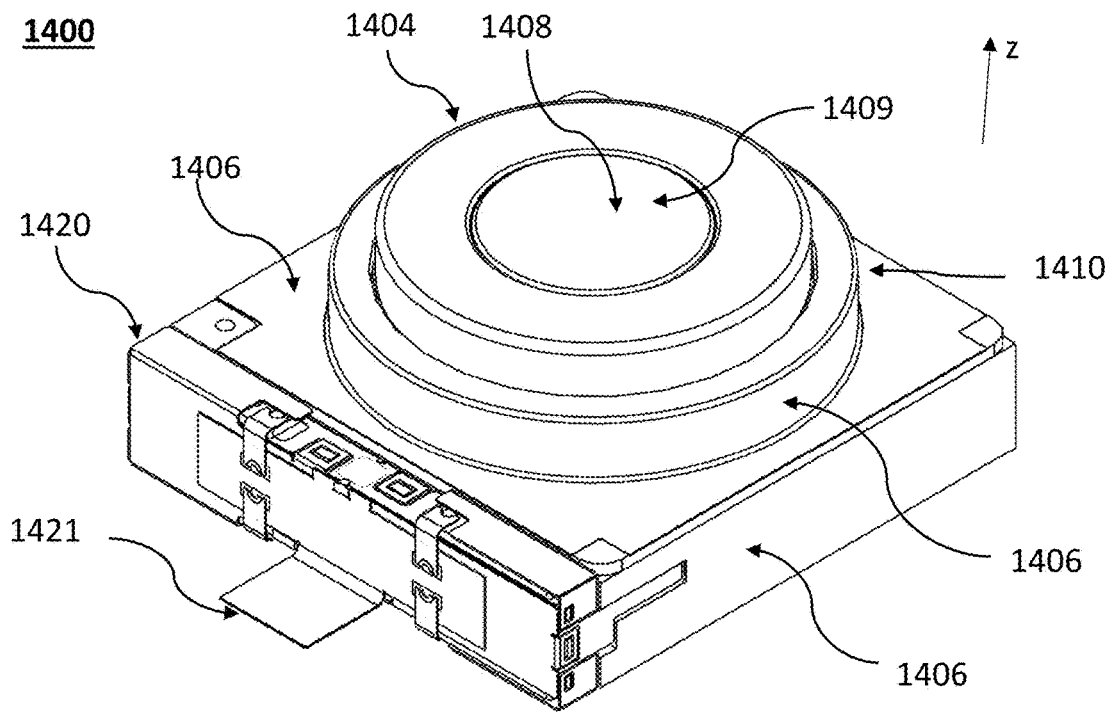
FIG. 14A shows yet another embodiment of a pop-out module including a ninth SMA wire example disclosed herein in a pop-out state in a perspective view.
Figure 14B:
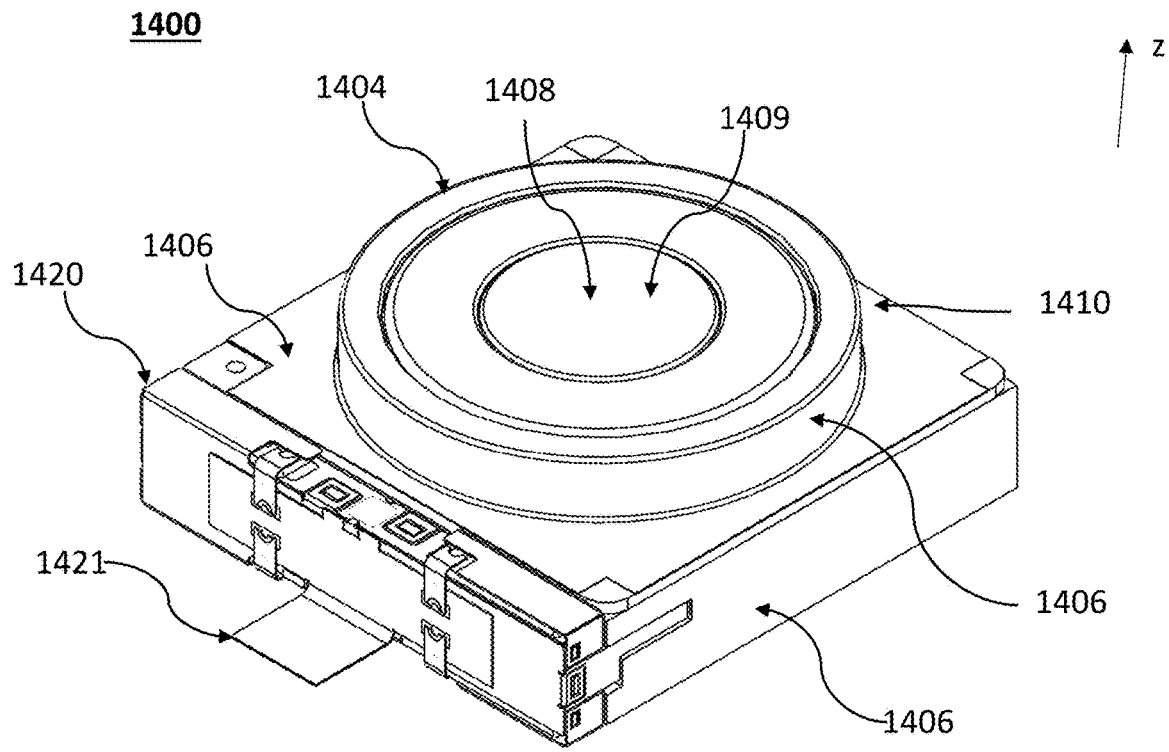
FIG. 14B shows pop-out module in a collapsed state in the same view as FIG. 10A.

FIG. 1C shows in a perspective view a known example of a frame 210' of a pop-out camera, shown in FIG. 14B of the co-owned international patent applications PCT/IB2020/058697. Frame 210' includes a pop-out mechanism that is configured to translate a first linear motion into a second linear motion, wherein the first linear motion is oriented perpendicular to an optical axis of a lens included in the pop-out camera and the second linear motion is oriented parallel to an optical axis of a lens included in the pop-out camera. A pop-out actuator such as actuator 220, 320, 420, 450, 490, 4020, 520, 620, 720, 1020 and 1420 disclosed herein below may be included in a frame of a pop-out camera like frame 210' (e.g. a camera 200 described below), for example positioned at one side of a side limiter 1406 or at two sides of a side limiter 1406. For example, one pop-out actuator 220 may be positioned at a side 102 of side limiter 1406, and another pop-out actuator 220 may be positioned at a side 104 of side limiter 1406. In frame 210', a linear movement of a cam follower 1402 along an axis substantially parallel to the x-direction is used for controlling the at least one air-gap between single lens elements of the lens, or between the lens and the image sensor.

All angled grooves like 106 in FIG. 1C shown herein may have an angle of 30-60 degrees with respect to the horizontal.

FIG. 2A shows an embodiment of a pop-out camera numbered 200 that includes a first SMA spring pop-out actuator disclosed herein, incorporated into a host device 206. Camera 200 is shown in a pop-out state, where camera 200 forms a significant pop-out bump 202 with respect to an exterior surface 208 of device 206. Here, "significant" may be for example 1-25 mm. In the pop-out state, camera 200 increases the height of host device 206 to a "height in a pop-out state". This applies to all further pop-out cameras shown herein. Device 206 further includes a screen 218. Camera 200 includes a pop-out mechanism, a pop-out window frame 210 that includes an aperture 212 of camera 200, a window frame 214 and a fixed frame 216. When switching between a pop-out and a collapsed state, window frame 214 moves, while fixed frame 216 does not move. An optical axis ("OA") of a lens (not shown) included in pop-out camera numbered 200 is oriented parallel to the y-axis, as shown. All references below to "rotation around the y-axis" are therefore references to rotations around the OA. Also in further examples, "OA" indicates the orientation of an optical axis of a lens. The movement for switching between a pop-out and a collapsed state is actuated by a pop-out actuator 220 disclosed herein. Pop-out actuator 220 includes a first spring 222 ("top spring") and a second spring 224 ("bottom spring"). Both spring 222 and spring 224 are made from a SMA material, e.g. Nitinol. Springs made from SMA materials have two different spring constants that depend on the temperature of the material. Below a certain threshold temperature $T_S$ (e.g. $T_S$=50-150 degrees) a spring has a spring constant $k_{cold}$ and above $T_S$ it has the spring constant $k_{hot}$, wherein $k_{hot} > k_{cold}$, e.g. $k_{hot}/k_{cold}$=2-10. The heating can be done for example by electrical resistance heating. It is noted here that we refer to SMA materials that are characterized by a relation $k_{hot} > k_{cold}$. In other embodiments, different SMA materials may be used which are characterized by a relation $k_{hot} < k_{cold}$. Spring 222 is attached to a pin 232 and to a pin 234. Spring 224 is attached to a pin 236 and to a pin 238. Pin 232 is fixedly coupled to pin 238, and both are additionally fixedly coupled to a component (not shown) such as cam follower 1402, meaning that pin 232, pin 238 and the component move together as one unit (assembly) with respect to device 206. The collective movement of the assembly of pin 232, pin 238 and the component is along an axis substantially parallel to the x-axis in the coordinate system shown. This linear x-movement of the component is translated by angled pin-groove mechanisms such as angled pin-groove mechanism 106 to a movement of window frame 214 substantially parallel to the y-direction. Pin 234 and pin 236 are fixedly coupled to device 206. When activating pop-out actuator 220 by heating one of spring 222 or spring 224, the heated spring has a stronger spring constant $k_{hot}$ so that its force overcomes the force of the other unheated spring, leading to a movement of the assembly of pin 232, pin 238 and the component relative to device 206. Therefore, one may speak of a "first antagonistic spring actuator using two SMA springs". "Antagonistic actuator" refers here to an actuator including two or more components, wherein a first force exercised by a first component and a second force exercised by a second component are oriented anti-parallel to each other. Actuation provided by the antagonistic actuator occurs as of two reasons: the first reason is that a locking mechanism is opened, which prior to opening it prevented motion, although the first force was stronger or weaker than the second force; the second reason is that the magnitude of the first force or the second force was changed, e.g. by heating a SMA wire or a SMA spring. For heating springs 222 and 224 by electrical resistance heating, pins 232, 234, 236 and 238 act additionally as electrical contacts of an electrical circuit that allows conducting an electrical current through the springs.

Springs 222 and 232 may be made of an identical material and have an identical wire diameter of e.g. 0.05-1 mm, preferably 0.1-0.5 mm. A spring diameter may be 0.5-5 mm, preferably 1-2 mm.

Figure 2B:
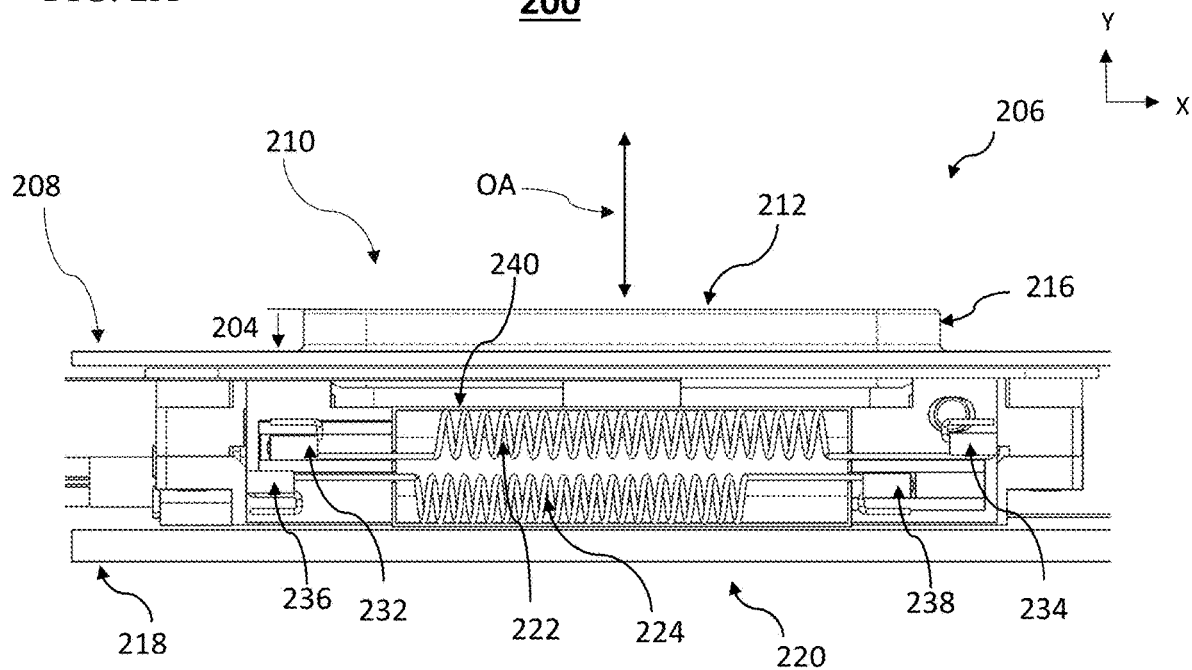
FIG. 2B shows the pop-out camera of FIG. 2A in a collapsed state.

FIG. 2B shows pop-out camera 200 in a collapsed state, where camera 200 forms a small collapsed bump 204 ("c-bump") with respect to an exterior surface 208 of device 206. The C-bump height may be for example 0-3 mm.

A locking mechanism such as locking mechanism 750 or locking mechanism 1405 as disclosed herein locks camera 200 in the pop-out and collapsed state respectively, i.e. it ensures that window frame 214 does not move so that camera 200 stays in the pop-out and the collapsed state respectively without the need for actuation. No power is consumed while camera 200 is in the pop-out or in the collapsed state. This means that operating pop-out actuator 220 is required (and power is consumed) only for the switching between the states, what is beneficial for low power consumption. The locking mechanisms disclosed herein are characterized by a relatively small size and designed such that a size of a pop-out camera including the locking mechanisms is not increased or increased only slightly. In addition, the locking mechanisms disclosed herein are designed such that a force required to open (or to overcome) the locking mechanism does decay fast when moving away from the state where the pop-out camera is locked.

Collapsing Camera 200—Switching Camera 200 from a Pop-Out to a Collapsed State

For collapsing camera 200, the locking mechanism is dis-activated and spring 224 is heated. Spring 222 is not heated. After spring 224's transition from $k_{cold}$ to $k_{hot}$, the force exercised by spring 224 overcomes the force exercised by spring 222, which causes a movement of pin 238 with magnitude Δs in a negative x-direction. Δs may be in the range Δs=0.5-15 mm, and preferably Δs=1-5 mm. Together with pin 238, pin 232 moves by Δs in the same direction as pin 238. Via a pop-out mechanism, a component (not shown here) such as cam follower 1402 translates this movement by angled pin-groove mechanisms such as angled pin-groove mechanism 106 to a movement of window frame 214 in the negative y-direction. When reaching the collapsed state, a locking mechanism (not shown) keeps camera 200 in the collapsed state without need for operating pop-out actuator 220.

Popping Out Camera 200—Switching Camera 200 from a Collapsed to a Pop-Out State

For popping out camera 200, the locking mechanism is dis-activated and spring 222 is heated. Spring 224 is not heated. After spring 224's transition from $k_{cold}$ to $k_{hot}$, the force exercised by spring 222 overcomes the force exercised by spring 224, which causes a movement of pin 238 with magnitude Δs in a positive x-direction (values for Δs see above). Together with pin 238, pin 232 moves by Δs in the same direction as pin 238. Via a pop-out mechanism, a component (not shown here) such as cam follower 1402 translates this movement by angled pin-groove mechanisms such as angled pin-groove mechanism 106 to a movement of window frame 214 in a positive y-direction. When reaching the pop-out state, a locking mechanism (not shown) keeps camera 200 in the pop-out state without need for operating pop-out actuator 220.

Figure 2C:
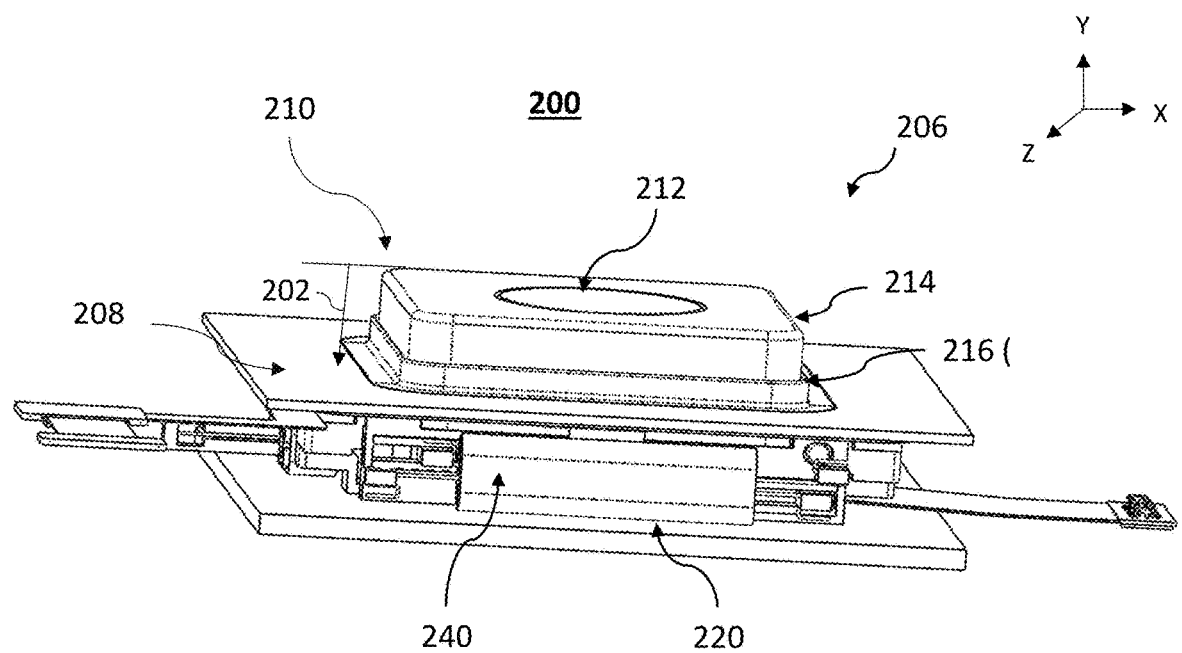
FIG. 2C shows the pop-out camera of FIGS. 2A and 2B in a perspective view in a pop-out state.

FIG. 2C shows camera 200 in a perspective view in a pop-out state. Pop-out actuator 220 is included in a pop-out actuator housing 240. Pop-out actuator housing 240 may be filled or may not be filled with a material that exhibits effective heat conductance and no electrical conductance, e.g. with a heat conductor gel, which acts as a heat sink. This is beneficial as it accelerates the process of cooling down the SMA springs.

Figure 2D:
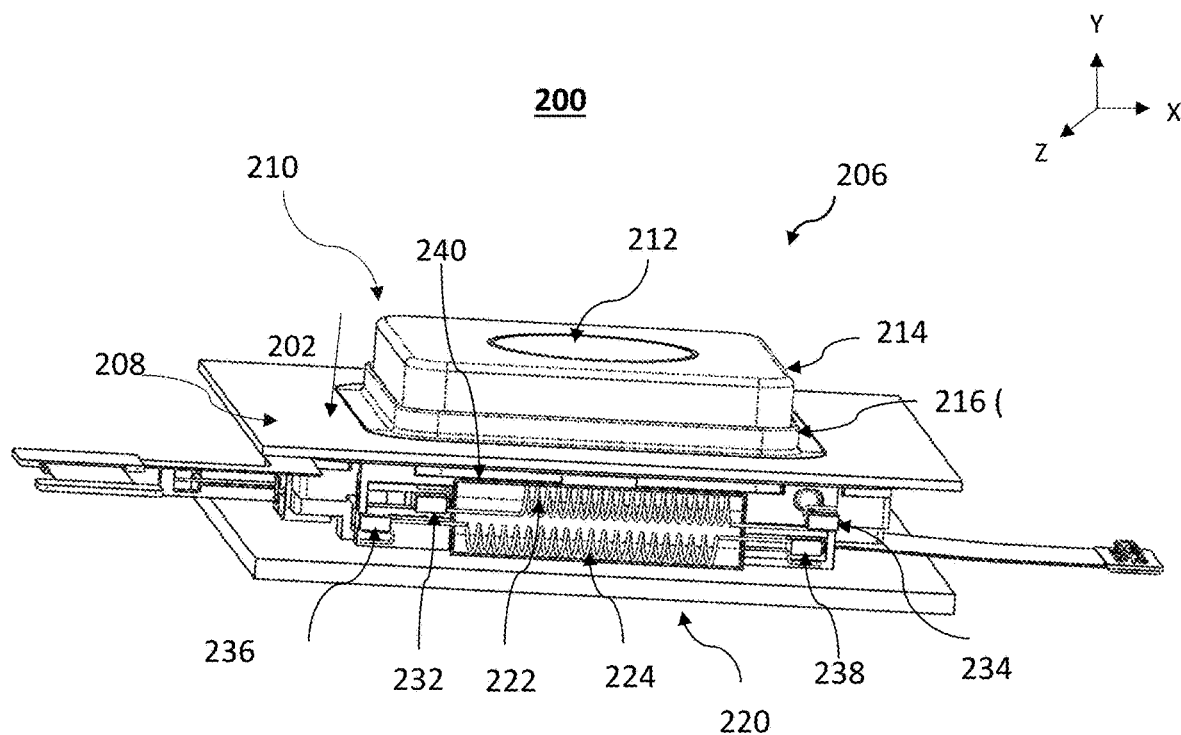
FIG. 2D shows the pop-out camera of FIGS. 2A and 2B in the same perspective view as of FIG. 2C, but with details of the pop-out actuator.

FIG. 2D shows camera 200 in the same perspective view as of FIG. 2C, but with details of actuator 220. Pop-out actuator housing 240 is removed so that pop-out actuator 220 is visible.

Figure 3A:
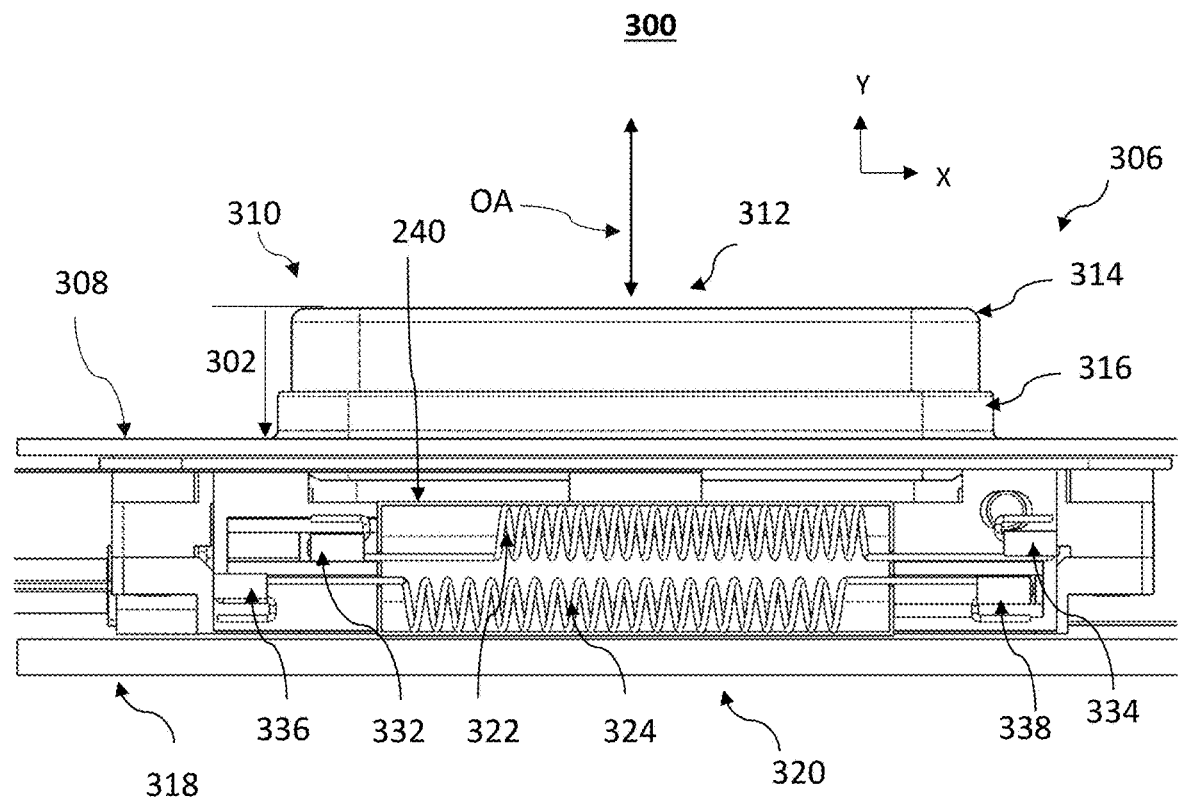
FIG. 3A shows another embodiment of a pop-out camera including a second SMA spring example disclosed herein and incorporated into a host device in a pop-out state.

FIG. 3A shows an embodiment of a pop-out camera numbered 300 that includes a second SMA spring pop-out actuator disclosed herein and incorporated into a host device 306. Camera 300 is shown in a pop-out state and has a pop-out actuator 320 that is different from pop-out actuator 220.

Figure 3B:
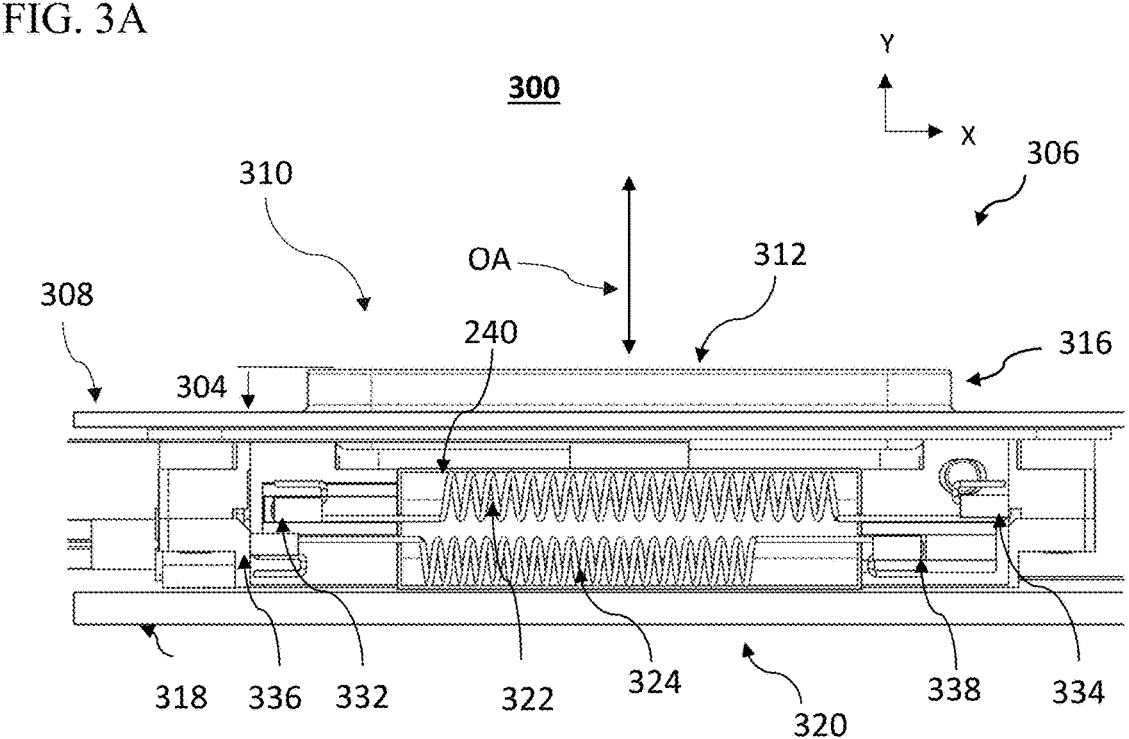
FIG. 3B shows the pop-out camera of FIG. 3A in a collapsed state.

FIG. 3B shows pop-out camera 300 in a collapsed state. A locking mechanism keeps camera in a pop-out state and a collapsed state respectively. A positioning of pop-out actuator 320 may be identical to pop-out actuator 220 in FIG. 2A and FIG. 2B respectively.

Pop-out actuator 320 includes the same pin structure and functionalities as pop-out actuator 220, but pop-out actuator 320 includes different springs. A first spring 322 is made from a SMA material (e.g. Nitinol) having two spring constants $k_{hot}$ and $k_{cold}$, while a second spring 324 is made from a "regular" material having a spring constant k, i.e. a material not exhibiting the SMA's behavior of two different spring constants depending on the spring temperature. The k of spring 324, $k_{hot}$ and $k_{cold}$ of spring 322 are selected so that they fulfill $k_{hot}>k>k_{cold}$. Here, one may speak of a "first antagonistic spring actuator using one SMA spring and one regular spring". In other words, here one may also speak of a first example of an antagonistic group of springs that include at least one spring made from a SMA material.

More generally, as used herein, "antagonistic group" refers to at least one pair of components (e.g. wires, springs or a wire and spring") that are used in an actuator to provide movement in two opposite directions. Some components of an antagonistic group may be made of SMA materials, while other components may be made of non-SMA materials.
Collapsing Camera 300—Switching Camera 300 from a Pop-Out to a Collapsed State The locking mechanism is dis-activated and SMA spring 322 is heated. After spring 322's transition from $k_{cold}$ to $k_{hot}$, the force exercised by spring 332 (~$k_{hot}$) overcomes the force exercised by regular spring 324 (~k), which causes a movement of a pin 338 with magnitude Δs in a negative x-direction. Δs may be in the range Δs=0.5-15 mm, preferably Δs=1-5 mm. The movement of the pins and locking mechanism is performed as described in FIG. 2A-B.
Popping Out Camera 300—Switching Camera 300 from a Collapsed to a Pop-Out State The locking mechanism is dis-activated and SMA spring 322 is not heated. As $k>k_{cold}$ the force exercised by spring 322 (~k) overcomes the force exercised by spring 324 (~$k_{cold}$), which causes a movement of pin 338 with magnitude Δs in a positive x-direction (values for Δs see above). The movement of the pins and locking mechanism is done as described in FIG. 2A-B.

Figure 4A:
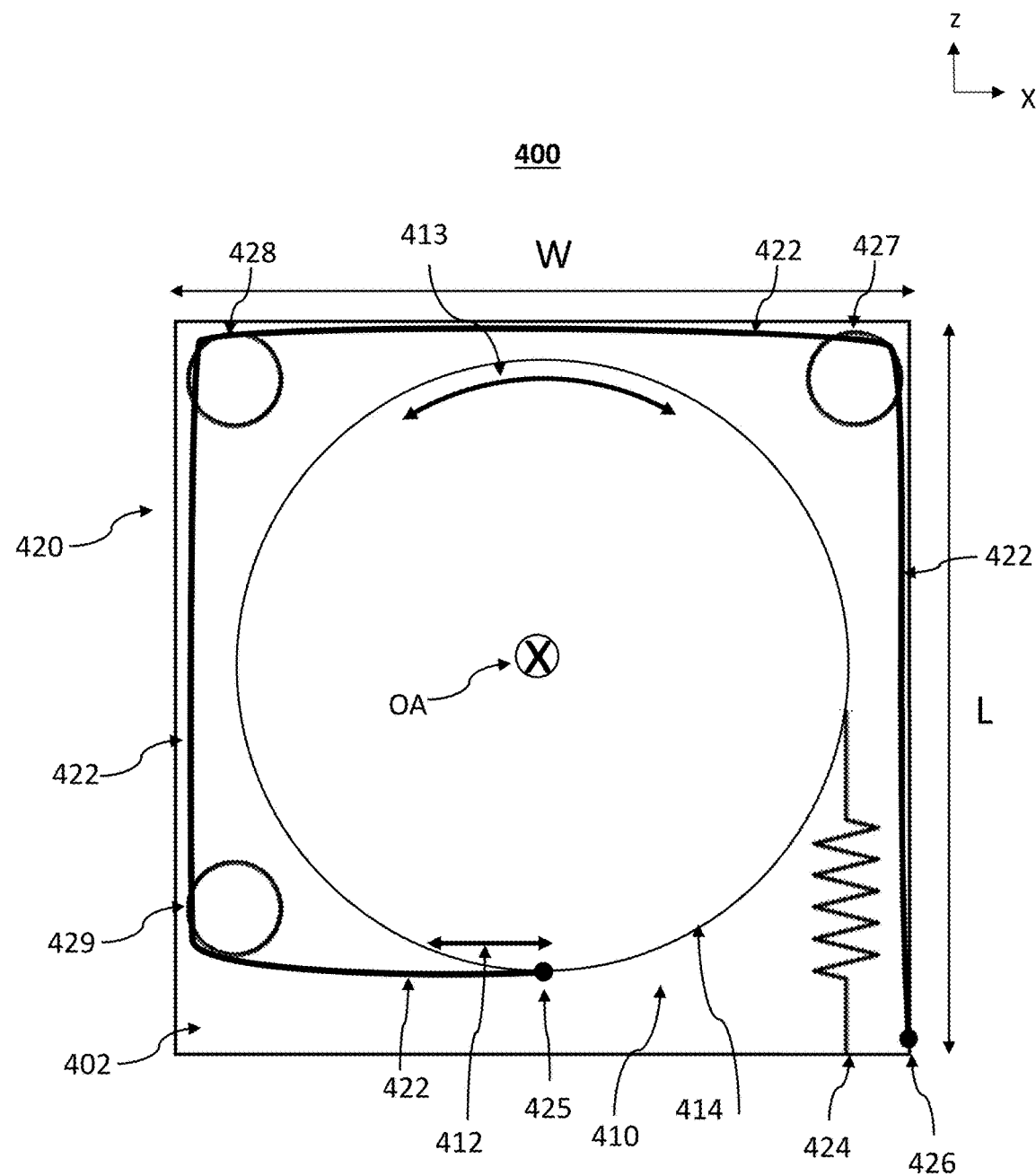
FIG. 4A shows an embodiment of a pop-out module including a first SMA wire example disclosed herein.

FIG. 4A shows in top view and in a pop-out state an embodiment of a pop-out module numbered 400 that includes a first SMA wire pop-out actuator 420 disclosed herein.

Pop-out module 400 includes a lens carrier (not shown) carrying a lens (not shown) having a lens optical axis marked "OA" that is oriented perpendicular to the x-z coordinate system shown, the lens representing an aperture of a pop-out camera that includes pop-out module 700 a housing 402 and a pop-out mechanism 410. Pop-out mechanism 410 includes a lens carrier (not shown), a pin ring 414, a transmission module (not shown) and SMA actuator 420. A diameter of pin ring 414 may be 5-40 mm, preferably between 15-30 mm. A width ("W") and a length ("L") of pop-out module 400 may be W=5-50 mm, L=5-50 mm and preferably W=25-35 mm, L=25-35 mm.

SMA actuator 420 includes a SMA wire 422 which is folded three times ("threefold folding"), at a first turning point around pin 427, at a second turning point around pin 428 and at a third turning point around pin 429. A diameter of each of pin 427, pin 428, and pin 429 may be 0.5-7.5 mm, preferably between 2.5-5 mm. Each of pin 427, pin 428, and pin 429 may be configured to rotate along a concentric rotation axis that is parallel to the OA, i.e. perpendicular to both the x-axis and the z-axis. The rotation may be enabled for example by bushing sliding bearings as known in the art. SMA wire 422 may have a force of about 1N-preferably 3N-6N. A first end of SMA wire 422 is fixedly coupled and electrically connected to housing 402 at position 426. A second end of SMA wire 422 is fixedly coupled and electrically connected to pin ring 414 at position 425. SMA actuator 420 further includes a spring 424 having a spring constant k. For SMA wire 422, a combination of material and wire diameter is selected so that it fulfills $E_{hot}>k>E_{cold}$.
Collapsing Pop-Out Module 400—Switching from a Pop-Out to a Collapsed State SMA wire 422 is heated. The force exercised by wire 422 (~$E_{hot}$) overcomes the force exercised by spring 422 (~k). This causes a first linear movement of SMA wire 422 as shown by arrow 412 by about 0.5-7.5 mm, preferably by about 1-4 mm. The linear movement of SMA wire 422 is transmitted to pin ring 414, which rotates in a first (e.g. clockwise) rotation direction around the OA as indicated by arrow 413 by about 2.5-25 degrees, preferably by about 7.5-20 degrees. The threefold folding is beneficial as it allows use of a relatively long SMA wire of about 20-150 mm, preferably 50-120 mm. A relatively long SMA wire is required for allowing sufficient linear movement along arrow 412. SMA wire 422 in mainly in contact with air, which is beneficial for heat isolation and thus fast heating.
Popping Out Pop-Out Module 400—Switching from a Collapsed to a Pop-Out State SMA wire 422 is not heated. The force exercised by spring 422 (~k) overcomes the force exercised by wire 422 (~$E_{cold}$). This causes a second linear movement of SMA wire 422 (in a direction opposite to the first linear movement) as shown by arrow 712. The linear movement of SMA wire 422 is transmitted to pin ring 414, which rotates in a second e.g. counterclockwise rotation direction (opposite to the clockwise rotation direction).

When pop-out module 400 is in a pop-out or collapsed state, a locking mechanism (not shown) may lock the camera's state.

Here, one may speak of a "second antagonistic actuator using one SMA wire and one regular spring".

Figure 4B:
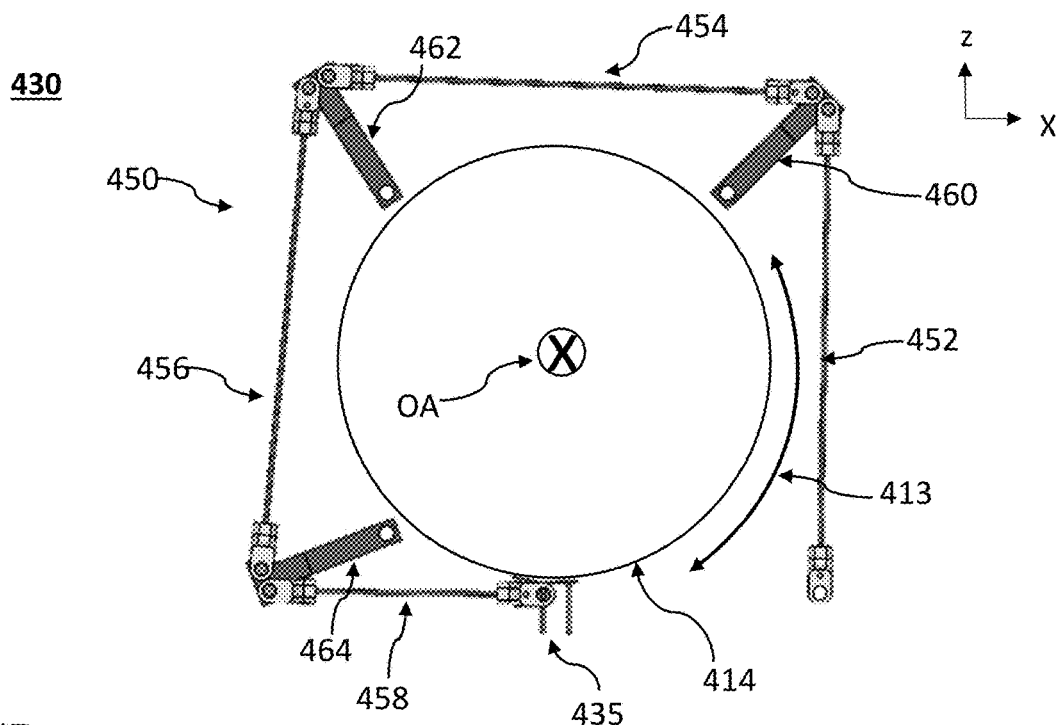
FIG. 4B shows an embodiment of a pop-out module including a second SMA wire example in a pop-out state.
Figure 4C:
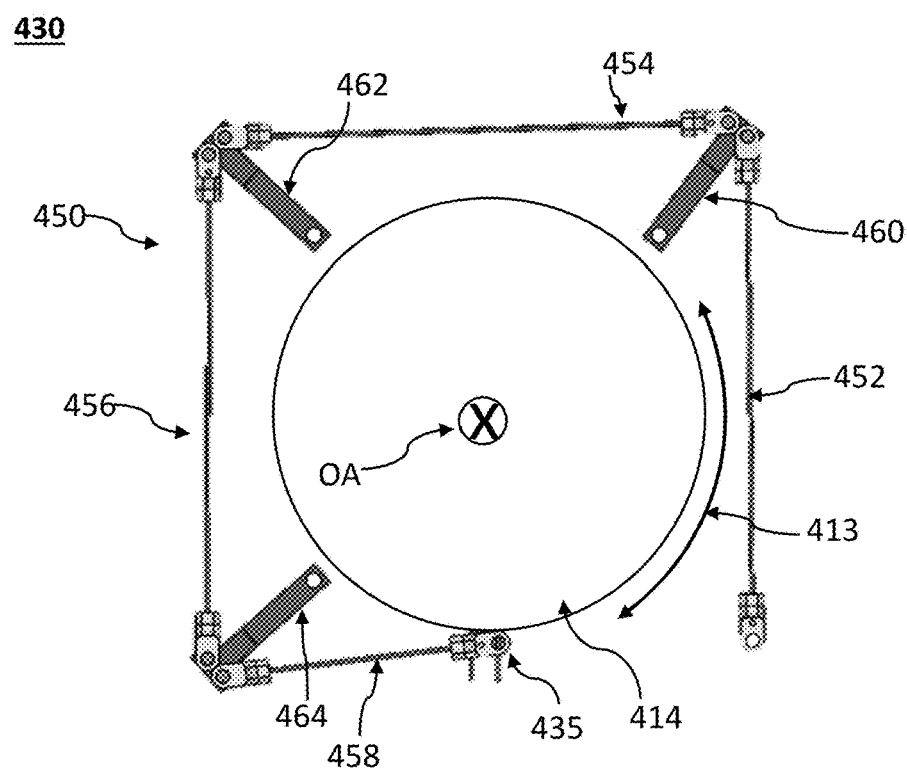
FIG. 4C shows the pop-out module of FIG. 4B in a collapsed state.

FIG. 4B shows in top view and in a pop-out state an embodiment of a pop-out module numbered 430 that includes a second SMA wire pop-out actuator 450 disclosed herein. FIG. 4C shows pop-out module 430 in a collapsed state. Except for SMA wire pop-out actuator 450, pop-out module 430 is identical to pop-out module 400, i.e. a linear movement actuated by SMA wire pop-out actuator 450 is translated into a rotational movement of pin ring 414 as indicated by arrow 413. SMA wire pop-out actuator 450 includes several single SMA wires, specifically it includes a first SMA wire 452, a second SMA wire 454, a third SMA wire 456 and a fourth SMA wire 458. Fourth SMA wire 458 is fixedly coupled to pin ring 414 at position 435. SMA wire pop-out actuator 450 further includes three levers, a first lever 460, a second lever 462 and a third lever 464. The levers allow transmission of a force induced by heating SMA wires 452-458 without small bending radii. SMA wires 452-458 are mainly contact in contact with air, which is beneficial for heat isolation and thus fast heating. The heating of SMA wires 452-458 causes pin ring 414 to rotate in a first (e.g. clockwise) rotation direction. For rotating pin ring 414 in a second rotation direction (e.g. counterclockwise?) opposite to the first rotation direction, SMA actuator 450 may in addition include a regular spring (not shown here) such as spring 424 (FIG. 4A) that has a spring constant k.

Figure 4D:
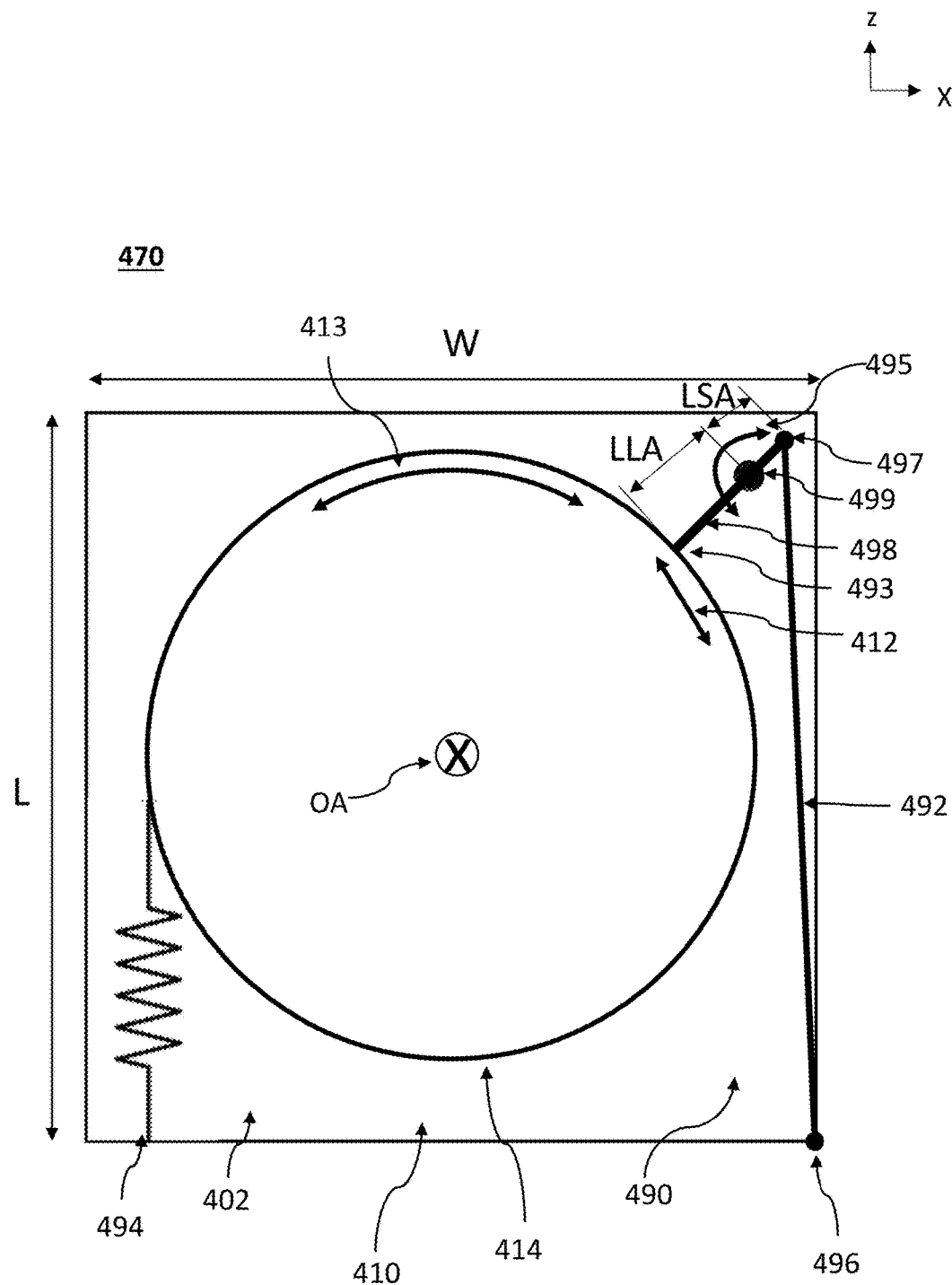
FIG. 4D shows an embodiment of a pop-out module including a third SMA wire example disclosed herein.

FIG. 4D shows in top view and in a pop-out state an embodiment of a pop-out module numbered 470 that includes a third SMA wire pop-out actuator 490 disclosed herein. Except for SMA wire pop-out actuator 490, pop-out module numbered 470 is identical to pop-out module numbered 400, i.e. a linear movement actuated by SMA wire pop-out actuator 490 is translated into a rotational movement of pin ring 414 as indicated by arrow 413.

SMA actuator 490 includes a SMA wire 492 that may have a force of about 1N-10N, preferably 3N-6N. A first end of SMA wire 492 is fixedly coupled and electrically connected to housing 402 at a position 496. A second end of SMA wire 492 is fixedly coupled and electrically connected to a lever 498 at a position 497. Lever 498 is fixedly coupled to pin ring 414 at a position 493 and rotates around pivot point 499 as indicated by arrow 495. A lever ratio may be about 1:4 as shown, i.e. a distance between position 497 and pivot point 499 may be ¼ of a distance between pivot point 499 and position 493. In other examples, a lever ratio may be 1:10-1:2. Using a lever here is beneficial, as the change of a length of a SMA wire due to heating above a SMA temperature threshold is limited to well below 10% of the actual length of the SMA wire, i.e. a relative length change of the SMA change is well below 10%. Given a required movement stroke, a lever with suitable lever ratio is used to magnify (or to prolong) this change of length, so that an actuation over the required movement stroke is provided. SMA actuator 490 further includes a spring 494 having a spring constant k. For SMA wire 492, a combination of material and wire diameter is selected such that it fulfills $E_{hot}>k>E_{cold}$. SMA wire 422 may have a force of about 1N-10N, preferably 3N-6N. A width ("W") and a length ("L") of pop-out module 470 may be W=5-50 mm, L=5-50 mm and preferably W=25-35 mm, L=25-35 mm.

Here, one may speak of a "third antagonistic actuator using one SMA wire and one regular spring".

Figure 4E:
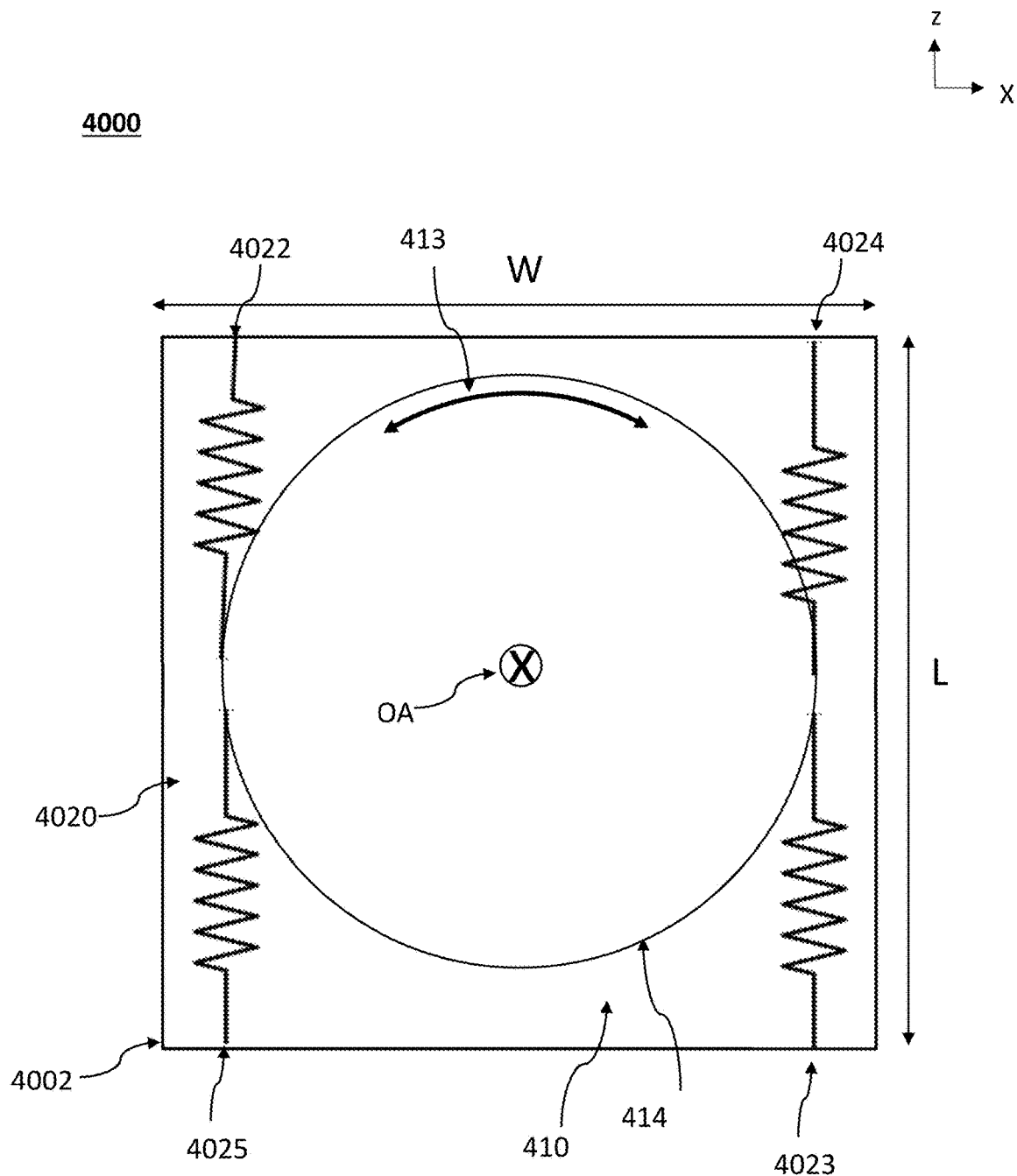
FIG. 4E shows an embodiment of a pop-out module including a third SMA spring example disclosed herein.

FIG. 4E shows in top view and in a pop-out state an embodiment of a pop-out module numbered 4000 that includes a third SMA spring pop-out actuator 4020 disclosed herein. Except for SMA spring pop-out actuator 4020, pop-out module numbered 4000 is identical to pop-out module numbered 400, i.e. a linear movement actuated by SMA spring pop-out actuator 4020 is translated into a rotational movement of pin ring 414 as indicated by arrow 413. SMA spring pop-out actuator 4020 includes a first SMA spring 4022, a second SMA spring 4023, a first regular spring 4024 and a second regular spring 4025. First regular spring 4024 and second regular spring 4025 may have an identical spring constants k. Spring constants $k_{hot}$ and $k_{cold}$ of first SMA spring 4022 and second SMA spring 4023 may be identical and selected such that they fulfill $k_{hot}>k>k_{cold}$. Here, one may speak of an "antagonistic spring actuator using two SMA springs and two regular springs" or of a second example of an antagonistic group of springs that include at least one spring made from a SMA material. A width ("W") and a length ("L") of pop-out module 490 may be W=5-50 mm, L=5-50 mm and preferably W=25-35 mm, L=25-35 mm.

Figure 4F:
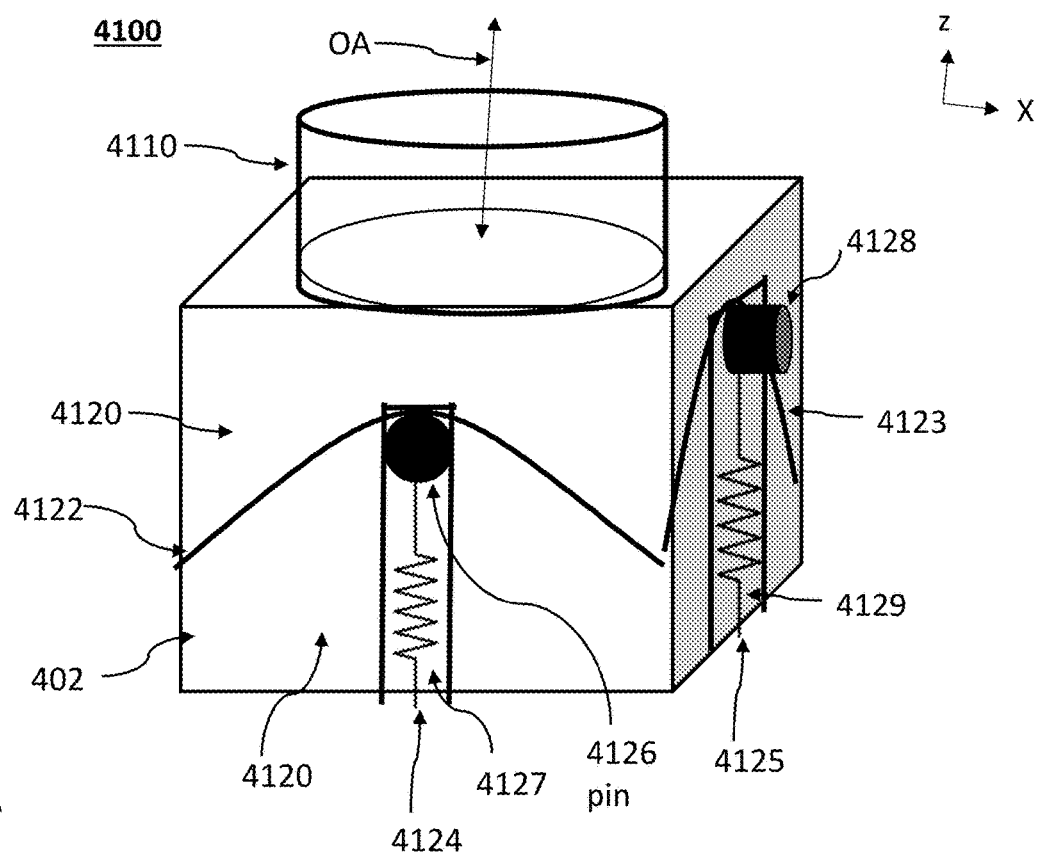
FIG. 4F shows an embodiment of a pop-out module including a fourth SMA wire example disclosed herein in a pop-out state.
Figure 4G:
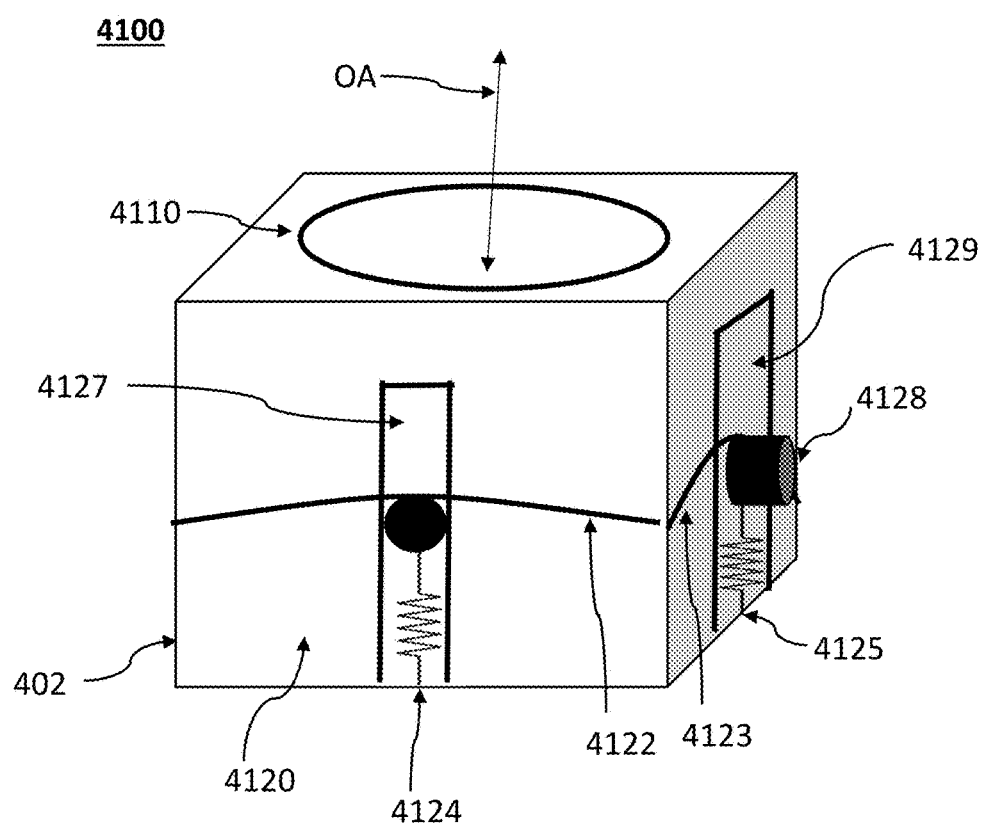
FIG. 4G shows the pop-out module of FIG. 4F in a collapsed state.

FIG. 4F shows in perspective and in a pop-out state an embodiment of a pop-out module numbered 4100 that includes a fourth SMA wire pop-out actuator 4120 disclosed herein. FIG. 4G shows pop-out module 4100 in a collapsed state. SMA wire pop-out actuator 4120 includes a first SMA wire 4122, a second SMA wire 4123, a first regular spring 4124 and a second regular spring 4125. First regular spring 4124 is fixedly coupled to a first pin 4126 and second regular spring 4125 is fixedly coupled to a second pin 4128. First pin 4126 and second pin 4128 are confined in a first guiding rail 4127 and a second guiding rail 4129 respectively, so that they can move along the z-axis only (parallel to the lens OA). First pin 4126 and second pin 4128 are fixedly coupled to a pop-out mechanism 4110, which is configured to pop-out and collapse a pop-out module numbered 4100 based on a movement actuated by SMA wire pop-out actuator 4120. First regular spring 4124 and second regular spring 4125 may have an identical spring constants k and are selected so that they push first pin 4126 and second pin 4128 upwards, i.e. towards more positive z-values. SMA wire 4122 and SMA wire 4123 may be selected so that $E_{hot}>k>E_{cold}$ is fulfilled.

Collapsing Pop-Out Module 4100—Switching from a Pop-Out to a Collapsed State

SMA wire 4122 and SMA wire 4123 are heated. The force exercised by SMA wire 4122 and SMA wire 4123 ($\sim E_{hot}$) overcomes the force exercised by spring 4124 and spring 4125 ($\sim k$). This causes a contraction of spring 4124 and spring 4125 and a linear movement of first pin 4126 and second pin 4128 downwards, i.e. towards more negative z-values. A locking mechanism may keep pop-out mechanism 4110 in the collapsed state.

Collapsing Pop-Out Module 4100—Switching from a Collapsed to a Pop-Out State

SMA wire 4122 and SMA wire 4123 are not heated. The force exercised by spring 4124 and spring 4125 ($\sim k$) overcomes the force exercised by SMA wire 4122 and SMA wire 4123 ($\sim E_{hot}$). This causes an expansion of spring 4124 and spring 4125 and a linear movement of first pin 4126 and second pin 4128 upwards, i.e. towards more positive z-values. A locking mechanism may keep pop-out mechanism 4110 in the pop-out state. Here, one may speak of an "antagonistic actuator using two SMA wires and two regular springs".

Figure 5A:
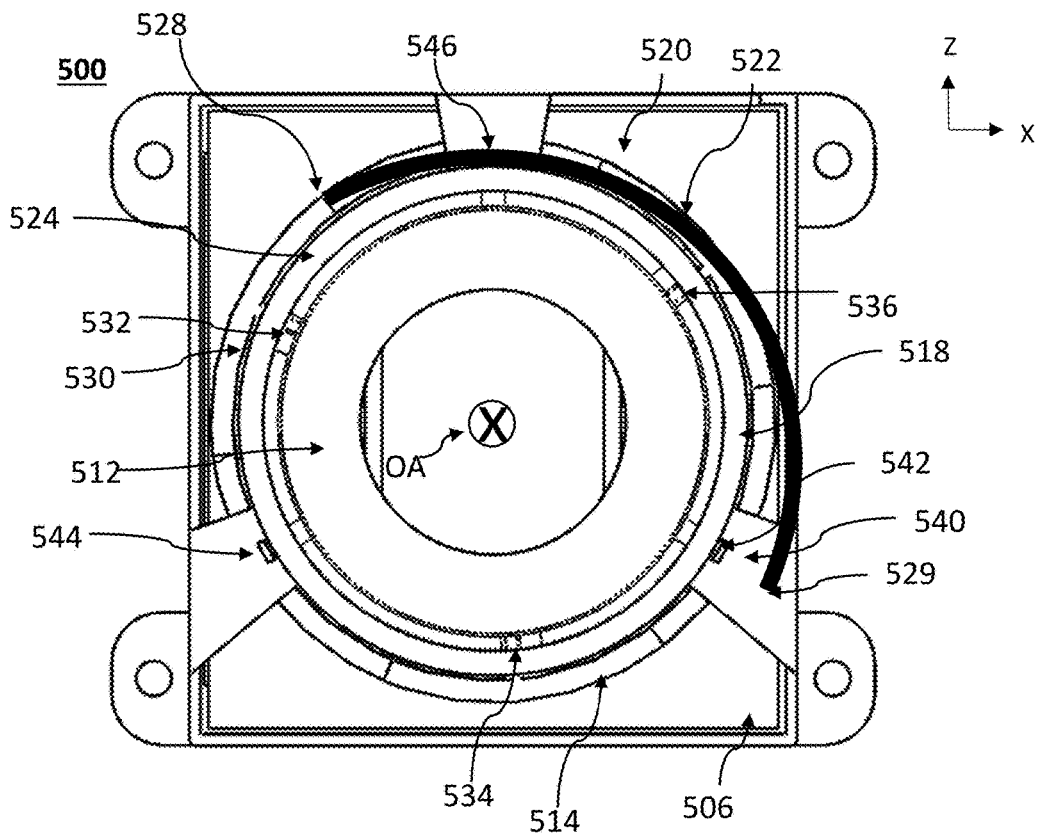
FIG. 5A shows in a perspective view another embodiment of a pop-out module including a fifth SMA spring example disclosed herein.
Figure 5B:
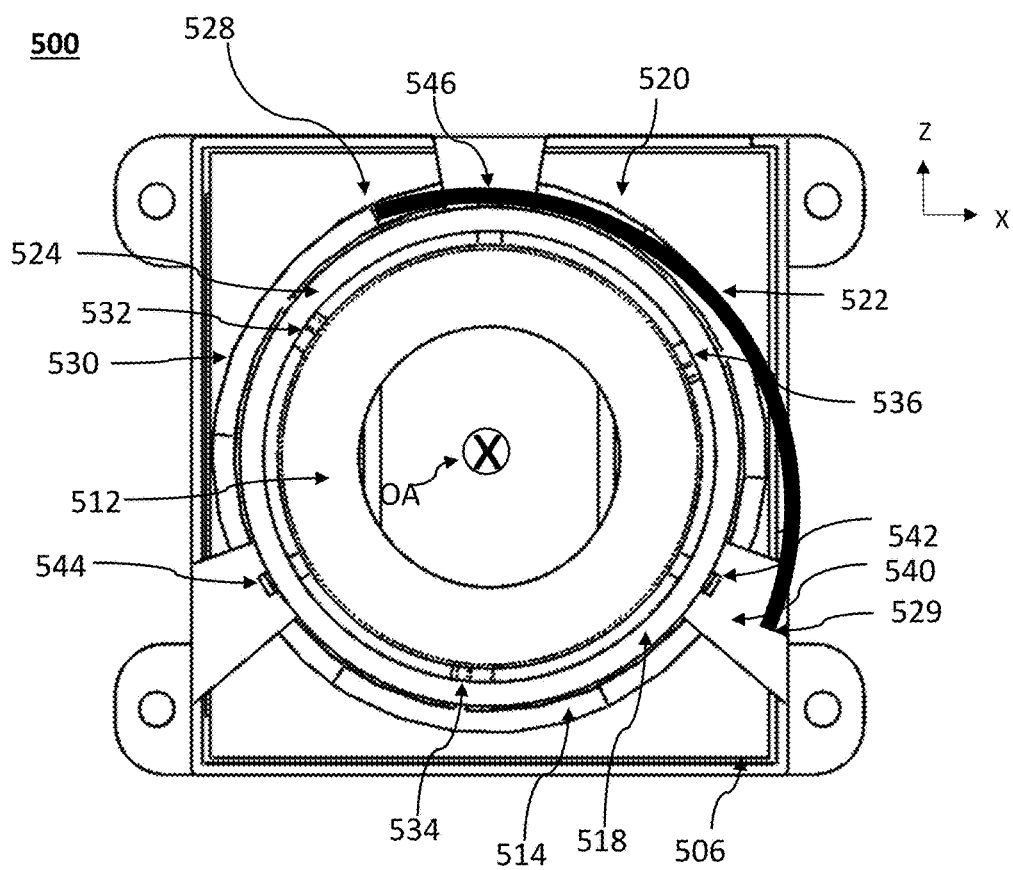
FIG. 5B shows the pop-out module of FIG. 5A in a collapsed state.

FIG. 5A shows in top view and in a pop-out state an embodiment of a pop-out module numbered 500 that includes a fifth SMA wire pop-out actuator 520 disclosed herein. FIG. 5B shows pop-out module 500 in a top view in a collapsed state. Pop-out module 500 includes a housing 506, a pop-out mechanism 510, and a SMA wire pop-out actuator 520 disclosed herein including a SMA wire 522. Pop-out mechanism 510 includes a lens carrier 512, a pin ring 514 and a locking ring 518, an angled pin-groove mechanism 530 formed by a first pin-groove pair 532, a second pin-groove pair 534 and a third pin-groove pair 536, and a guiding mechanism 540 formed by a first pin-groove pair 542, a second pin-groove pair 544 and a third pin-groove pair 546.

With respect to housing 506, lens carrier 512 is configured to linearly move parallel to the OA (i.e. perpendicular to the x-axis and the z-axis), pin ring 514 is configured to rotationally move in the x-z plane, and locking ring 518 does not move.

SMA wire 522 is made from a SMA material, e.g. from Nitinol. Wire 522 has two different module of elasticity that depend on the temperature of the material. Below a $T_S$ (e.g. $T_S$=50-150 degrees) wire 522 has a module of elasticity $E_{cold}$ and above $T_S$ it has a module of elasticity $E_{hot}$, wherein $E_{hot} < E_{cold}$. Together with a return spring having a spring constant k (not shown), SMA wire 522 is used for rotational actuation of pin ring 514. The return spring may be a regular spring, i.e. a spring not made from a SMA material. Wire 522 is fixedly attached to a housing 506 and to pin ring 514. Electrical contacts are provided at contact points 528 (for contact to pin ring 514) and 529 (for contact to housing 506) for heating wire 522 by electrical resistance heating. SMA wire 522 may have a diameter between 0.025-0.5 mm, preferably between 0.05-0.15 mm. A combination of material and wire diameter is selected so that it fulfills $E_{hot} > k > E_{cold}$. Contact point 528 is a moving electrical contact point. When pop-out module 500 is in a pop-out or collapsed state, a locking mechanism (not shown) locks the camera state. In other embodiments, not a single SMA wire like SMA wire 522 is used, but a plurality of SMA wires, e.g. 2-6 SMA wires. Using a plurality of SMA wires may be beneficial, as it allows for applying stronger forces and using smaller diameter for each single SMA wire. This reduces the heating and/or cooling time, i.e. the time it takes the SMA wire to heat up to a wire temperature $T > T_S$ and/or to cool down to a wire temperature $T < T_S$, so that it is functional as described below in shorter timeframes.

"Accuracy tolerances" refer here to a maximum variation of the distances between optical elements and between mechanical elements. "Repeatability tolerances" refer here to a maximum variation of the distances between optical elements and between mechanical elements in different pop-out cycles, i.e. the capability of the mechanical and optical elements to return to their prior positions after one or many pop-out (or collapse) events. Tolerances in the Y direction may be less important, as variations in Y can be compensated by optical feedback and moving the lens for auto-focus.

Collapsing Pop-Out Module 500—Switching from a Pop-Out to a Collapsed State

The locking mechanism is dis-activated and SMA wire 522 is heated. As the module of elasticity changes to $E_{hot} > k$, the force exercised by SMA wire 522 (~$E_{hot}$) overcomes the force exercised by the return spring (~k), which causes a clock-wise movement of pin ring 514 with magnitude Δs, bringing pop-out module 500 in a collapsed state. Δs may be in the range Δs=1-15 mm, preferably Δs=1-5 mm.

Pop-Out Module 500—Switching from a Collapsed to a Pop-Out State

The locking mechanism is dis-activated. As $k > E_{cold}$, the force exercised by return spring (~k) overcomes the force exercised by SMA wire 522 (~$E_{cold}$), which causes a counter-clock-wise movement of pin ring 514 with magnitude Δs, bringing pop-out module 500 in a pop-out state.

In some embodiments and with respect to the springs involved, one may operate pop-out module 500 in a reverse order, meaning that the return spring collapses pop-out module 500, and SMA wire 522 pops out pop-out module 500.

Figure 6A:
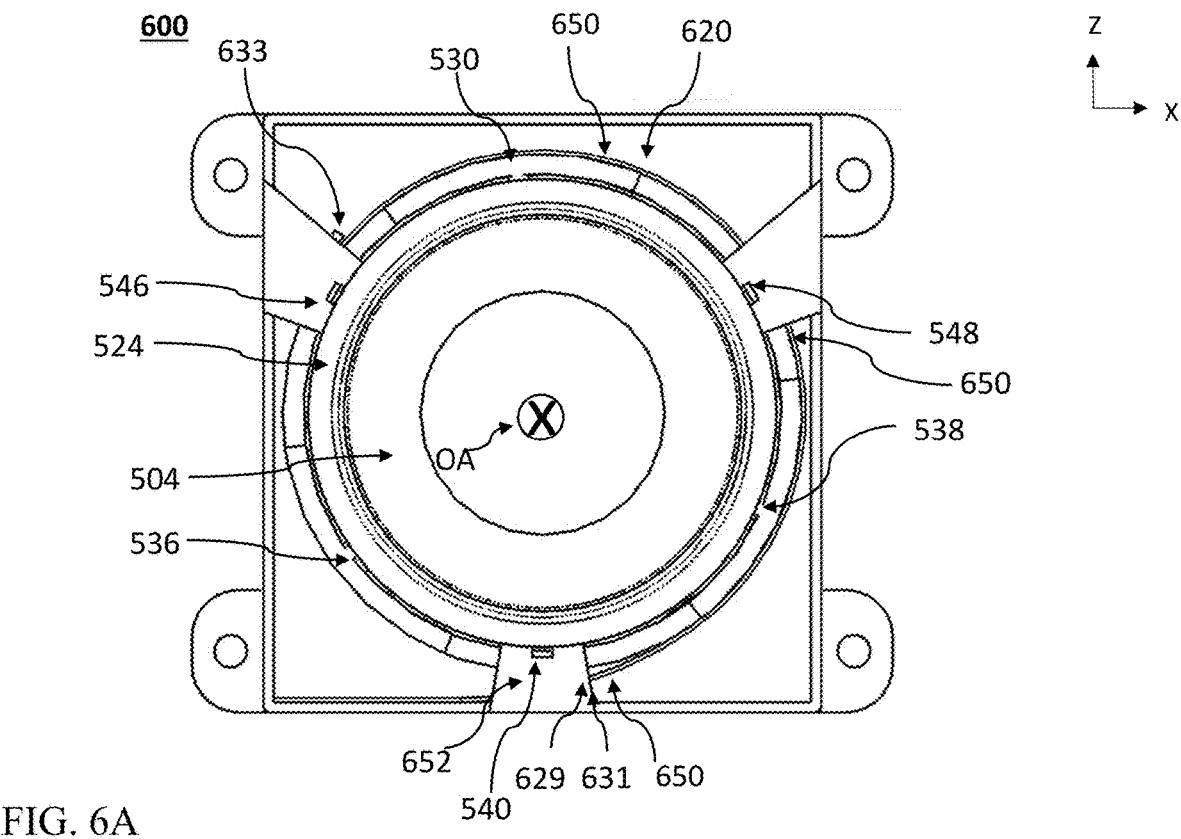
FIG. 6A shows in a top view another embodiment of a pop-out module including a sixth SMA wire example disclosed herein in a pop-out state.
Figure 6B:
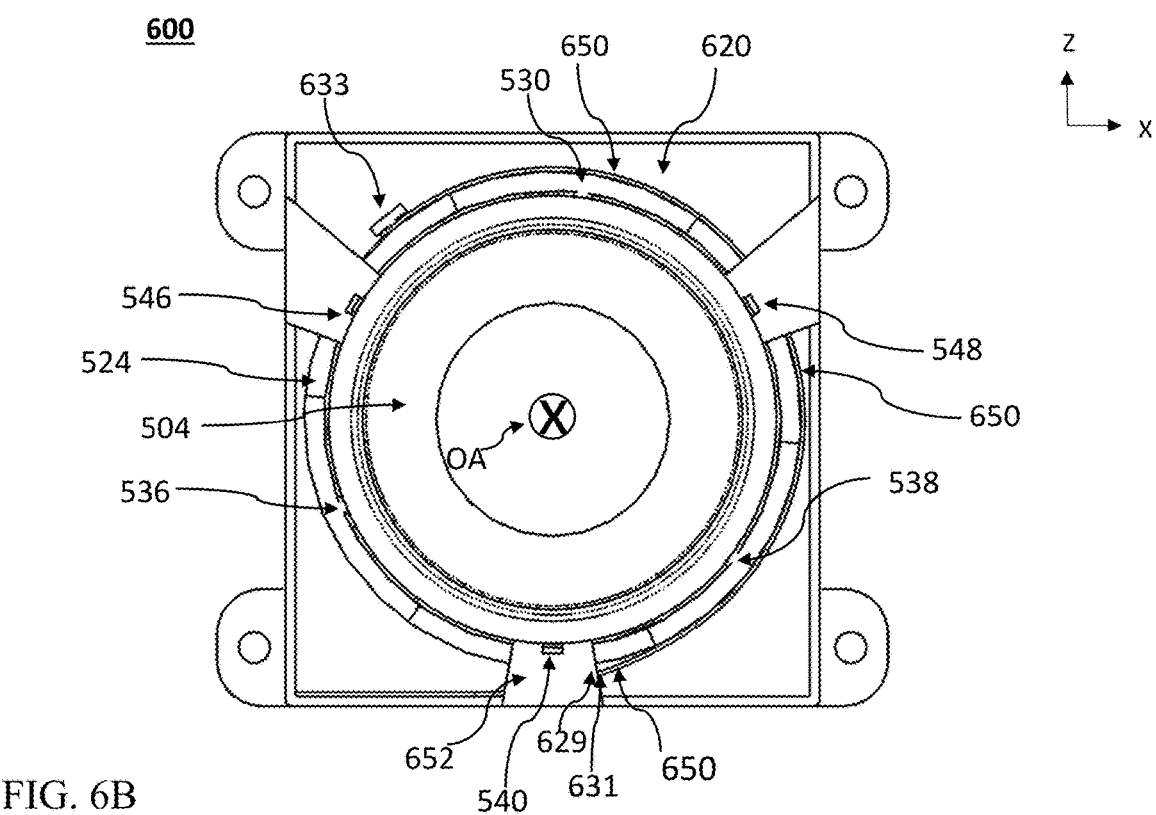
FIG. 6B shows the pop-out module of FIG. 6A in a collapsed state.
Figure 6C:
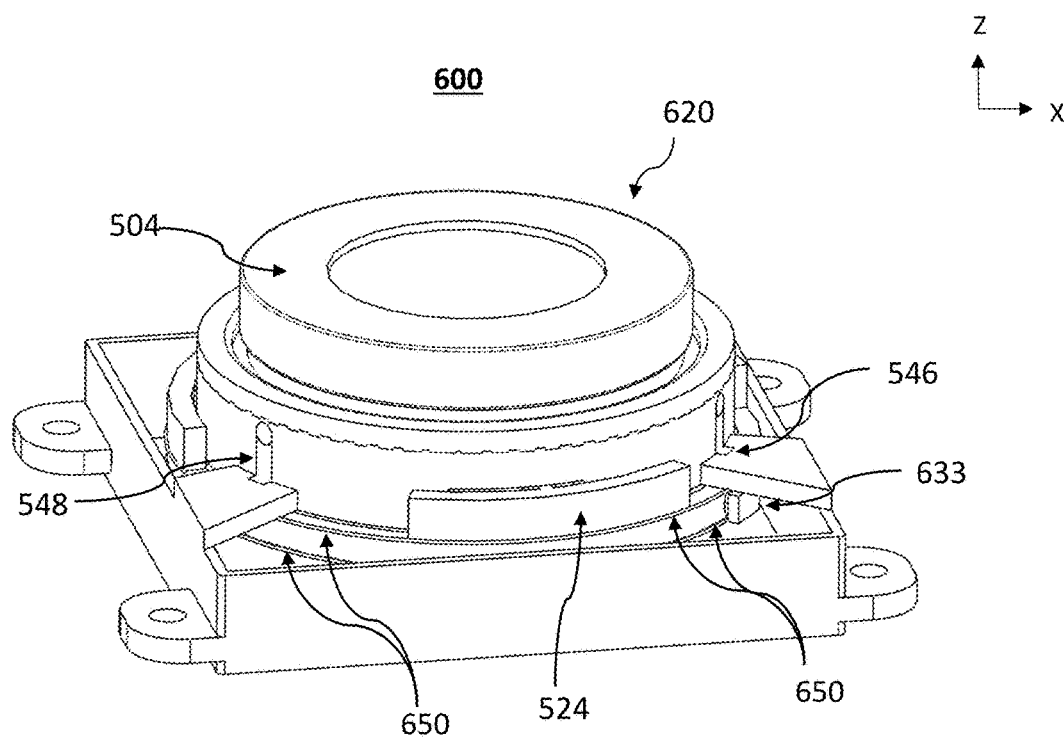
FIG. 6C shows the pop-out module of FIG. 6A in a perspective view.
Figure 6D:
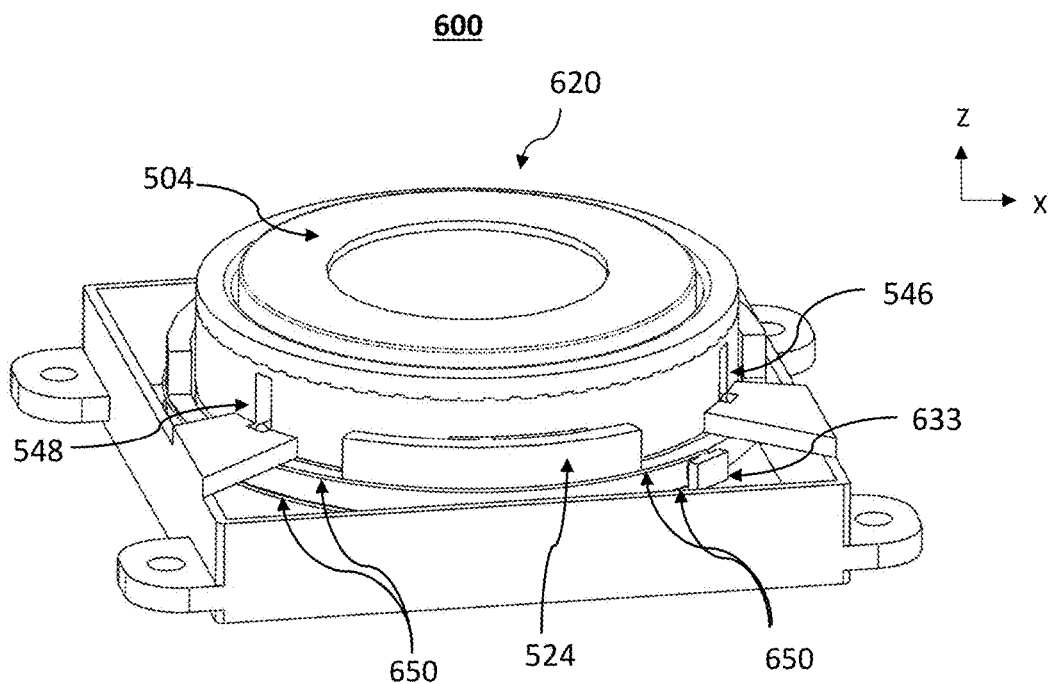
FIG. 6D shows the pop-out module of FIG. 6B in a perspective view.
Figure 6E:
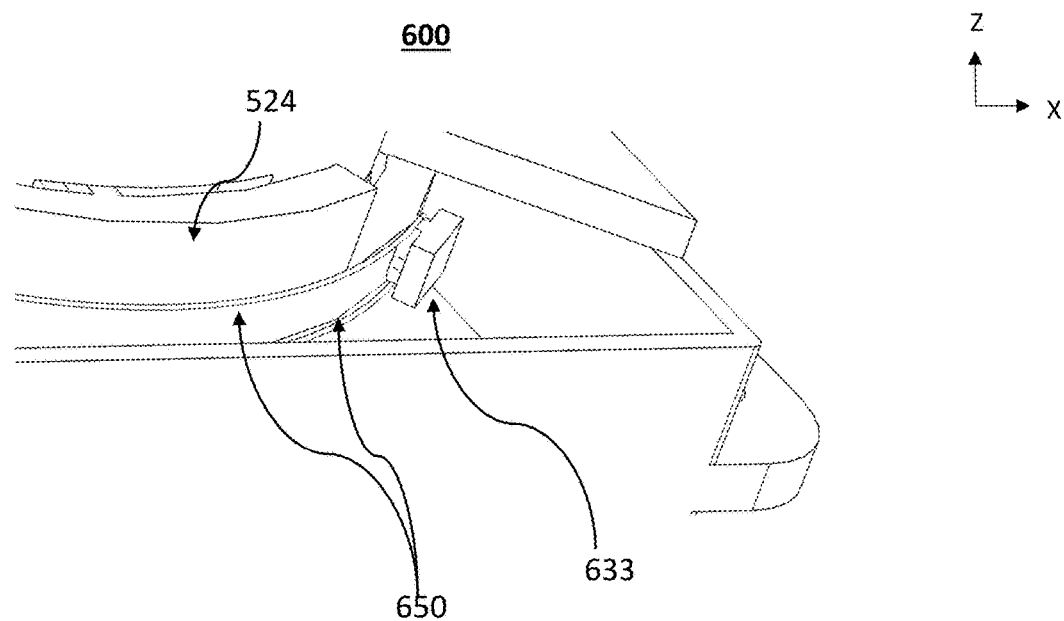
FIG. 6E shows some enlarged details from FIG. 6C.
Figure 6F:
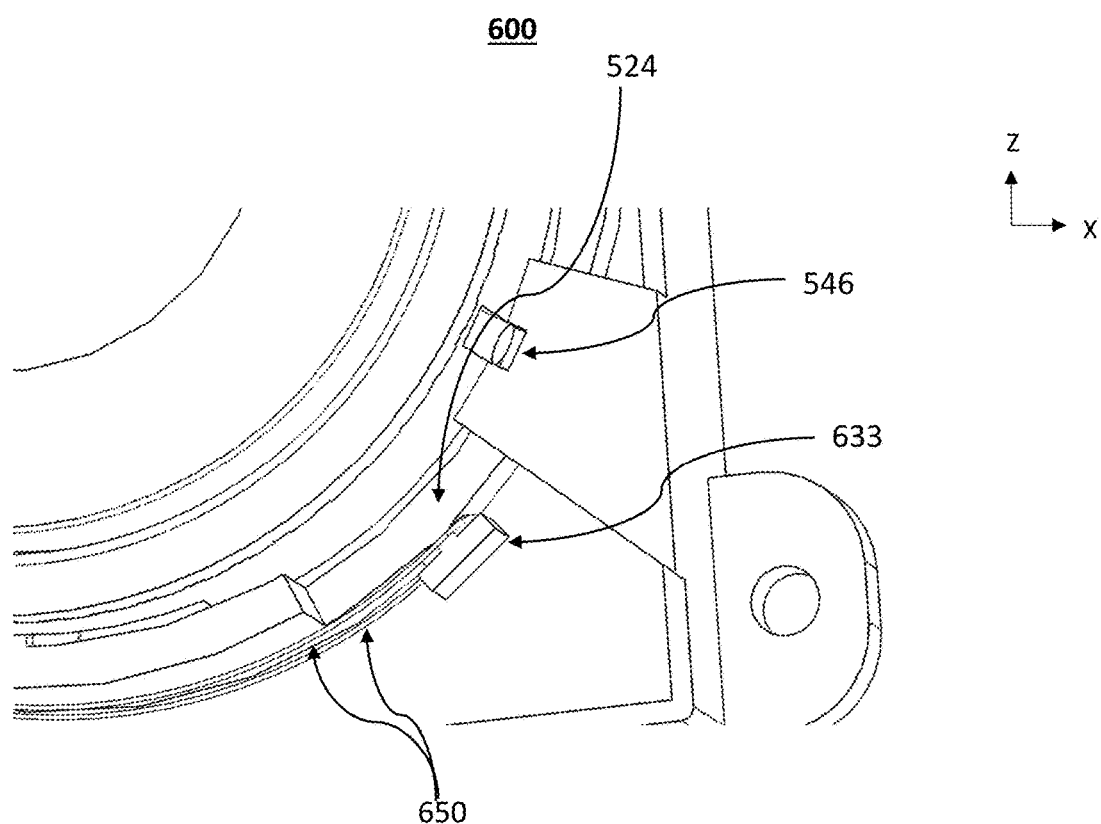
FIG. 6F shows some enlarged details from FIG. 6D.

FIG. 6A shows another embodiment of a pop-out module numbered 600 that includes a sixth SMA wire pop-out actuator 620 disclosed herein in a pop-out state in a top view. Except for a different SMA wire, pop-out module 600 is identical with the pop-out module 500' of FIGS. 5E and 5F, except that module 600 include a different SMA wire 650. FIG. 6B shows pop-out module 600 in a collapsed state in the same view as FIG. 6A. FIG. 6C shows pop-out module 600 in a pop-out state in a perspective view. FIG. 6D shows pop-out module 600 in a collapsed state in a perspective view. FIG. 6E shows pop-out module 600 in a pop-out state in an enlarged perspective view. FIG. 6F shows pop-out module 600 in a collapsed state in an enlarged perspective view.

Sixth SMA wire pop-out actuator 620 includes a SMA wire 650 made e.g. from Nitinol. Below a $T_S$ (e.g. $T_S$=50-150 degrees), wire 650 has a module of elasticity $E_{cold}$ and above $T_S$ it has a module of elasticity $E_{hot}$, wherein $E_{hot} > E_{cold}$. Together with a return spring having a spring constant k and being a regular spring not made from a SMA material (not shown), wire 650 is used for rotational actuation of pin ring 524.

Wire 650 is fixedly attached to a base 652 and is held taut by a hook 633. Hook 633 is part of pin ring 524. Wire 650 is folded at hook 633. Hook 633 and wire 650 are visible in FIGS. 6C-6F. A first end of wire 650 is electrically connected to a first contact point 629 having a first electric polarity and is folded around hook 633. A second end of wire 650 is electrically connected to a second contact point 631 having a second electric polarity. The electrical contacts are provided for heating wire 650 by electrical resistance heating. SMA wire 650 may have a diameter between 0.025-0.5 mm, preferably between 0.05-0.15 mm. Contact points 629 and 631 are non-moving (fixed) electrical contact points. A combination of material and wire diameter is selected so that $E_{hot} > k > E_{cold}$ is fulfilled. When pop-out module 600 is in a pop-out or a collapsed state, a locking mechanism (not shown) locks the camera in the pop-out or the collapsed state respectively.

Collapsing Pop-Out Module 600—Switching from a Pop-Out to a Collapsed State

The locking mechanism is dis-activated and SMA wire 650 is heated. As $E_{hot} > k$, the force exercised by wire 650 (~$E_{hot}$) overcomes the force exercised by the return spring HO, which causes a clock-wise movement of pin ring 524 with magnitude Δs, bringing pop-out module 600 in a collapsed state. Δs may be in the range Δs=1-10 mm, preferably Δs=1-5 mm.

Pop-Out Module 600—Switching from a Collapsed to a Pop-Out State

The locking mechanism is dis-activated. Since $k > E_{cold}$, the force exercised by return spring (~k) overcomes the force exercised by wire 650 (~$E_{cold}$), which causes a counter-clock-wise movement of pin ring 524 with magnitude Δs, bringing pop-out module 600 in a pop-out state. Here, this is referred to as an "antagonistic actuator using one SMA wire and one or more regular springs".

In other embodiments and e.g. for reducing force requirements, one may use a second SMA wire like wire 650 instead of the return spring. In this case, one may apply an electrical current to the second SMA wire for switching from a collapsed to a pop-out state. Here, this is referred to as a "first antagonistic SMA wire actuator using two SMA wires".

The description of the following embodiments is made with reference to both FIGS. 7A-7B and 9A-9B.

Figure 7A:
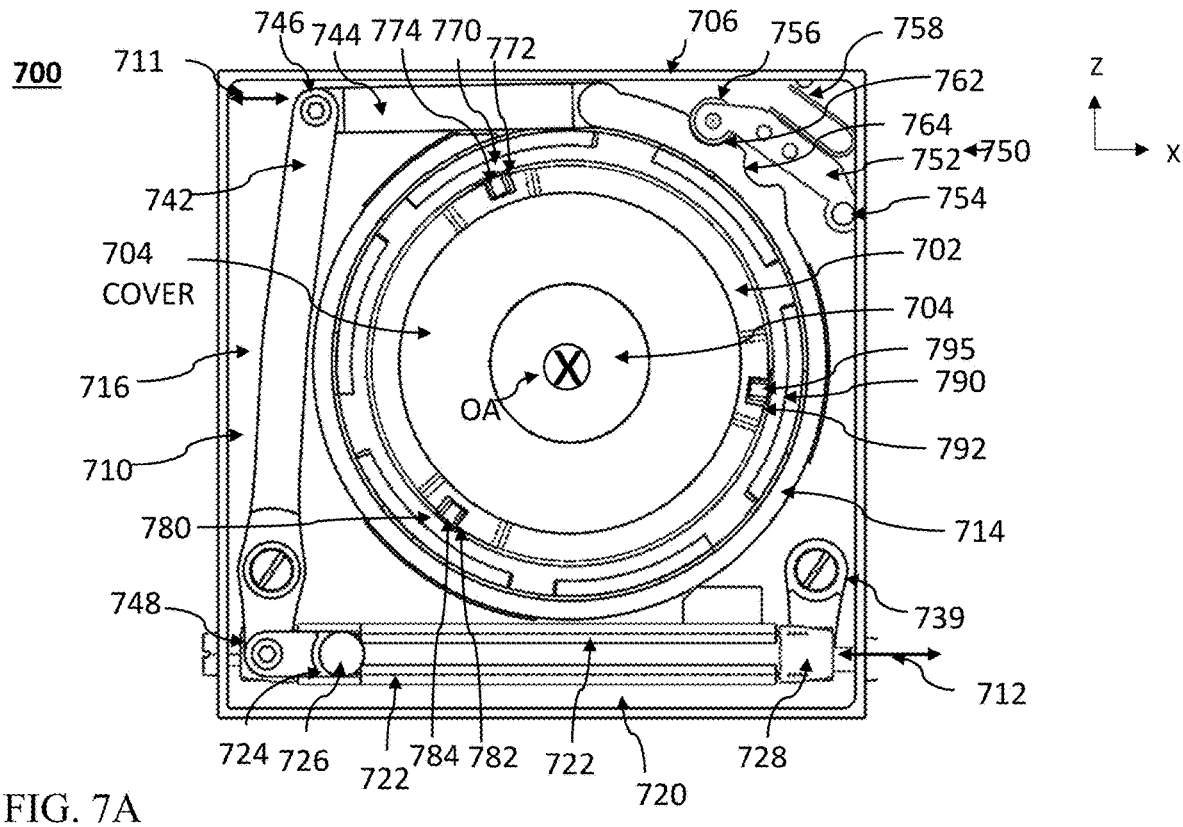
FIG. 7A shows yet another embodiment of a pop-out module including a seventh SMA wire example disclosed herein and a first locking mechanism disclosed herein in a pop-out state in a top view.
Figure 7B:
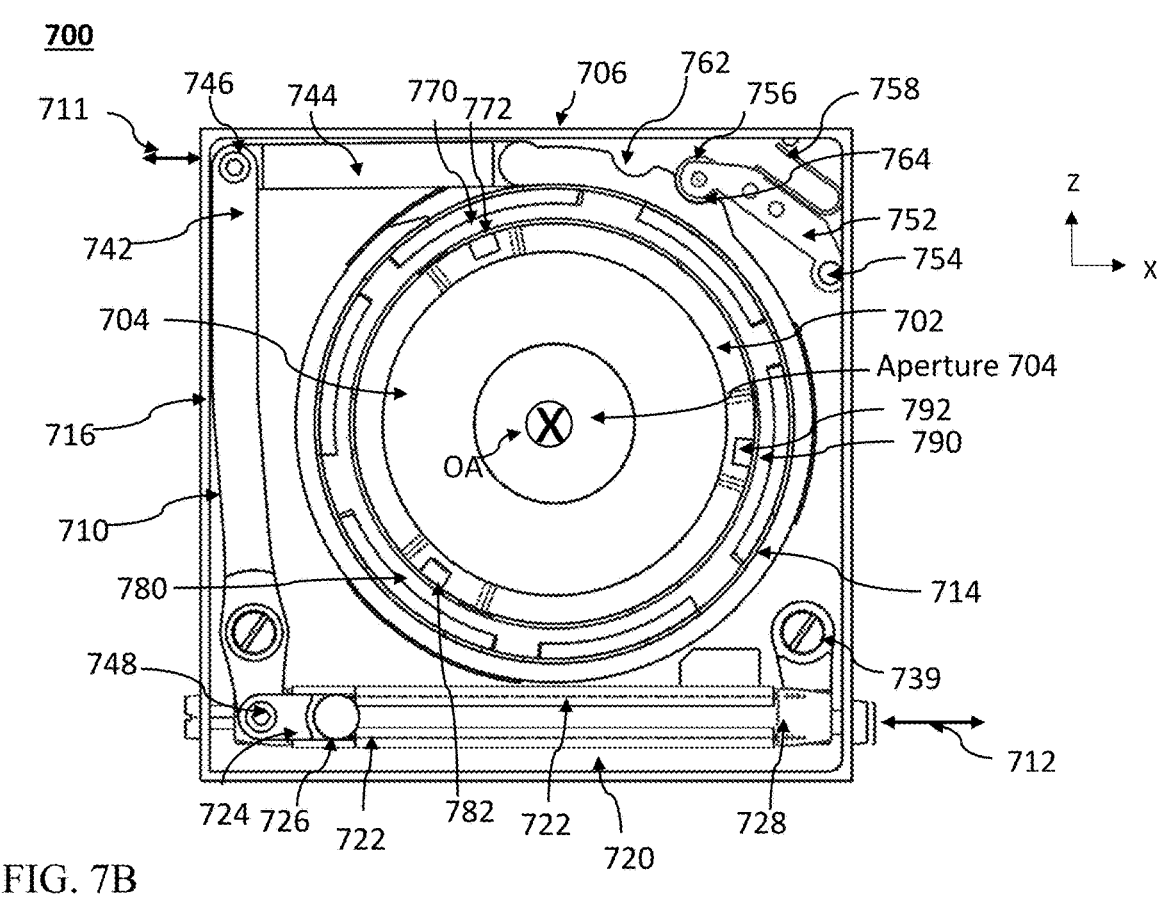
FIG. 7B shows the pop-out module of FIG. 7A in a collapsed state in the same top view.

FIG. 7A shows yet another embodiment of a pop-out module numbered 700 that includes a seventh SMA wire pop-out actuator 720 and a first locking mechanism 750 disclosed herein in a pop-out state in a top view. FIG. 7B shows pop-out module 700 in a collapsed state in the same view as FIG. 7A. First locking mechanism 750 is referred to as a "mechanical locking mechanism".

Pop-out module 700 includes a lens carrier 702 carrying a lens (not shown) which forms an aperture of a pop-out camera including pop-out module 700, a housing 706, a top cover 704 and a pop-out mechanism 710. Pop-out mechanism 710 includes lens carrier 702, a pin ring 714, a transmission module 716, a SMA actuator 720 (FIG. 9A), and a first locking mechanism 750 disclosed herein.

Seventh SMA wire pop-out actuator 720 includes a top SMA wire 722 that is folded at a turning point 724 around a top pin 726. Two ends of top SMA wire 722 (FIG. 9A) are fixedly coupled and electrically connected to a top contact pad 728.

Figure 9A:
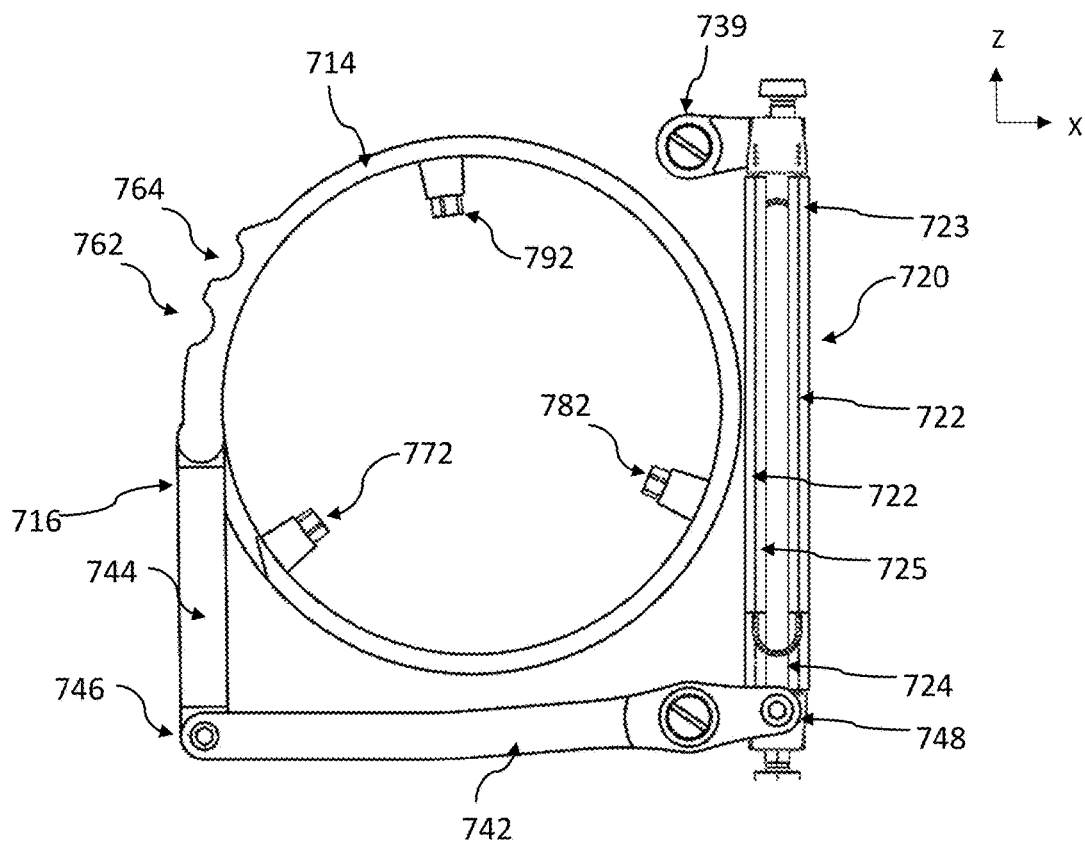
FIG. 9A shows the pin ring and a transmission module of the pop-out module of FIGS. 7A-7B in a pop-out state in a top view.
Figure 9B:
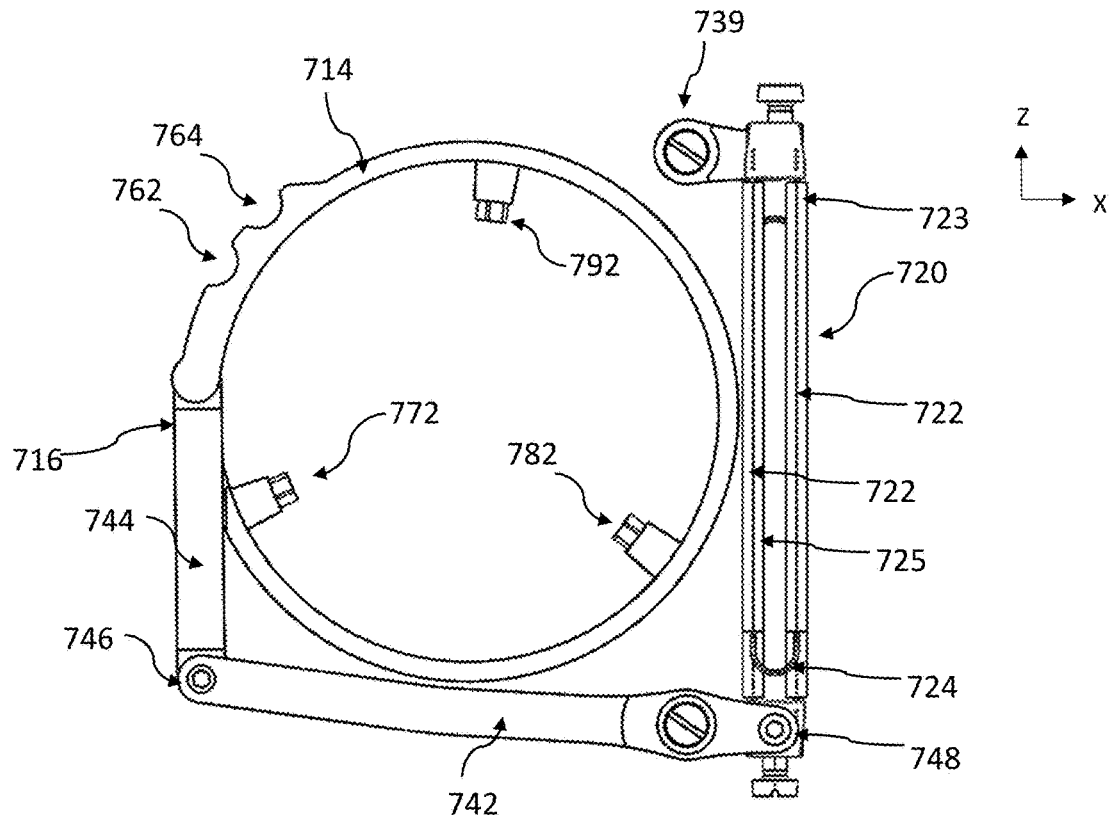
FIG. 9B shows the pin ring and the transmission module of FIG. 9A in a collapsed state in a top view.
Figure 9C:
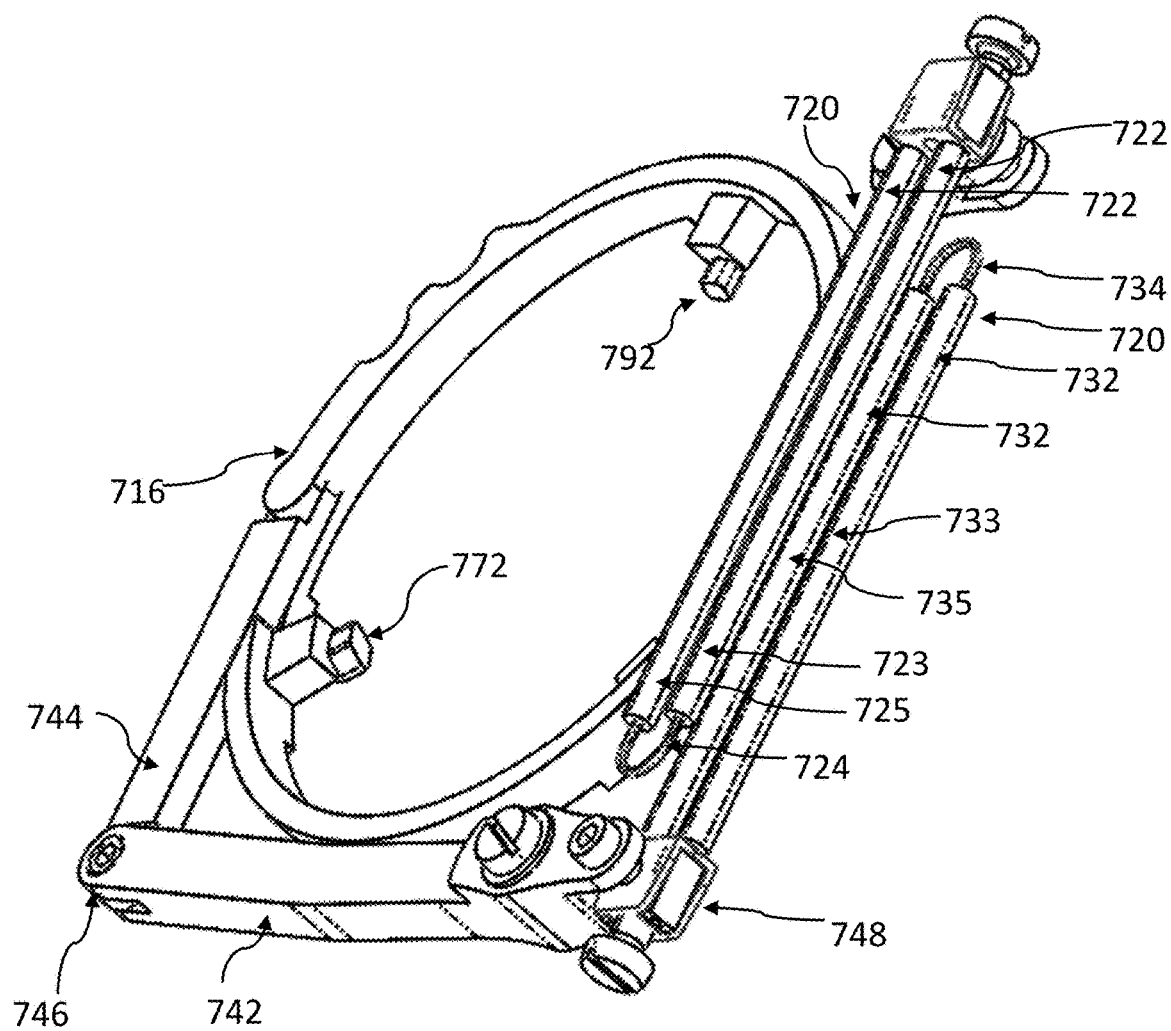
FIG. 9C shows the pin ring and transmission module of FIGS. 9A-9B in a pop-out state in a perspective view.

Not visible here, but visible in FIG. 9C, SMA actuator 720 includes also a bottom SMA wire 732 guided (or folded) at a turning point 734 around a bottom pin (not shown), two ends of bottom SMA wire 732 being fixedly coupled and electrically connected to a bottom contact pad 738. SMA actuator 720 can move parallel to the x-axis (in the coordinate system shown in FIGS. 7A, 7B, 9A, 9B) via rotation around a pivot point 739. In the example shown, SMA wire 722 and 732 may be made from the same material and may have an identical wire diameter. For example, MA wires 722 and 732 may be made from Nitinol. Below a $T_S$ (e.g. $T_S$=50-150 degrees), wire 722 and wire 732 have a module of elasticity $E_{cold}$ and above $T_S$ it has a module of elasticity $E_{hot}$, wherein $E_{hot}>E_{cold}$. SMA wire 722 and 732 may have an identical diameter between 0.025-1 mm, preferably between 0.1-0.3 mm, and an identical length of 1 mm-50 mm. In other examples, SMA wire 722 may have a different diameter and/or a different length than SMA wire 732.

SMA wires 722 and 732 supply the force to rotate pin ring 714, which switches a pop-out camera including pop-out module 700 from a pop-out to a collapsed state and vice versa.

Transmission module 716 includes a first transmission rod 742 and a second transmission rod 744 connected via a pivot point 746. Transmission rod 744 is connected to SMA actuator 720 via a pivot point 748.

First locking mechanism 750 includes a locker 752 that can rotate around pivot point 754. Locker 752 has a circular margin 756 that enters a first dent 762 included in pin ring 714. This entering locks pop-out module 700 in a pop-out state (see FIG. 7A). For locking pop-out module 700 in a collapsed state (see FIG. 7B), circular margin 756 enters a second dent 764 included in pin ring 714. In particular, the term "locking" as applied here to pop-out module 700 means that no power is consumed while pop-out module 700 is in the pop-out state and in the collapsed state respectively, which is desired for realizing a pop-out camera that consumes a relatively low amount of power. A spring 758 that is fixedly coupled to housing 706 at a first side and fixedly coupled to locker 752 at a second side exercises a restoring force that pushes circular margin 756 into first dent 762 or second dent 764 respectively.

Pop-out mechanism 710 includes also three (first, second and third) angled pin-groove mechanisms 770, 780 and 790. First pin-groove mechanism 770 includes a groove 772 and a pin 774. Second pin-groove mechanism 780 includes a groove 782 and a pin 784. Third pin-groove mechanism 790 includes a groove 792 and a pin 794. Pins 774, 784 and 794 are parts of (or fixedly coupled with) pin ring 714. Grooves 772, 782 and 792 are formed in lens carrier 702. Angled pin-groove mechanisms 770, 780 and 790 translate the circular motion of pin ring 714 in the x-z plane into a linear motion of lens carrier 702 along the y-axis, as shown in FIGS. 8A-8B.

Arrows 711 and 712 mark a linear movement of transmission rod 744, SMA actuator 720 and first transmission rod 742 respectively.

SMA actuator 720 is positioned only at one side of pop-out module 700. Transmission module 716 acts as a lever. Transmission module 716 is positioned at two sides of pop-out module 700. A lever ratio may be about 1:4 as shown. A lever ratio of e.g. 1:4 means that a movement by 1 unit (e.g. mm) of the short arm of the lever translates into a movement by 4 units (e.g. mm) of the long arm of the lever. In other examples, a lever ratio may be 1:10-1:2.

Figure 8A:
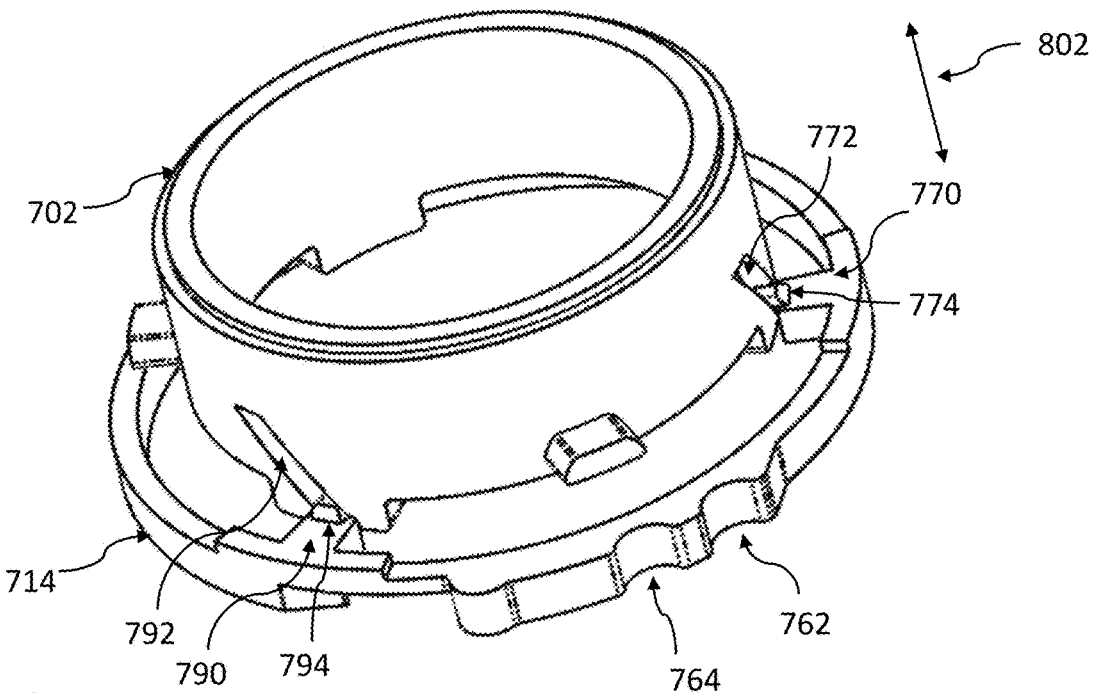
FIG. 8A shows a lens carrier and a pin ring of the pop-out module of FIG. 7A in a pop-out state in a perspective view.
Figure 8B:
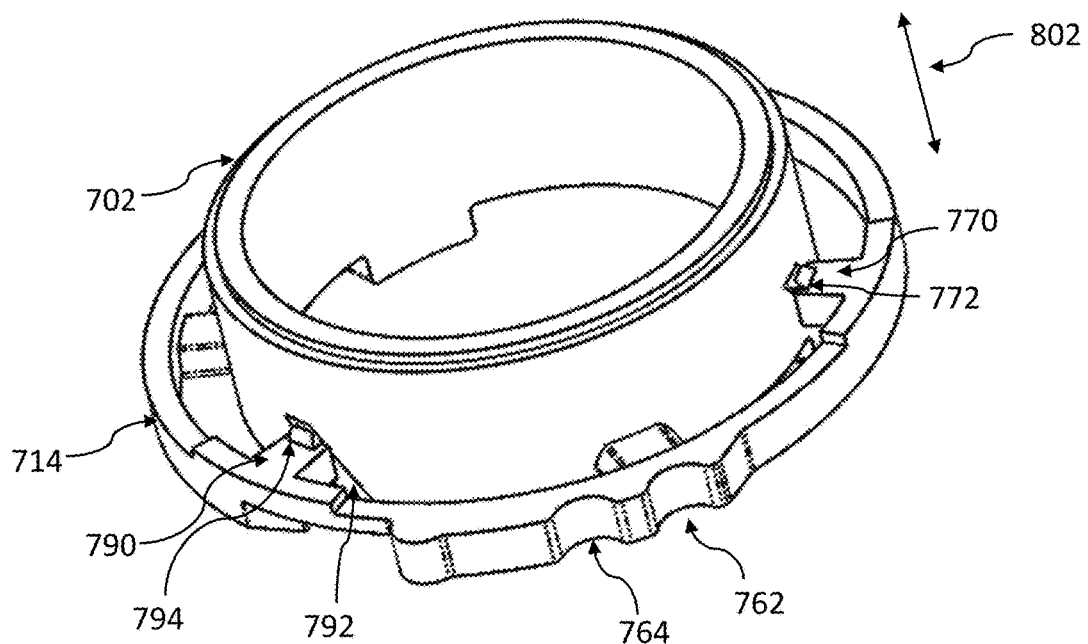
FIG. 8B shows the lens carrier and pin ring of FIG. 8A in a collapsed state in a perspective view.

FIG. 8A shows lens carrier 702 and pin ring 714 in a pop-out state in a perspective view. FIG. 8B shows lens carrier 702 and pin ring 714 of FIG. 8A in a collapsed state in a perspective view. Angled pin-groove mechanisms 770, 780 and 790 translate the circular motion of pin ring 714 in the x-z plane into a linear motion of lens carrier 702 along the y-axis, as shown by arrow 802, which indicates the direction of the linear motion of lens carrier 702.

FIG. 9A shows pin ring 714 and transmission module 716 in a pop-out state in a top view. FIG. 9B shows pin ring 714 and transmission module 716 of FIG. 9A in a collapsed state in a top view. Turning point 724 of SMA wire 722 is visible. SMA wire 722 is partly surrounded by a sleeve 723 and a sleeve 725. Sleeves 723 and 725 may be filled or may not be filled with a material that exhibits effective heat conductance and no electrical conductance, e.g. with a heat conductor gel, which acts as a heat sink. As shown, at positions close to turning point 724, SMA wire 722 is not surrounded by the sleeves, so that it can be folded around pin 726 (see FIG. 7A-7B).

FIG. 9C shows pin ring 714 and transmission module 716 from FIG. 9A-9B in a pop-out state in a perspective view. Here, the entire SMA actuator 720 is visible. Bottom SMA wire 732 is guided (or folded) at a turning point 734 around a bottom pin (not shown), the two ends of bottom SMA wire 732 being fixedly coupled and electrically connected to bottom contact pad 738. The dimensions and functionalities of the bottom pin are identical to the dimensions and functionalities of top pin 726. SMA wires 722 and 732 have an identical diameter and length. The folding of SMA wire 722 and SMA wire 732 is symmetric. Exemplarily for SMA wire 722, a folding of SMA wire 722 is symmetric if a length of a first section of SMA wire 722 before turning point 724 is identical to a length of a second section of SMA wire 732 after turning point 724.

Collapsing Pop-Out Module 700—Switching from a Pop-Out to a Collapsed State

SMA wire 722 is heated while SMA wire 732 is not heated. The force exercised by wire 722 ($\sim E_{hot}$) overcomes the force exercised by SMA wire 732 ($\sim E_{cold}$) since $E_{hot}>E_{cold}$. This causes a linear movement of SMA actuator 720 as shown by arrow 712. The linear movement of SMA actuator 720 is transmitted to pin ring 714, which rotates in a clockwise direction, what causes lens carrier 702 to move linearly along the y-axis by $\sim\Delta s$, bringing pop-out module 700 in a collapsed state. $\Delta s$ may be in the range $\Delta s$=1-15 mm, preferably $\Delta s$=1-5 mm. Circular margin 756 enters into second dent 764, locking pop-out module 700 in the collapsed state.

Popping Out Pop-Out Module 700—Switching from a Collapsed to a Pop-Out State

SMA wire 732 is heated while SMA wire 722 is not heated. Since $E_{hot}>E_{cold}$, the force exercised by wire 732 ($\sim E_{hot}$) overcomes the force exercised by SMA wire 722 ($\sim E_{cold}$), which causes a linear movement of SMA actuator 720 as shown by arrow 712. For popping out pop-out module 700, the linear movement of SMA actuator 720 is in the opposite direction than the linear movement for collapsing pop-out module 700 see above. The linear movement of SMA actuator 720 is transmitted to pin ring 714, which rotates in a counter-clockwise direction, what causes lens carrier 702 to move linearly along the y-axis by $\Delta s$, bringing pop-out module 700 to a pop-out (or operating) state. Δs may be in the range Δs=1-15 mm, preferably Δs=1-5 mm. Circular margin 756 enters into first dent 762, locking pop-out module 700 in the pop-out state.

Figure 10A:
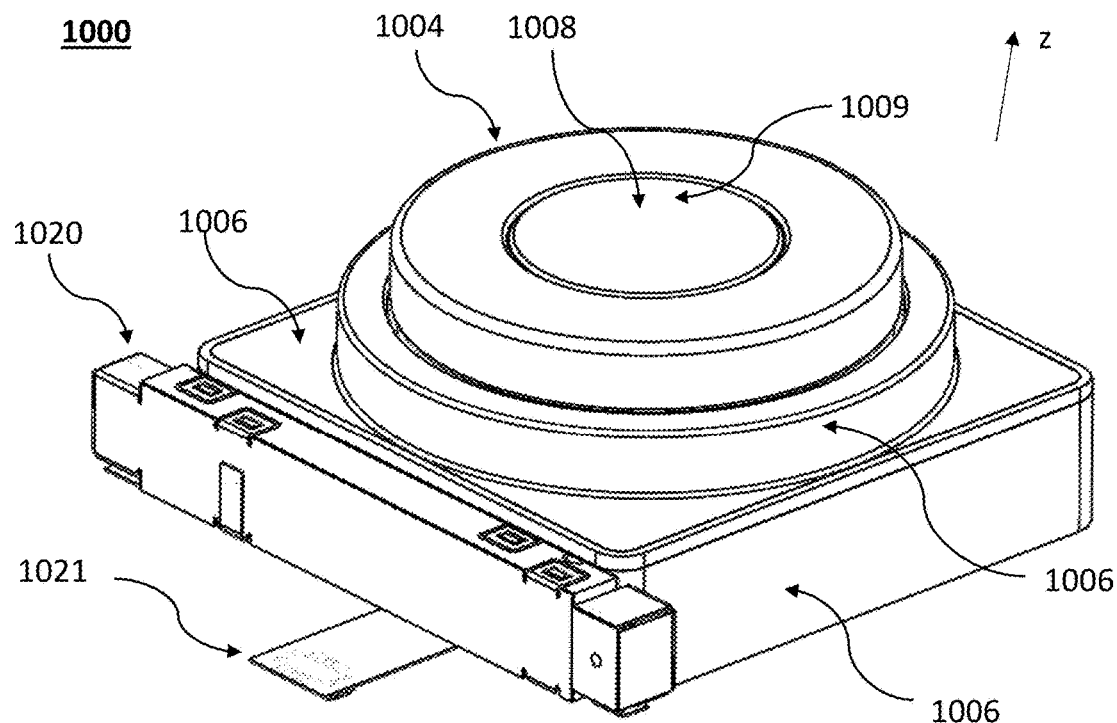
FIG. 10A shows yet another embodiment of a pop-out module including an eighth SMA wire example disclosed herein and a second locking mechanism disclosed herein in a pop-out state in a perspective view.
Figure 10B:
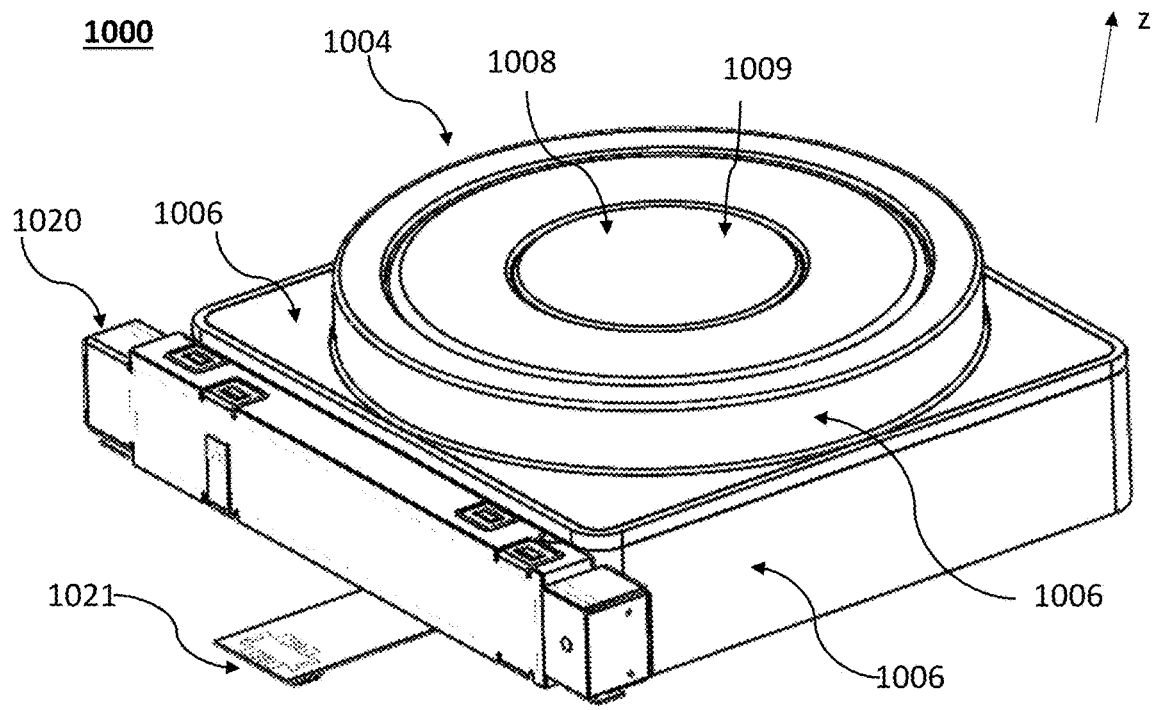
FIG. 10B shows pop-out module in a collapsed state in the same view as FIG. 10A.

FIG. 10A shows yet another embodiment of a pop-out module numbered 1000 including an eighth (8$^{th}$) SMA wire pop-out actuator 1020 disclosed herein in a pop-out state in a perspective view. FIG. 10B shows pop-out module 1000 in a collapsed state in the same view as FIG. 10A. The pop-out module together with an optics module including a collapsible pop-out lens and an image sensor form a pop-out camera. The pop-out camera is beneficial for use in a smartphone.

Pop-out module 1000 includes a lens carrier 1012 including a lens (not shown) forming an aperture 1008 of a pop-out camera including pop-out module 1000 which is covered by a glass window 1009. Pop-out module 1000 further includes a housing 1006, a top cover 1004, a pop-out mechanism 1010 and a pop-out actuator 1020 including a flex 1021. Flex 1021 includes one or more printed circuit boards (PCBs) and transmits power and control signals between pop-out module 1000 and a mobile device hosting the pop-out camera that includes pop-out module 1000.

Figure 10C:
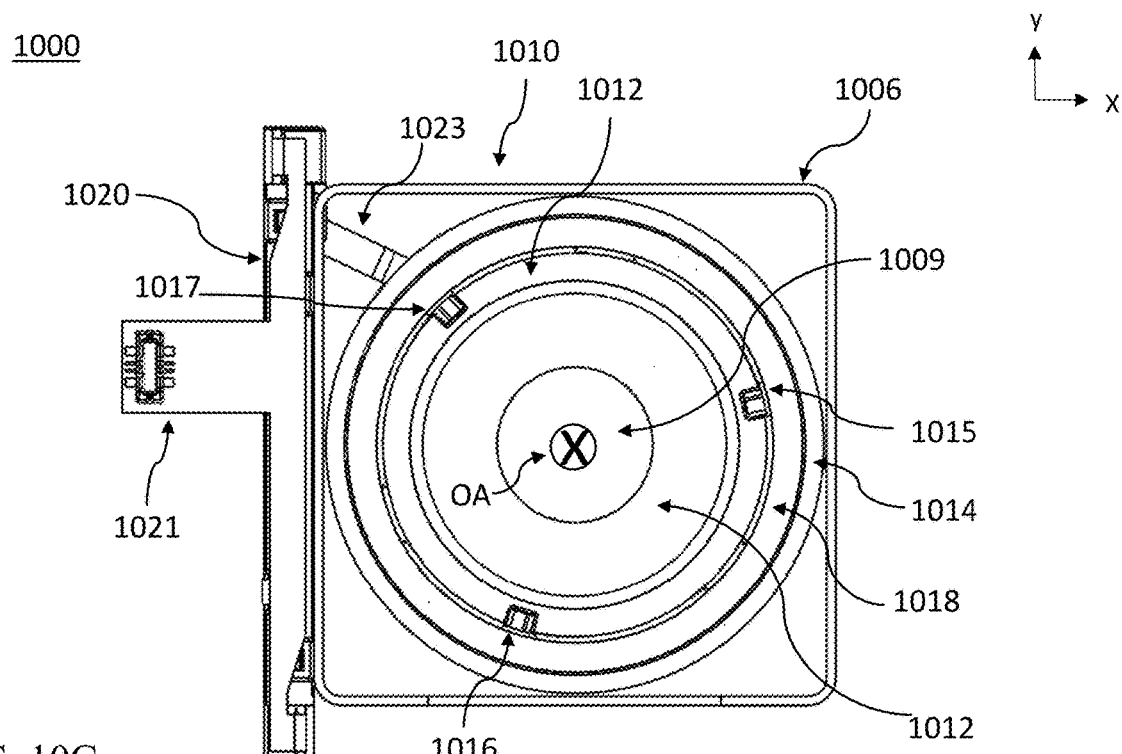
FIG. 10C shows pop-out module of FIGS. 10A-B in a pop-out state in a bottom view.
Figure 10D:
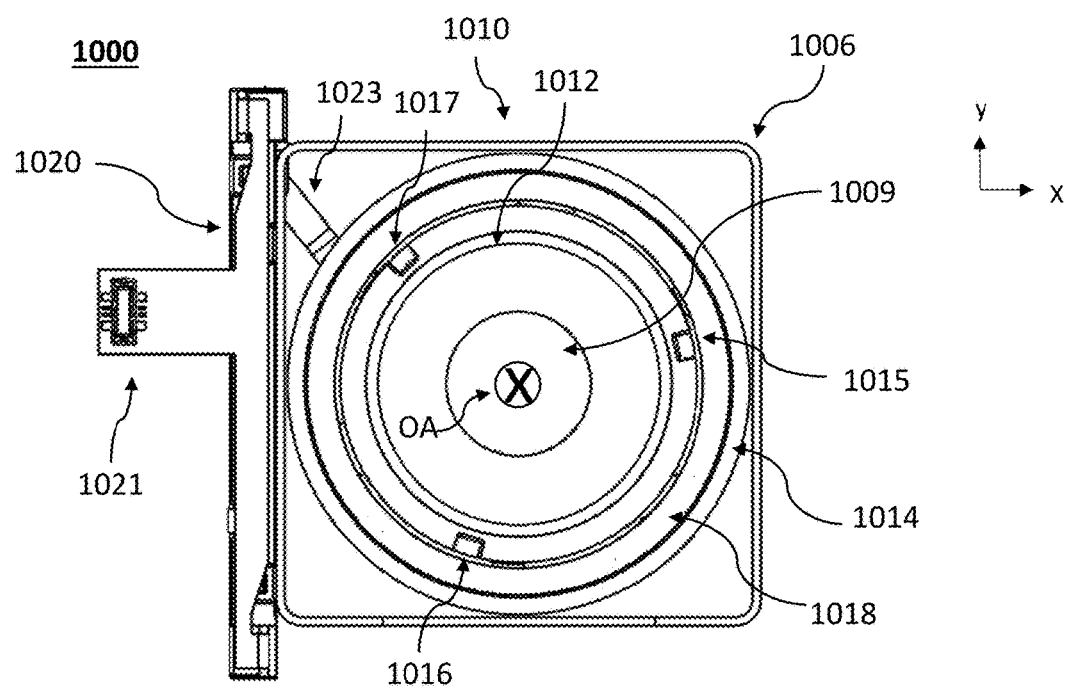
FIG. 10D shows pop-out module of FIGS. 10A-C in a collapsed state in the same view as FIG. 10C.
Figure 10E:
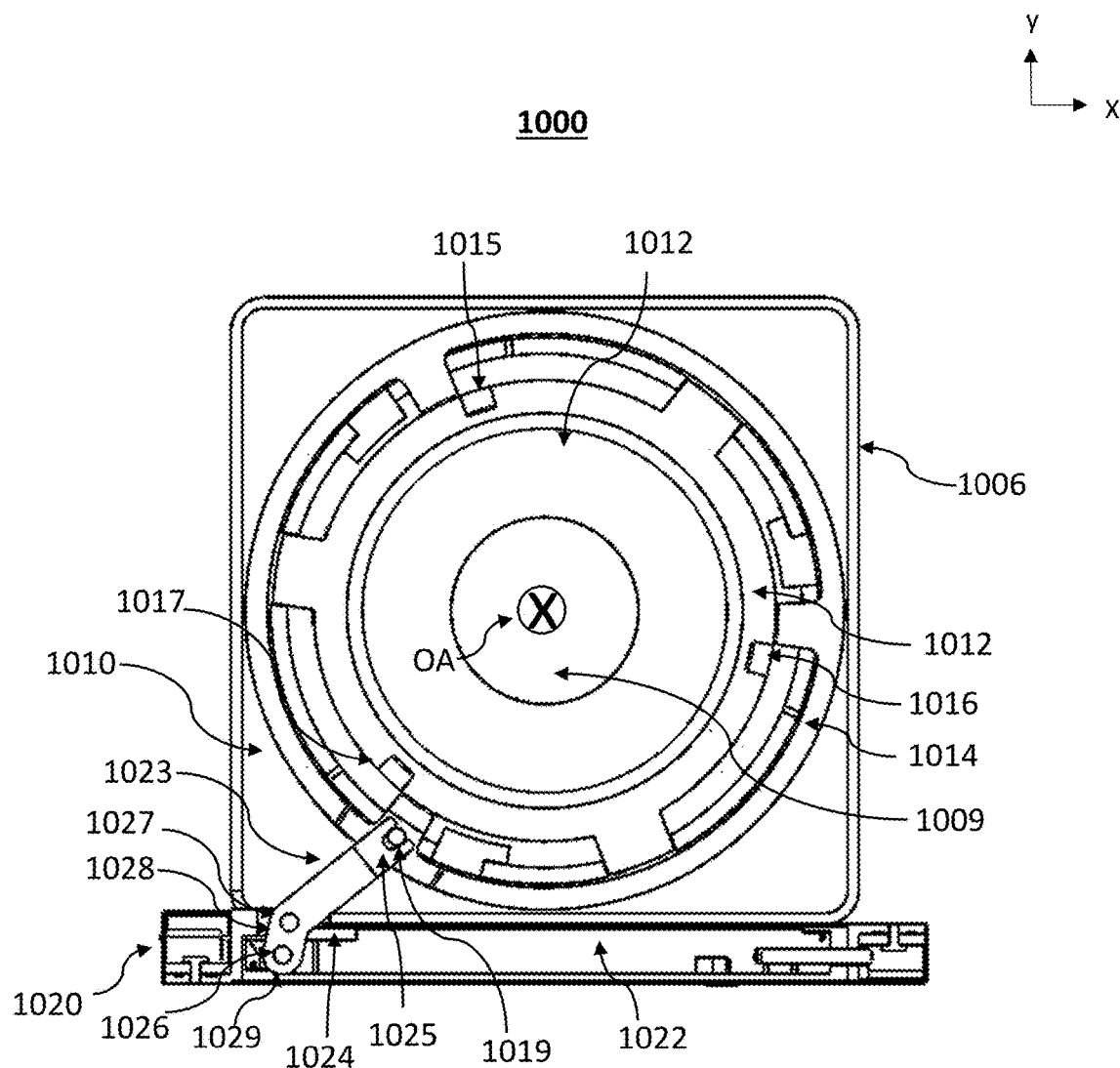
FIG. 10E shows pop-out module of FIGS. 10A-D in a collapsed state in a cross-sectional bottom view.

FIG. 10C shows pop-out module 1000 of FIGS. 10A-B in a pop-out state in a bottom view. FIG. 10D shows pop-out module 1000 of FIGS. 10A-C in a collapsed state in the same view as FIG. 10C. FIG. 10E shows pop-out module 1000 of FIGS. 10A-D in a collapsed state in a cross-sectional bottom view.

Pop-out mechanism 1010 includes a lens carrier 1012, a pin ring 1014, a locking ring 1018 and a locking mechanism (not shown) and three angled pin-groove mechanisms 1015, 1016 and 1017. With respect to housing 1006, lens carrier 1012 is configured to linearly move parallel to the z-axis, pin ring 1014 is configured to rotationally move in the x-z plane, and locking ring 1018 does not move. The three angled pin-groove mechanisms 1015, 1016 and 1017 translate the rotational motion of pin ring 1014 in into a linear motion of lens carrier 1012. Pop-out actuator 1020 includes a lever 1023 coupled to pin ring 1014. Pin ring 1014 includes a bottom pin 1019 (FIG. 10E) and lever 1023 includes a slot 1025 (FIG. 10E). The coupling of lever 1023 to pin ring 1014 is achieved by bottom pin 1019 entering slot 1025. Lever 1023 further includes a lever-frame hole 1027 and a lever-rod hole 1029. A "short arm" of lever 1023 is formed between lever-frame hole 1027 and a lever-rod hole 1029. A "long arm" of lever 1023 is formed between lever-frame hole 1027 and slot 1025. Pop-out actuator 1020 further includes a pull rod 1022, an actuator frame 1024, a pull rod pin 1026, a module frame pin 1028 and a guiding pin 1037. Lever 1023 is connected to actuator frame 1024 at a pivot point formed where module frame pin 1028 enters lever-frame hole 1027, so that lever 1023 can perform rotational motion around the pivot point. Lever 1023 is connected to pull rod 1022 by pull rod pin 1026 entering lever-rod hole 1029, so that lever 1023 is actuated when pull rod 1022 moves. Lever 1023 translates a linear movement created by pop-out actuator 1020 into a rotational movement of pin ring 1014 for popping out or collapsing pop-out module 1000. Pop-out actuator 1020 including lever 1023 is positioned only at one side of pop-out module 1000. Guiding pin 1037 guides the movement of pull rod 1022 and prevents pull rod 1022 from leaving frame 1024.

In other embodiments, lever 1023 may have a hole instead of slot 1025 (see e.g. FIG. 11A), wherein the coupling of lever 1023 to pin ring 1014 is achieved by bottom pin 1019 entering the hole.

Figure 11A:
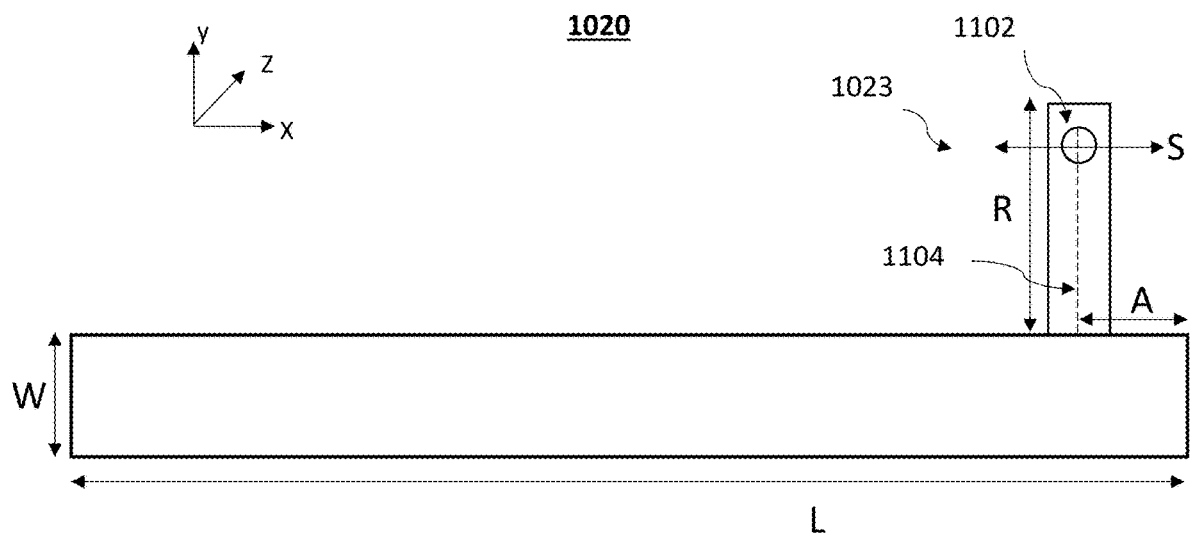
FIG. 11A shows dimensions of an SMA actuator disclosed herein in a top view.

FIG. 11A exemplarily shows dimensions of pop-out actuator 1020 in a top view. Pop-out actuator 1020 includes a pivot point 1102 that may connect lever 1023 to pin ring 1014.

Figure 11B:
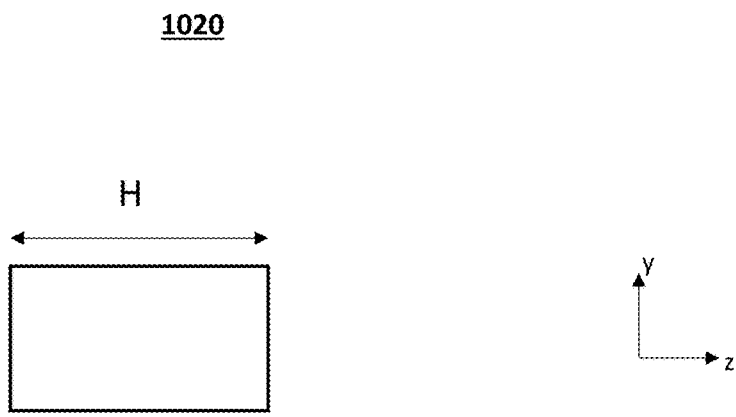
FIG. 11B shows dimensions of the SMA actuator of FIG. 11A in a side view.

A center 1104 of lever 1023 with respect to the x-axis is shown. FIG. 11B exemplarily shows dimensions of SMA actuator 1020 in a side view. Table 1 shows values and ranges of the dimensions (given in mm). The movement or stroke ("S") of the lever 1023 is shown as a line, but in some embodiments S may be arc shaped.

TABLE 1

| Dimension | Range | Preferred range | Details |
|---|---|---|---|
| W | 1-10 | 2-4 | Actuator width (measured along y) |
| H | 2-15 | 3-6 | Actuator height (measured along z) |
| L | 10-50 | 20-40 | Actuator length (measured along x) |
| A | 1-5 | 2-4 | Distance actuator margin – Center of lever (measured along x) |
| R | 2-10 | 4-8 | Length of lever (here, measured along y) |
| S | 1-5 | 2-4 | Pop-out stroke of lever (here, measured along x) |

Figure 12A:
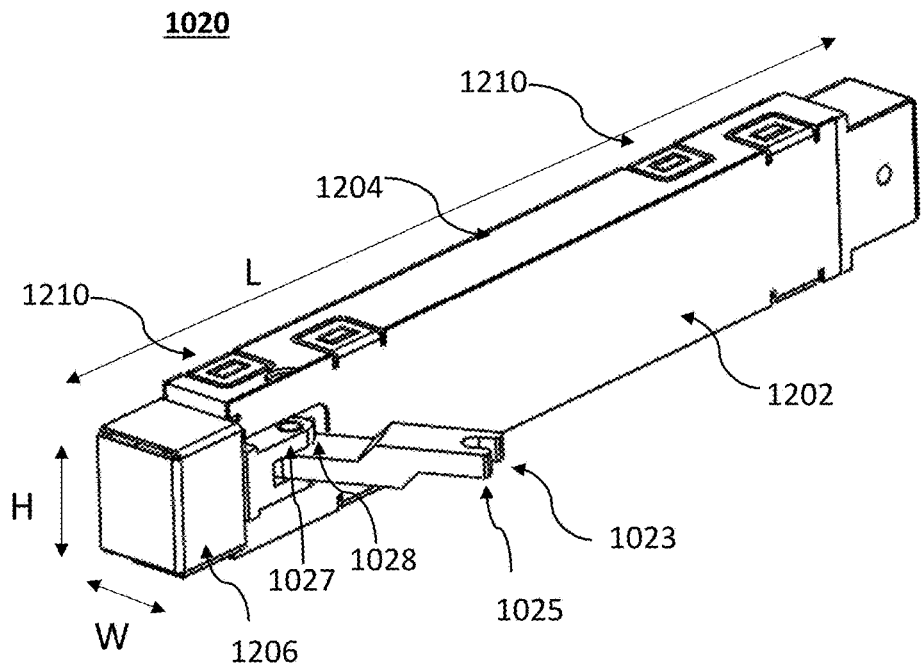
FIG. 12A shows SMA actuator disclosed herein in a collapsed state in a perspective view.

FIG. 12A shows pop-out actuator 1020 in a collapsed state in a perspective view. Pop-out actuator 1020 includes lever 1023, right shield 1202, left shield 1204, a first wire cover 1206 and a second wire cover 1208. Right shield 1202 and left shield 1204 are closed with closure mechanism 1210.

Figure 12B:
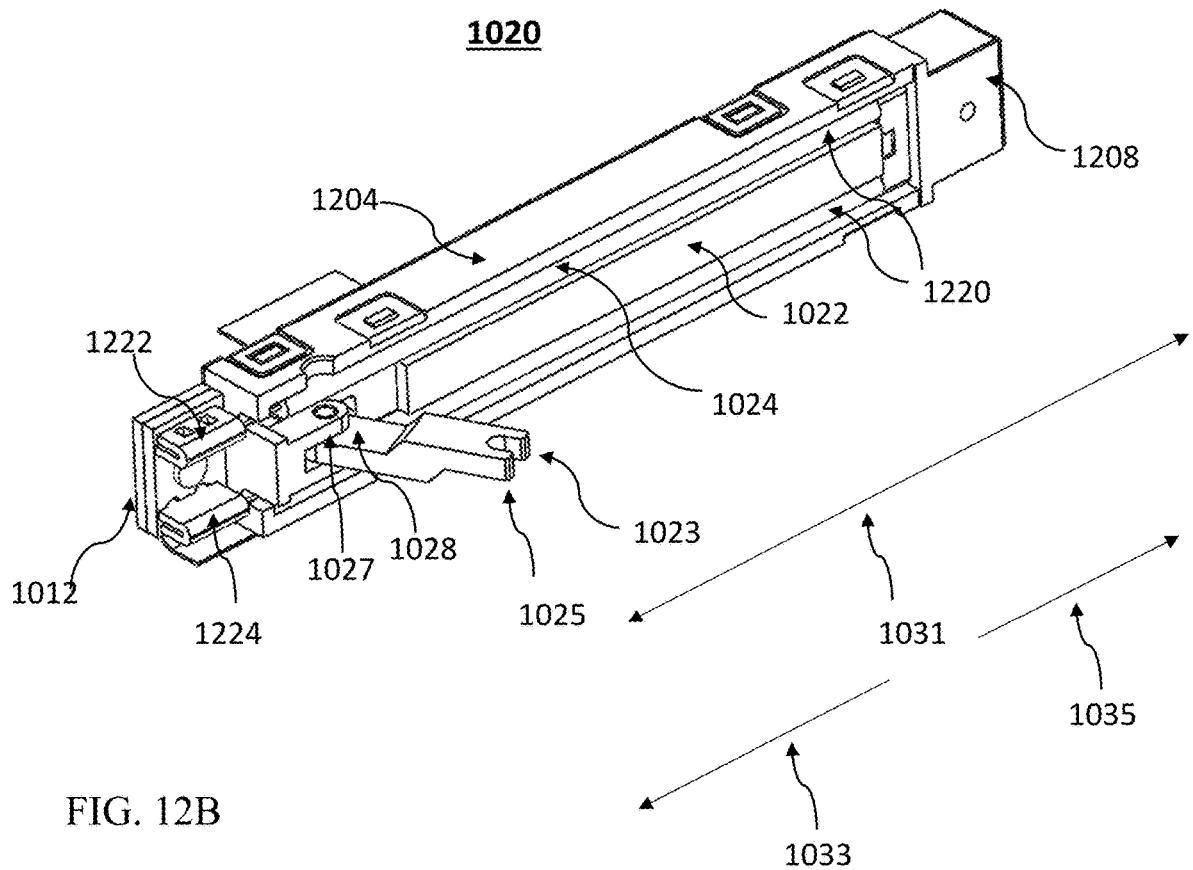
FIG. 12B shows parts of SMA actuator of FIG. 12A in a collapsed state in the same view as in FIG. 12A.
Figure 17:
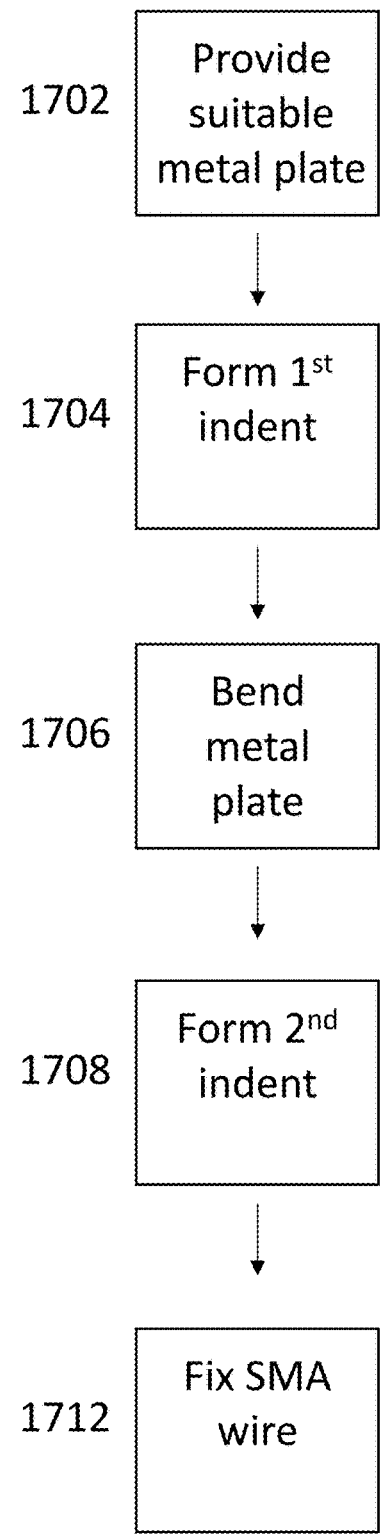
FIG. 17 shows a process to manufacture a crimp for connecting a SMA wire disclosed herein.

FIG. 12B shows pop-out actuator 1020 of FIG. 12A without right shield 1202 and wire cover 1206 in a collapsed state in the same view as in FIG. 12A. Pop-out actuator 1020 further includes a right SMA wire 1220 which is folded at a turning point 1302 (FIGS. 13B-C) and fixedly coupled to pull rod 1212, e.g. by gluing. The two ends of top SMA wire 1220 are fixedly coupled and electrically connected to a first right contact crimp 1222 and to a second right contact crimp 1224. Contact crimp 1222 and contact crimp 1224 may be book crimps as known in the art and may be manufactured as shown in FIG. 17. For example with respect to an image sensor included in the pop-out camera, actuator frame 1024 does not move, but pull rod 1212 does move. Arrow 1031 indicates the direction of the linear movement of pull rod 1212, which is parallel to a symmetry axis of pop-out actuator 1020. For example, pull rod 1212's linear movement is parallel to the y-axis shown in FIGS. 10C-D and parallel to the x-axis shown in FIG. 10E.

Figure 12C:
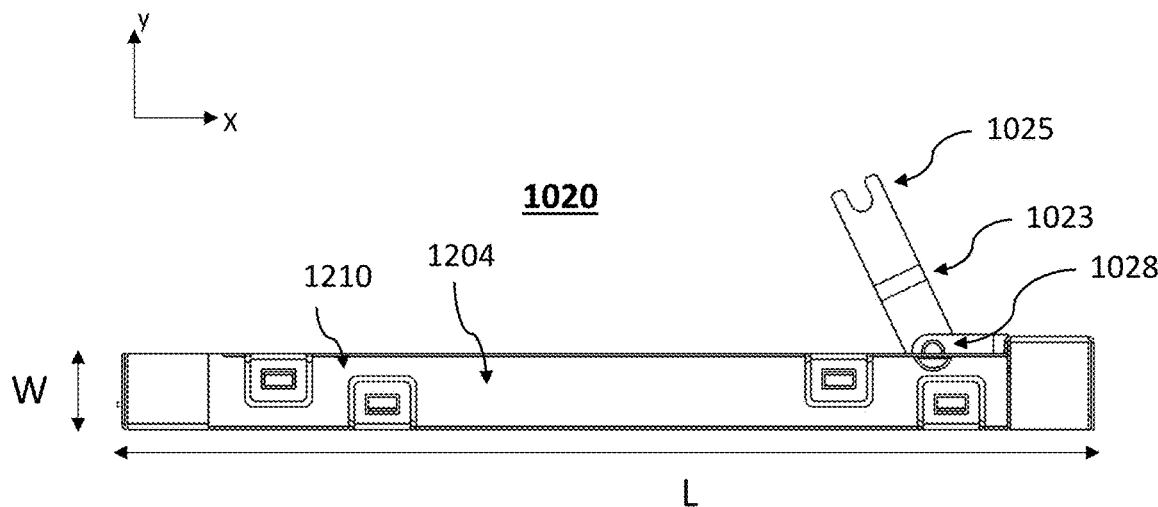
FIG. 12C shows SMA actuator of FIGS. 12A-B in a pop-out state in a side view.
Figure 12D:
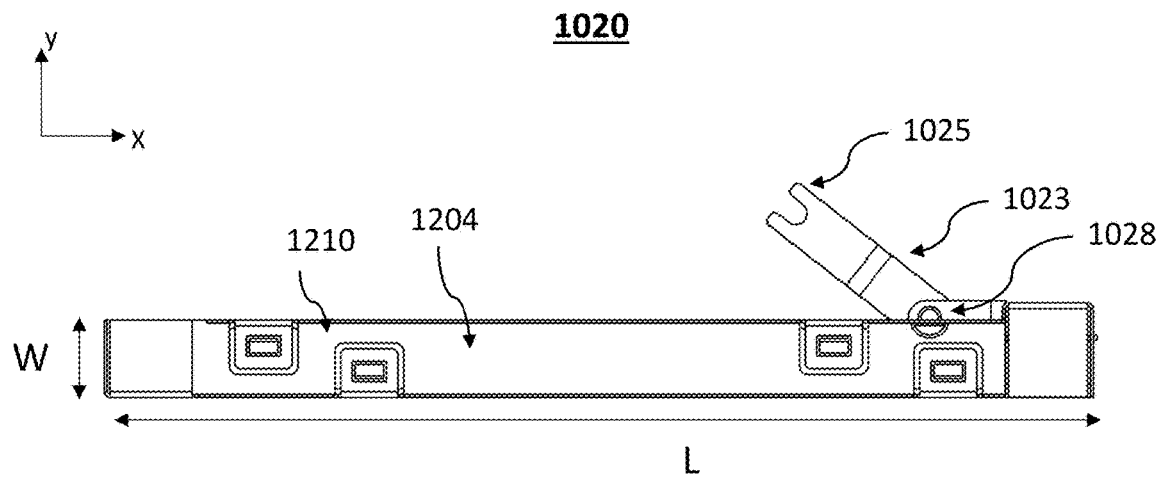
FIG. 12D shows SMA actuator of FIGS. 12A-C in a collapsed state in the same view as FIG. 12C.
Figure 12E:
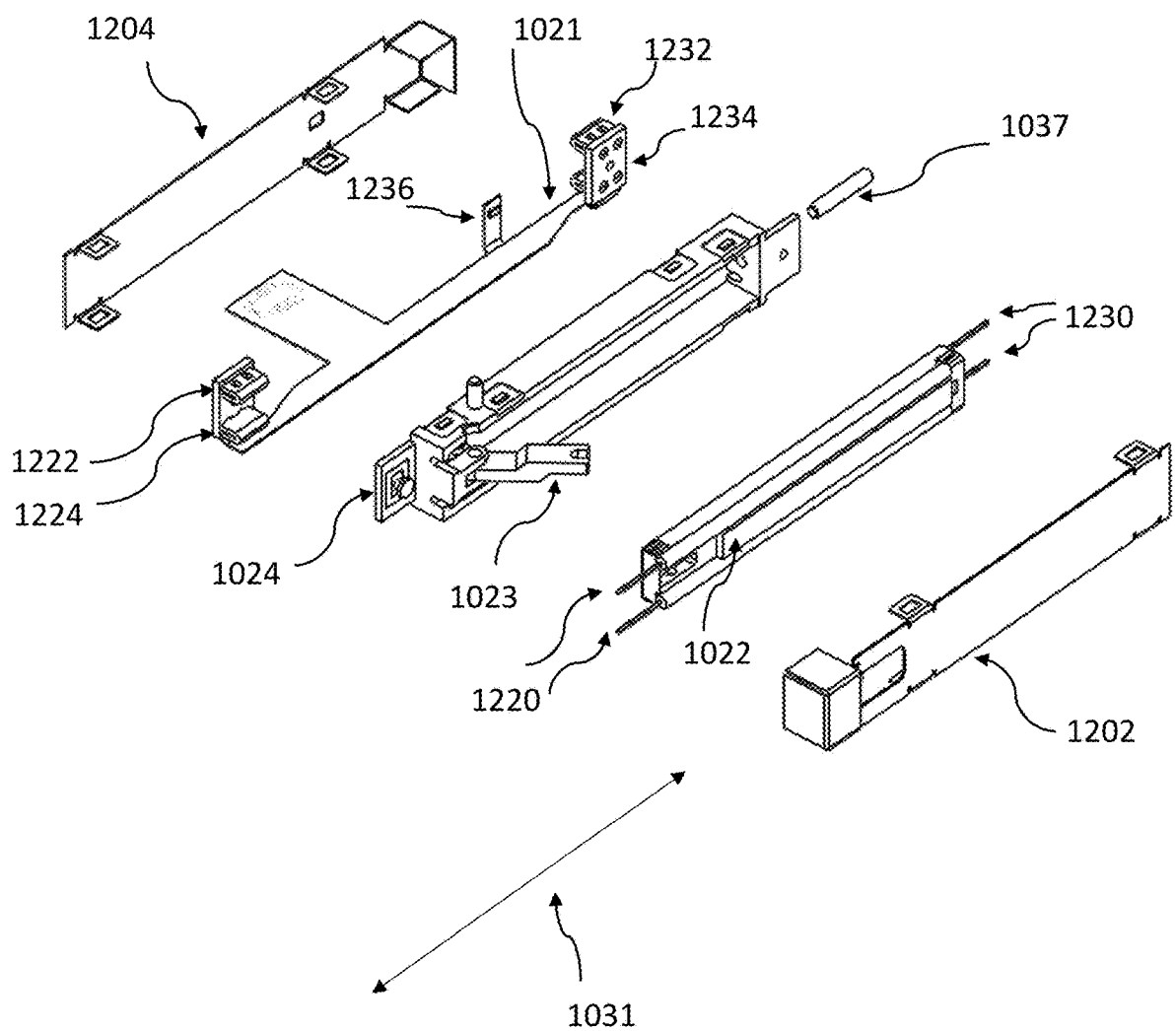
FIG. 12E shows SMA actuator of FIGS. 12A-D in an exploded view.
Figure 12F:
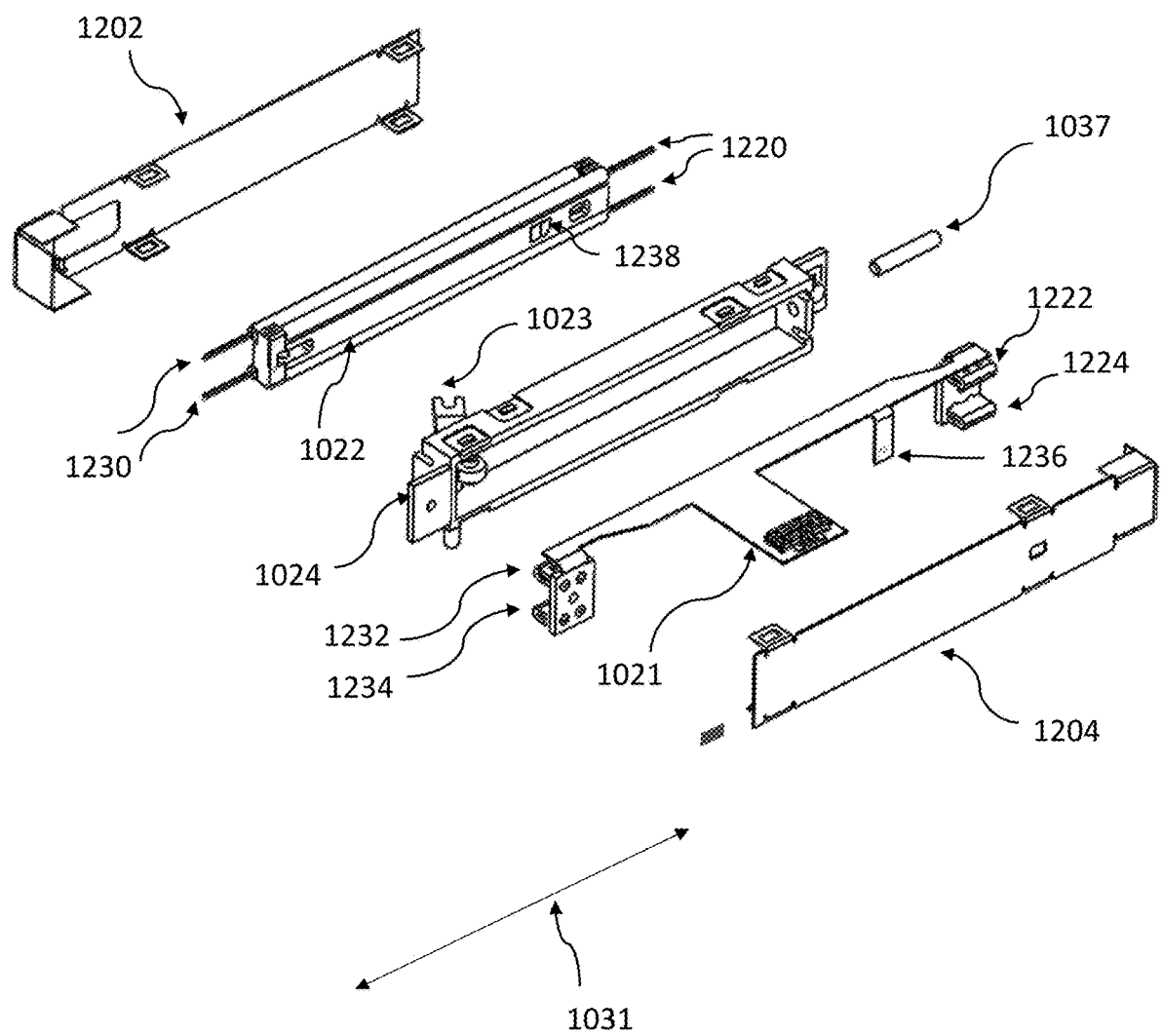
FIG. 12F shows SMA actuator of FIGS. 12A-E in another exploded view.

Not visible here, but visible in FIGS. 12E-F, pop-out actuator 1020 includes also a bottom SMA wire 1230 which is guided (or folded) at a turning point 1304 (FIGS. 13B-C) and fixedly coupled to pull rod 1212.

FIG. 12C shows SMA actuator 1020 of FIGS. 12A-B in a pop-out state in a side view. Lever 1023 forms an angle >45 degrees with the x-axis. FIG. 12D shows SMA actuator 1020 of FIGS. 12A-C in a collapsed state in the same view as FIG. 12C. Lever 1023 forms an angle <45 degrees with the x-axis.

FIG. 12E shows pop-out actuator 1020 of FIGS. 12A-D in an exploded view. Top SMA wire 1220 and bottom SMA wire 1230 are visible. Two ends of bottom SMA wire 1030 are fixedly coupled and electrically connected to a first left contact crimp 1232 and to a second left contact crimp 1234. Contact crimp 1232 and contact crimp 1234 may be book crimps as known in the art and may be manufactured as shown in FIG. 17.

FIG. 12F shows pop-out actuator 1020 of FIGS. 12A-E in another exploded view. Pop-out actuator 1020 further includes a Hall sensor 1236 and a magnet 1238. Together, Hall sensor 1236 and magnet 1238 form a position measurement unit for controlling the pull stroke of pull rod 1022 (and with it, the movement of pop-out actuator 1010). Magnet 1238 is fixedly coupled to pull rod 1022, so magnet 1238 moves together with pull rod 1212, e.g. with respect to an image sensor included in the pop-out camera. Hall sensor 1236 is fixedly coupled to flex 1021 and measures a magnetic field induced by magnet 1238. Flex 1021 is fixedly coupled to actuator frame 1024, so that Hall sensor 1236 does not move with respect to an image sensor included in the pop-out camera. The movement of pull rod is over a distance ("pull stroke") of about 0.2-2.5 mm. Lever 1023 translates the pull stroke into a pop-out stroke. The pop-out stroke is about 2-10 times larger than the pull stroke, so lever 1023 levers by a factor of 2-10. Preferably, the pop-out stroke is about 3-5 times larger than the pull stroke. SMA wire 1220 and 1230 may be made from the same material and may have an identical wire diameter. For example, SMA wires 1220 and 1230 may be made from Nitinol. Below a $T_S$ (e.g. $T_S$=50-150 degrees), wire 1220 and wire 1230 have a module of elasticity $E_{cold}$ and above $T_S$ it has a module of elasticity $E_{hot}$, wherein $E_{hot} > E_{cold}$. SMA wire 1220 and 1230 may have an identical wire diameter ("DW") between 0.025-0.5 mm, preferably between 0.1-0.2 mm, and an identical wire length ("LW") of 10-100 mm, preferably between 30-70 mm. SMA wire 1220 and 1230 may be or may not be surrounded by a silicone material, e.g. for thermal and electrical isolation. SMA wires 1220 and 1230 supply the force to linearly actuate pull rod 1022, which leads to a rotational movement of lever 1023, which leads to a rotational movement of pin ring 1014. This switches a pop-out camera including pop-out module 1000 from a pop-out to a collapsed state and vice versa by elevating and lowering a window frame like window frame 214 as detailed below.

Figure 13A:
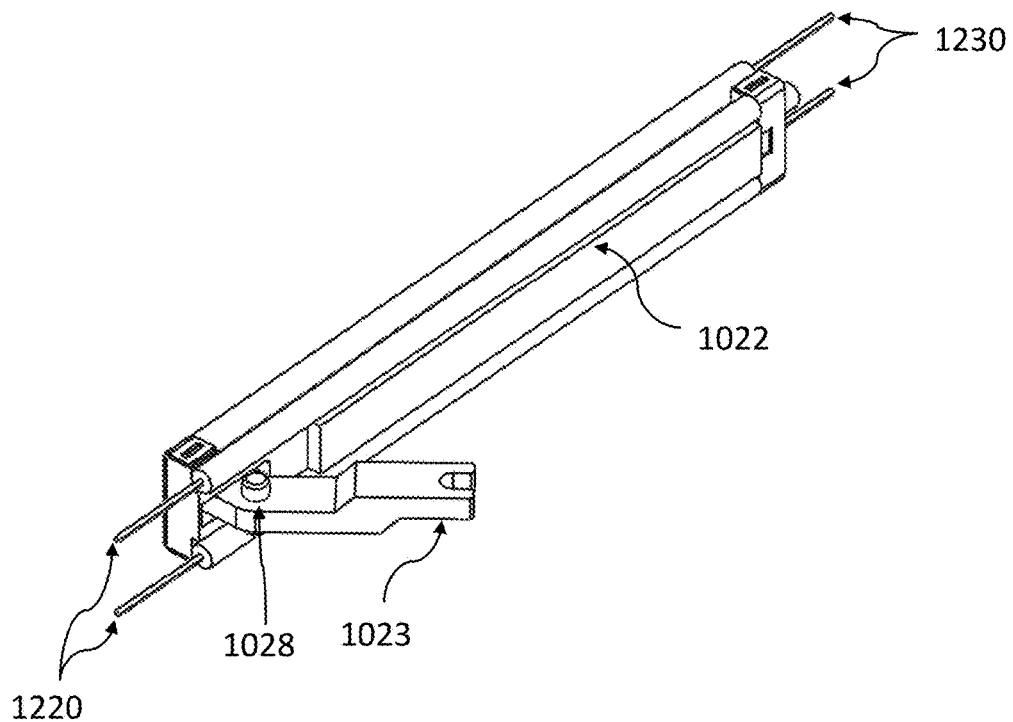
FIG. 13A shows parts of SMA actuator of FIGS. 12A-F in a perspective view.
Figure 13B:
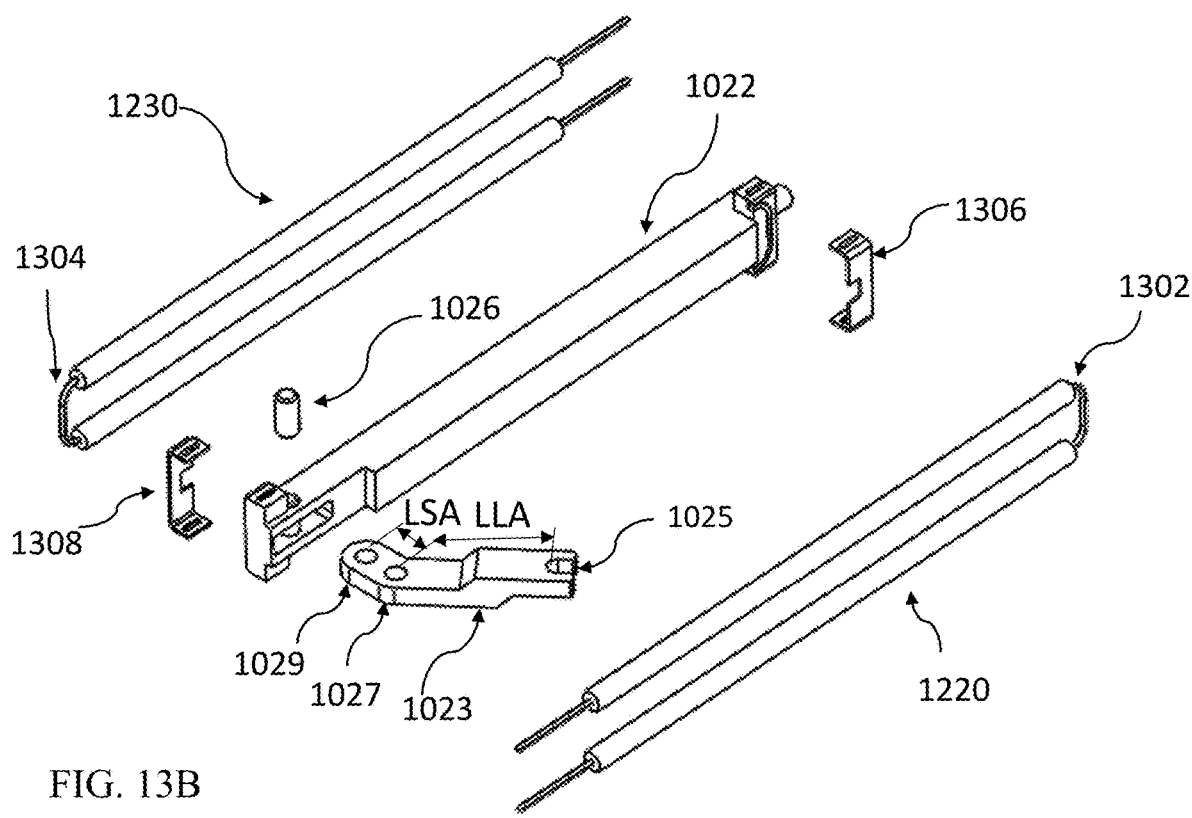
FIG. 13B shows the parts of SMA actuator of FIG. 13A in an exploded view.

FIG. 13A shows parts of pop-out actuator 1020 of FIGS. 12A-F in a perspective view. FIG. 13B shows the parts of pop-out actuator 1020 of FIG. 13A in an exploded view. Pop-out actuator 1020 further includes a first wire cover 1306 and a second wire cover 1308, which cover the coupling points of SMA wire 1220 and 1230 at turning point 1302 and 1304 respectively to pull rod 1022. In addition, second wire cover 1308 keeps pull rod pin 1026 in place, i.e. prevents that pull rod pin 1026 leaves lever-rod hole 1029. A distance between lever-frame hole 1027 and lever-rod hole 1029 represents a length of lever 1023's short arm named length of short arm and is marked "LSA". A distance between lever-frame hole 1027 and slot 1025 represents a length of lever 1023's long arm named length of long arm and is marked "LLA". A lever ratio, i.e. a ratio of LSA and LLA may be about 1:4 as shown. In other examples, a lever ratio may be 1:10-1:2.

Figure 13C:
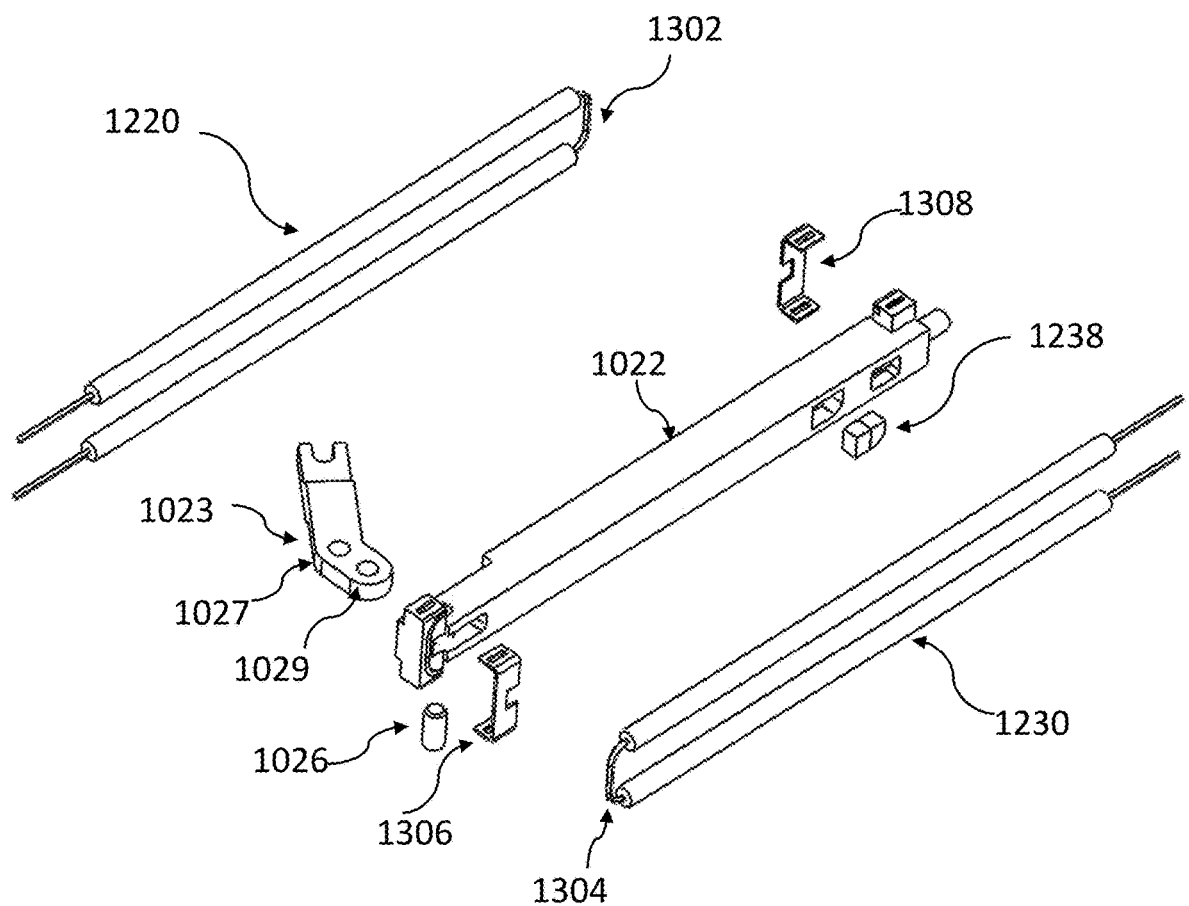
FIG. 13C shows the parts of SMA actuator of FIG. 13A in another exploded view.

FIG. 13C shows the parts of pop-out actuator 1020 of FIG. 13A in another exploded view. The folding of SMA wire 1220 and SMA wire 1230 is symmetric.

Collapsing Pop-Out Module 1000—Switching from a Pop-Out to a Collapsed State SMA wire 1220 is heated while SMA wire 1230 is not heated. The force exercised by wire 1220 (~$E_{hot}$) overcomes the force exercised by SMA wire 1230 (~$E_{cold}$) since $E_{hot} > E_{cold}$, so that SMA wire 1220 contracts and SMA wire 1230 extends. The contraction and extension changes the wire's lengths by about 1%-10%, preferably by 2%-5%.

This causes a linear movement of pull rod 1022 as shown by arrow 1031 (FIG. 12B). The linear movement of pop-out actuator 1020 is transmitted to pin ring 1014 via lever 1023.

Pin ring 1014 rotates in a counter-clockwise direction (FIGS. 10C-D), what causes lens carrier 1012 to move linearly along the z-axis (FIGS. 10A-B) by −Δs, bringing pop-out module 1000 to a collapsed state. Δs may be in the range Δs=1-10 mm, preferably Δs=1-5 mm.

Popping Out Pop-Out Module 1000—Switching from a Collapsed to a Pop-Out State SMA wire 1230 is heated while SMA wire 1220 is not heated. Since $E_{hot} > E_{cold}$, the force exercised by wire 1230 (~$E_{hot}$) overcomes the force exercised by SMA wire 1220 (~$E_{cold}$), which causes a linear movement of pull rod 1022 as shown by arrow 1033 (FIG. 12B). The linear movement of pull rod 1022 is in the opposite direction than the linear movement for collapsing pop-out module 1000 see above. The linear movement of pull rod 1022 is transmitted to pin ring 1014 via lever 1023. Pin ring 1014 rotates in a clockwise direction (FIGS. 10C-D), which causes lens carrier 1012 to move linearly along the z-axis (FIGS. 10A-B) by Δs, bringing pop-out module 1000 to a pop-out (or operating) state.

Here, this is referred to as a "second antagonistic SMA wire actuator using two SMA wires".

FIG. 14A shows yet another embodiment of a pop-out module numbered 1400 including a ninth (9$^{th}$) SMA wire pop-out actuator 1420 disclosed herein in a pop-out state in a perspective view. FIG. 14B shows pop-out module 1400 in a collapsed state in the same view as FIG. 14A. The pop-out module together with an optics module including a collapsible pop-out lens and an image sensor form a pop-out camera. The pop-out camera is beneficial for use in a smartphone.

Pop-out module 1400 includes a lens carrier 1412 including a lens (not shown) forming an aperture 1008 of a pop-out camera including pop-out module 1400 which is covered by glass window 1409. Pop-out module 1400 further includes a housing 1406, a top cover 1404, a pop-out mechanism 1410, pop-out actuator 1420 disclosed herein and second locking mechanism 1405 disclosed herein. Except for pop-out actuator 1420 and locking mechanism 1405 including a first locker 1411 and a second locker 1415 (see FIG. 14C-G), pop-out module 1400 is identical to pop-out module 1000. In particular, functionality of pop-out mechanism 1410 is identical to the functionality of pop-out mechanism 1010 (FIGS. 10C-E). Pop-out mechanism 1410 includes lens carrier 1412, pin ring 1414 and locking ring 1418. Second locking mechanism 1405 is referred to as a "magnetic locking mechanism". In other magnetic locking mechanisms, only one locker or more than two lockers, e.g. three or more lockers, may be included.

Figure 14C:
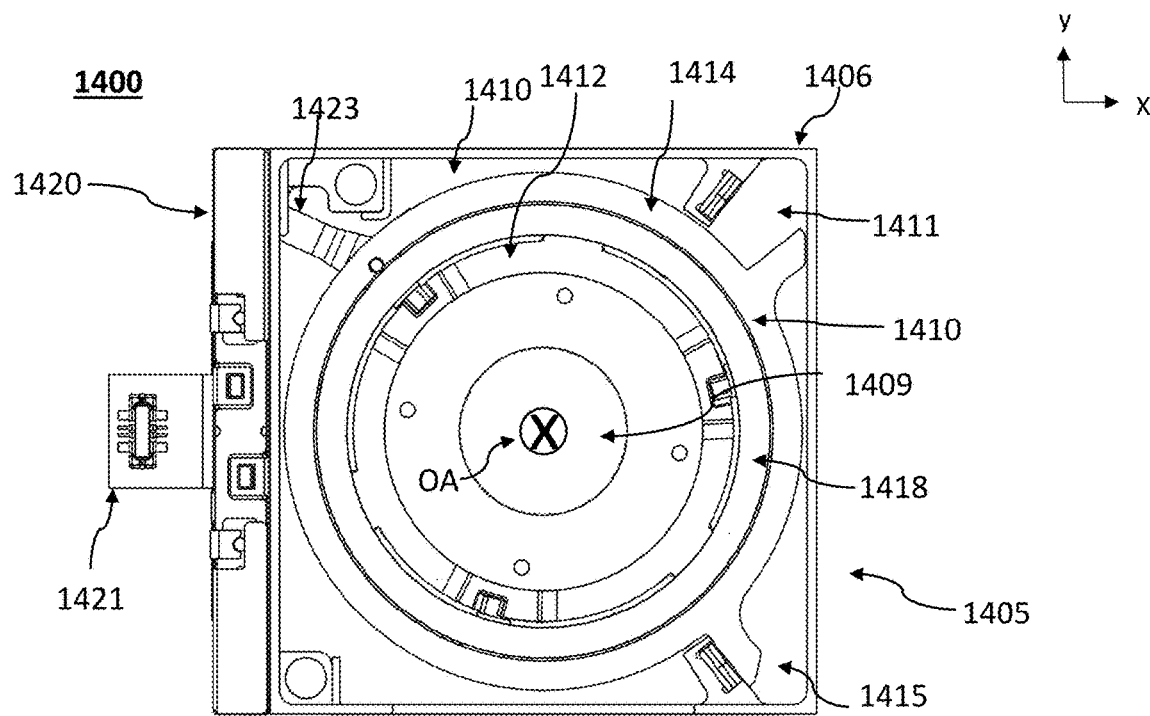
FIG. 14C shows pop-out module of FIGS. 10A-B in a pop-out state in a bottom view.
Figure 14D:
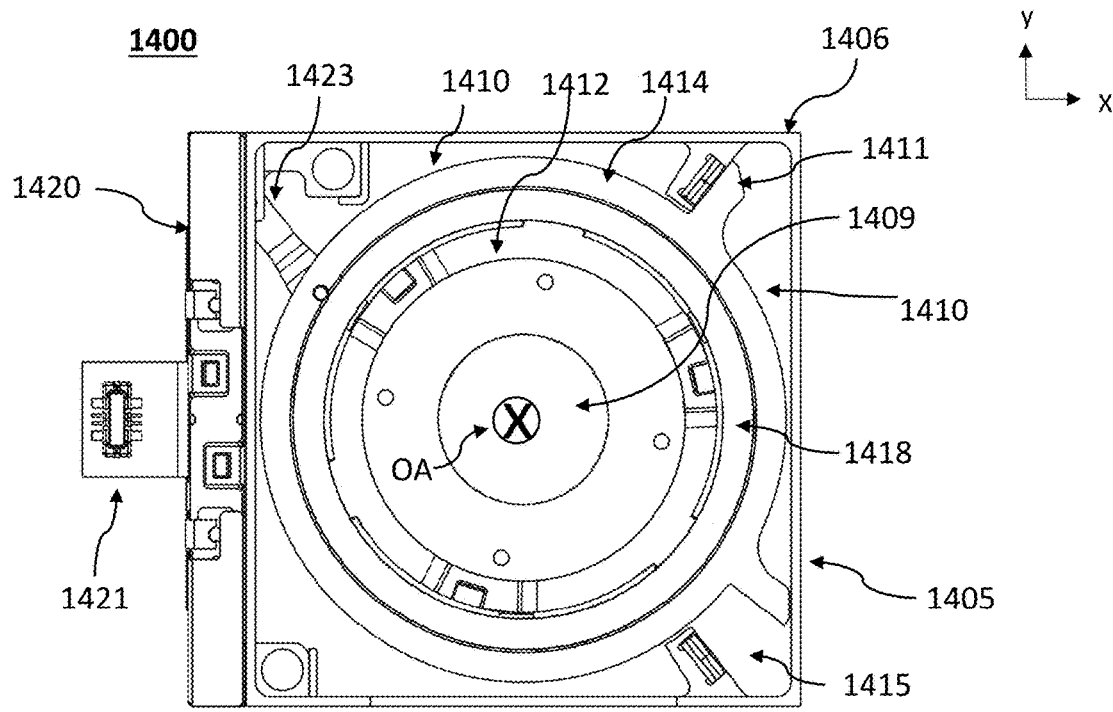
FIG. 14D shows pop-out module of FIGS. 10A-B in a collapsed state in a bottom view.
Figure 14E:
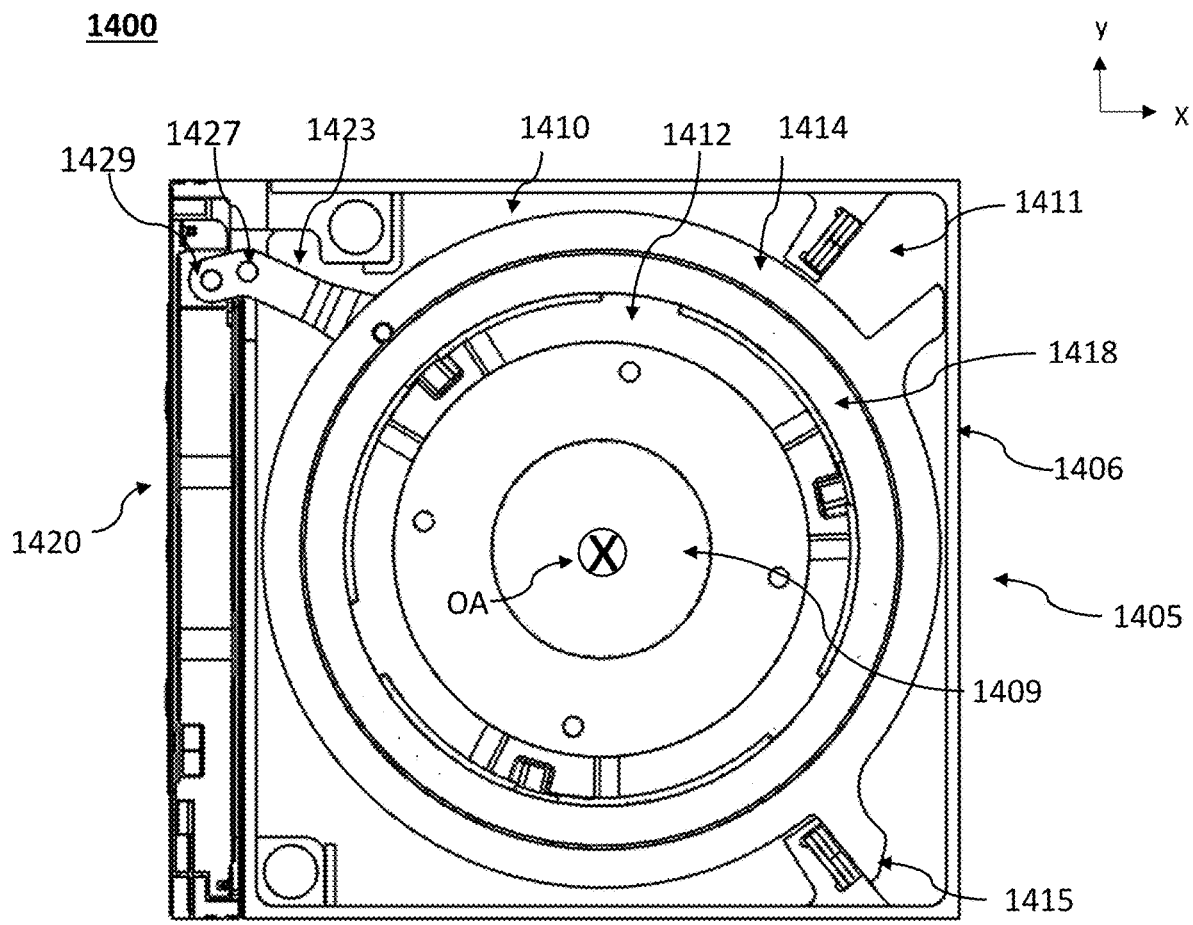
FIG. 14E shows pop-out module of FIGS. 10A-B in a pop-out state in a cross-sectional bottom view.

FIG. 14C shows pop-out module 1400 of FIGS. 14A-B in a pop-out state in a bottom view. Locker 1411 is open and locker 1415 is closed. Locker 1415 "locks" or keeps pop-out module 1400 in a pop-out state. FIG. 14D shows pop-out module 1400 of FIGS. 14A-C in a collapsed state in the same view as FIG. 14C. Locker 1411 is closed and locker 1415 is open. Locker 1411 "locks" or keeps pop-out module 1400 in a collapsed state. FIG. 14E shows pop-out module 1400 of FIGS. 14A-D in a pop-out state in a cross-sectional bottom view. Locker 1411 is open and locker 1415 is closed.

Figure 14F:
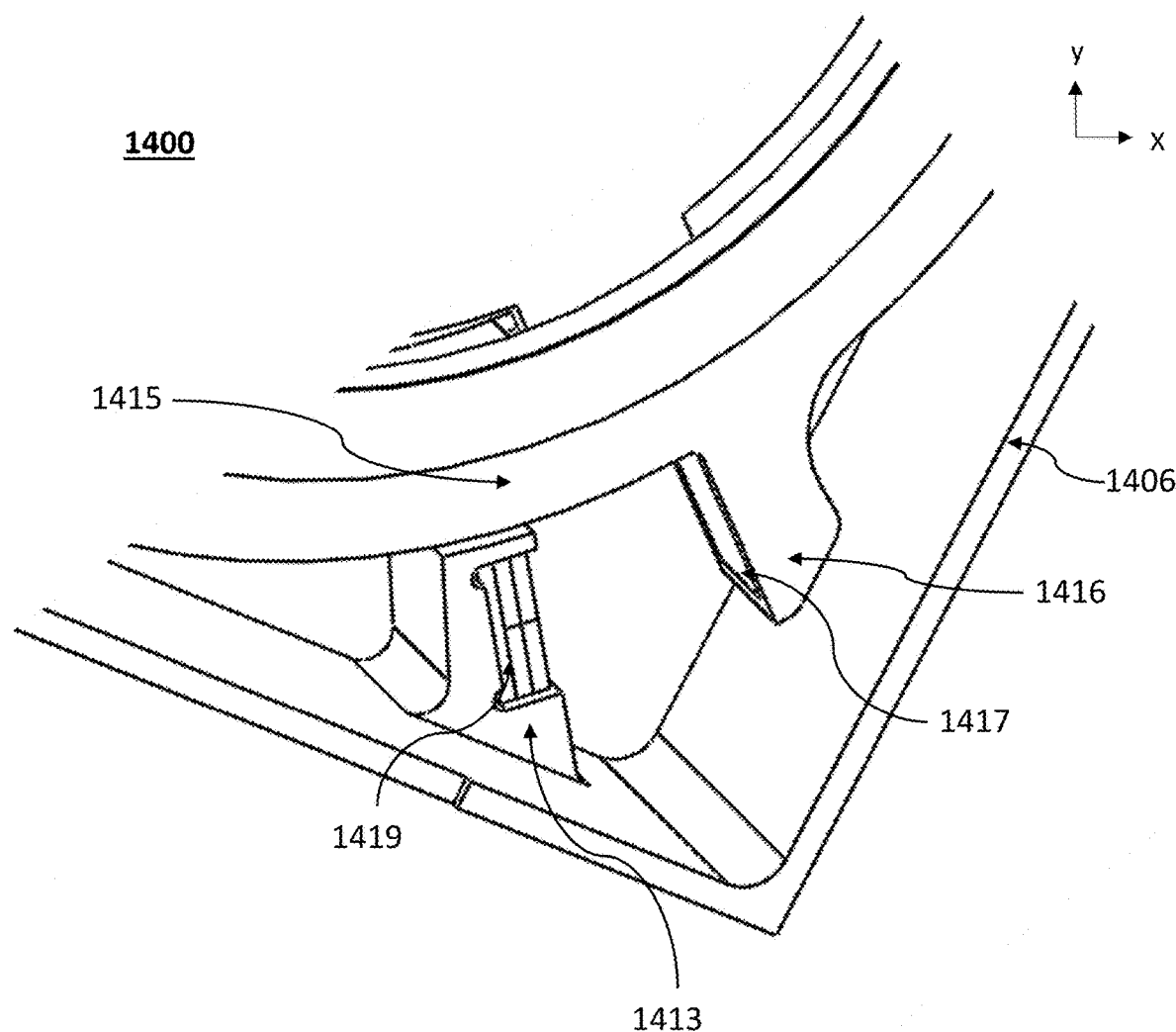
FIG. 14F shows second locking mechanism disclosed herein in a collapsed state in a detailed view.

FIG. 14F shows second locker 1415 of pop-out module 1400 of FIGS. 14A-E in a collapsed state (locker 1415 is open) in a cross-sectional detailed bottom view. Here, exemplary second locker 1415 is shown. However, all details described here apply also for first locker 1411. Second locker 1415 includes a first arm 1416 including a yoke 1417 and a second arm 1413 including a magnet 1419. Preferably, a yoke such as yoke 1417 is included in a part that moves with respect to housing 1406 and a magnet such as magnet 1419 is included in a part that does not move with respect to housing 1406, because the magnet movement may cause the magnet's magnetic field to interfere with other magnetic fields in the camera, the other magnetic fields e.g. used for sensing or actuation. In the shown pop-out state, first arm 1416 and second arm 1413 are located at a relatively large distance from each other, e.g. 1 mm or more, so that yoke 1417 and magnet 1419 attract each other only weakly. In the collapsed state, first arm 1416 and second arm 1413 are located at a relatively short distance from each other, i.e. they are "at contact", so that yoke 1417 and magnet 1419 attract each other strongly and "lock" the pop-out camera in collapsed state. "Lock" the pop-out camera in a collapsed state or pop-out state means that based on the forces exercised by locking mechanism 1405, the pop-out camera remains in its current state, until an actuation by pop-out actuator 1420 is provided. In other examples, both first arm 1416 and second arm 1413 may include a magnet each.

Figure 15A:
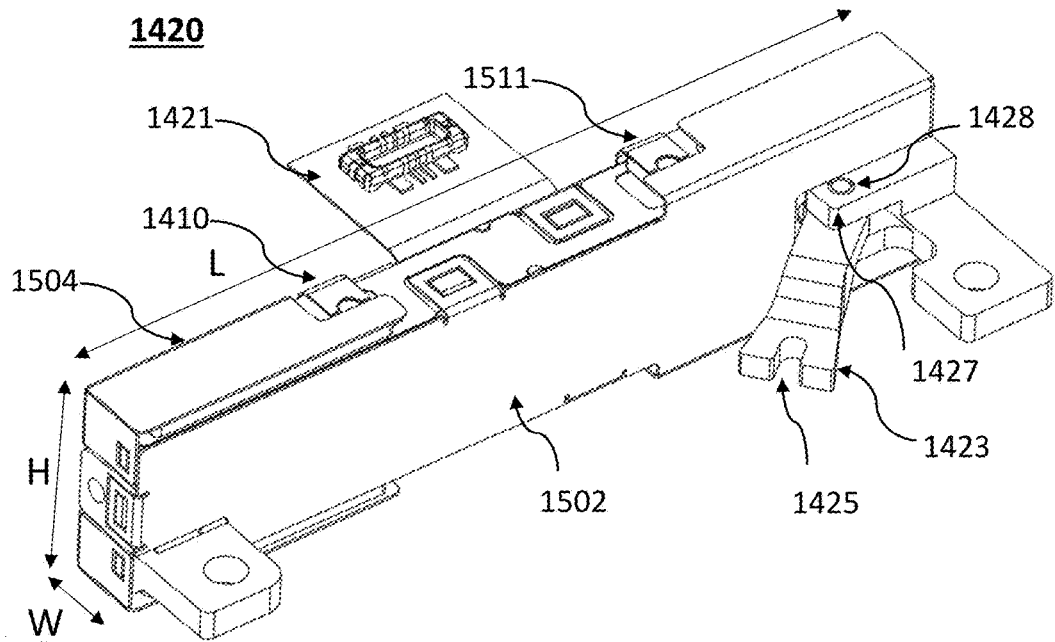
FIG. 15A shows a ninth SMA wire example disclosed herein in a collapsed state in a perspective view.

FIG. 15A shows pop-out actuator 1420 in a collapsed state in a perspective view. Pop-out actuator 1420 includes a top SMA wire 1520 (FIG. 15C) and bottom SMA wire 1530 (FIG. a lever 1423, a flex 1421, a right shield 1502 and a left shield 1504 that are closed with closure mechanism 1511. Lever 1423 has a slot 1425, a lever-frame hole 1427 and a module-frame pin 1428 that is inserted in lever-frame hole 1427.

The coupling of lever 1423 to pin ring 1414 is achieved by a bottom pin such as bottom pin 1019 entering slot 1425. Pop-out actuator 1420 includes a pull rod 1522, an actuator frame 1524, a pull rod pin 1526 and a module frame pin 1528. Lever 1423 is connected to actuator frame 1524 at a pivot point formed where module frame pin 1528 enters lever-frame hole 1427, so that lever 1423 can perform rotational motion around the pivot point. Lever 1423 is connected to pull rod 1522 by pull rod pin 1526 entering lever-rod hole 1429, so that lever 1423 is actuated when pull rod 1422 moves. Lever 1423 translates a linear movement created by pop-out actuator 1420 into a rotational movement of pin ring 1414 for popping out or collapsing pop-out module 1400, as described in more detail below. Pop-out actuator 1420 including lever 1423 is positioned only at one side of pop-out module 1400.

Figure 15B:
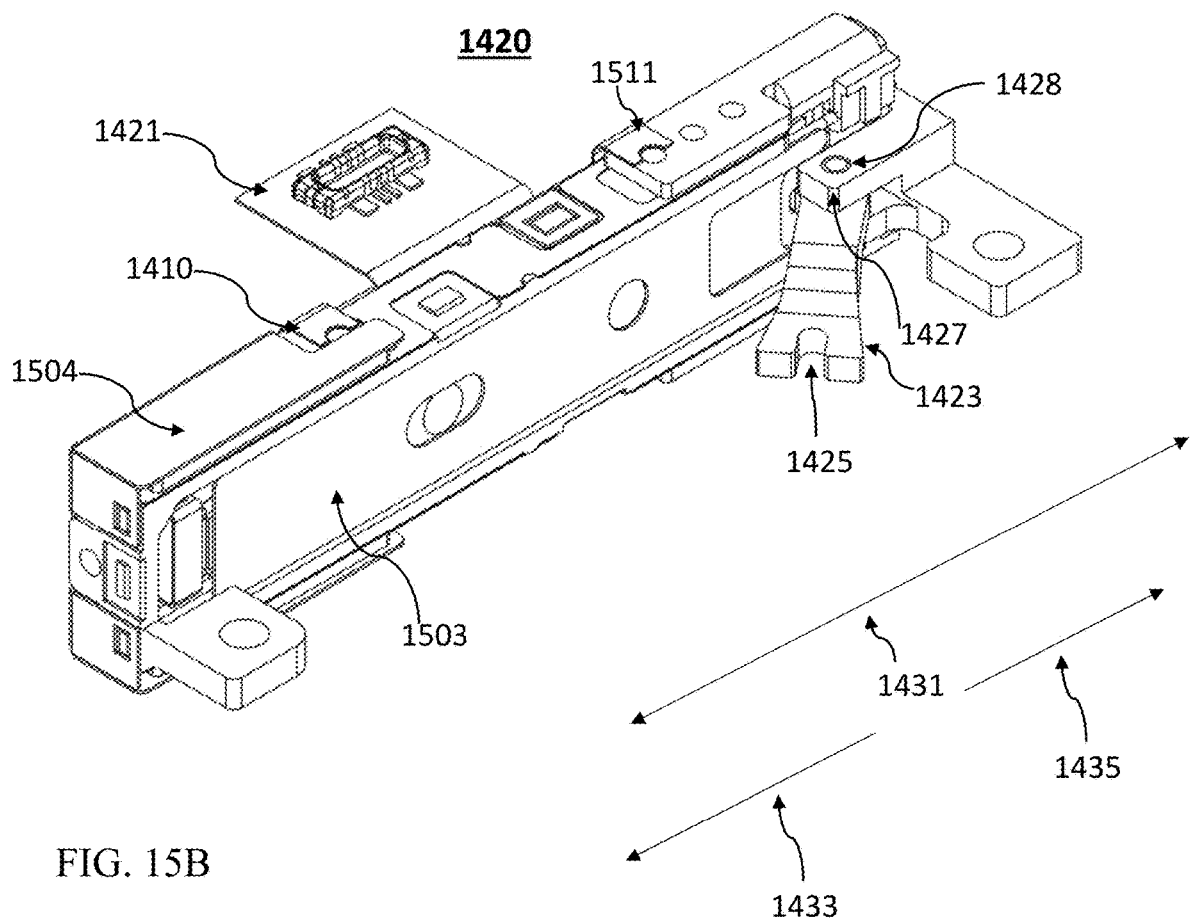
FIG. 15B shows parts of pop-out module of FIG. 15A in a collapsed state in a perspective view.

FIG. 15B shows pop-out actuator 1420 of FIG. 15A without right shield 1502 in a collapsed state in the same view as in FIG. 15A. Pop-out actuator 1420 further includes a right SMA protector 1503 and a left SMA protector 1505 (FIGS. 15F-G).

Figure 15C:
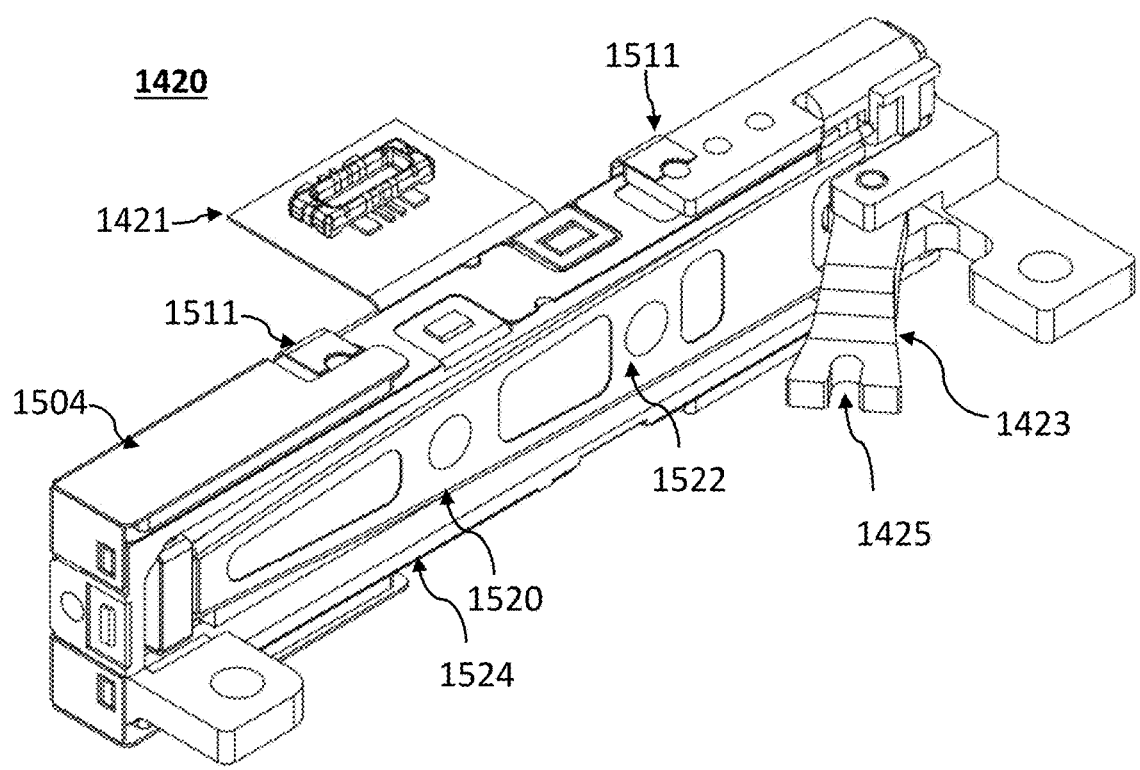
FIG. 15C shows yet other parts of pop-out module of FIGS. 15A-B in a collapsed state in a perspective view.

FIG. 15C shows pop-out actuator 1420 of FIGS. 15A-B without right SMA protector 1403 in a collapsed state in the same view as in FIGS. 15A-B. Pop-out actuator 1420 further includes a pull rod 1522, an actuator frame 1524 and a right SMA wire 1520 which is folded at a turning point 1521 (FIG. 15F) and fixedly coupled to pull rod 1522, e.g. by gluing.

Figure 15D:
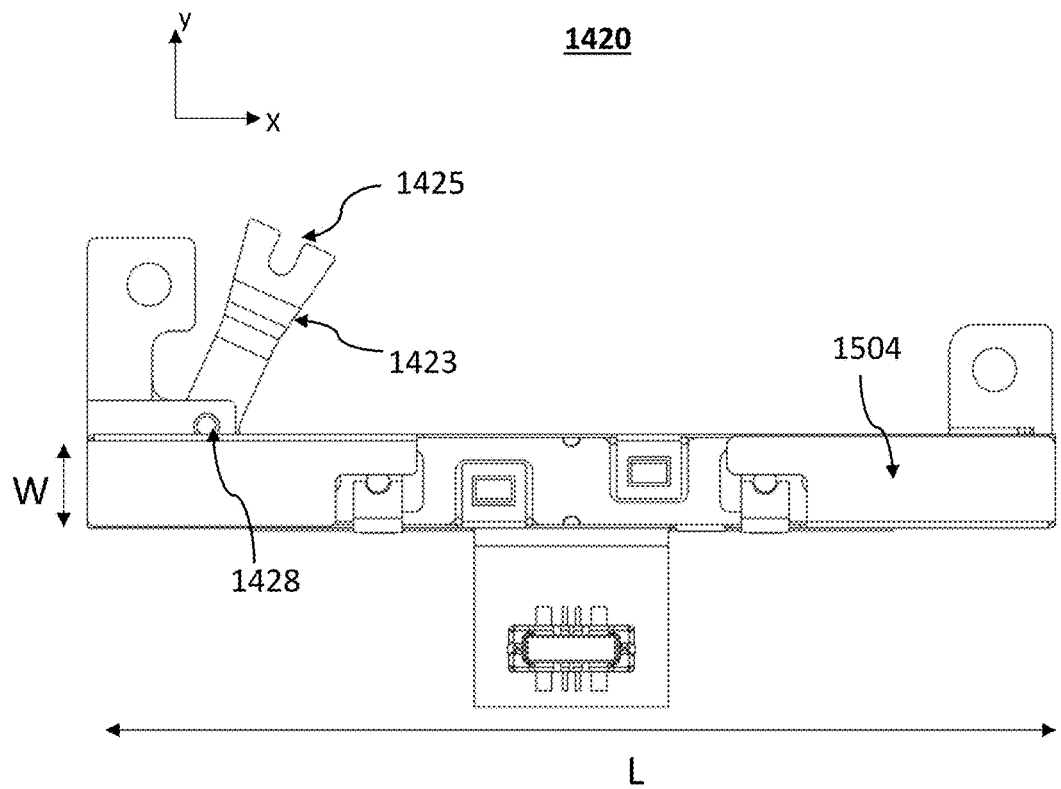
FIG. 15D show pop-out module of FIG. 15A in a pop-out state in a top view.
Figure 15E:
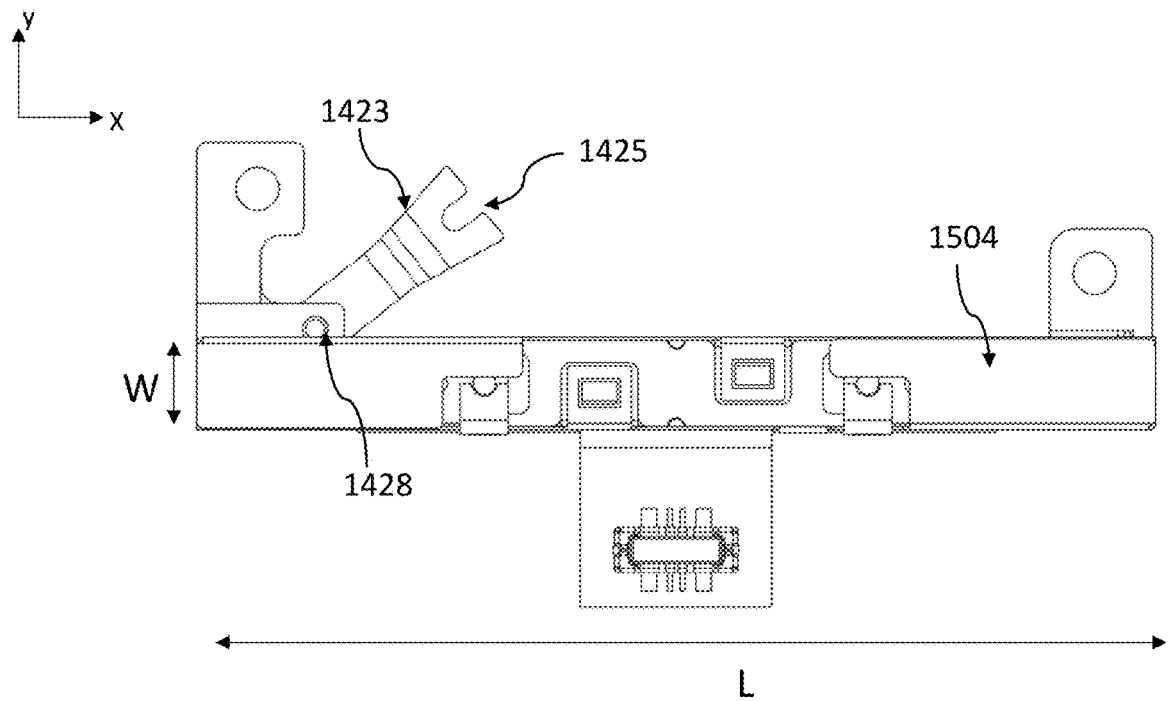
FIG. 15E show pop-out module of FIG. 15D in a collapsed state in a top view.

FIG. 15D and FIG. 15E show pop-out actuator 1420 of FIGS. 15A-C in a pop-out state and in a collapsed state respectively in a top view. A width ("W") and length ("L") pop-out actuator 1420 is shown. A position of lever 1423 in a pop-out state and a collapsed state respectively is visible.

Figure 15F:
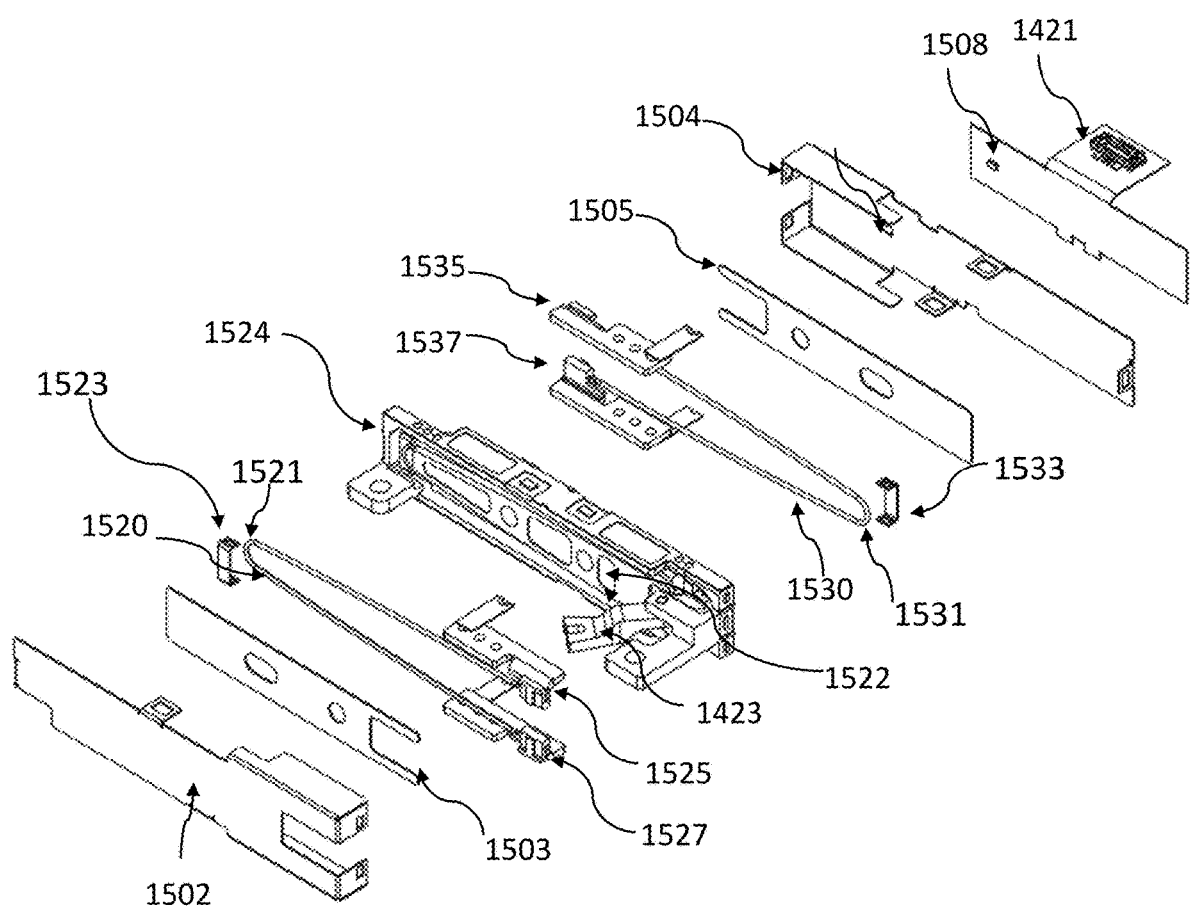
FIG. 15F show pop-out module of FIG. 15A in a pop-out state in an exploded view.
Figure 15G:
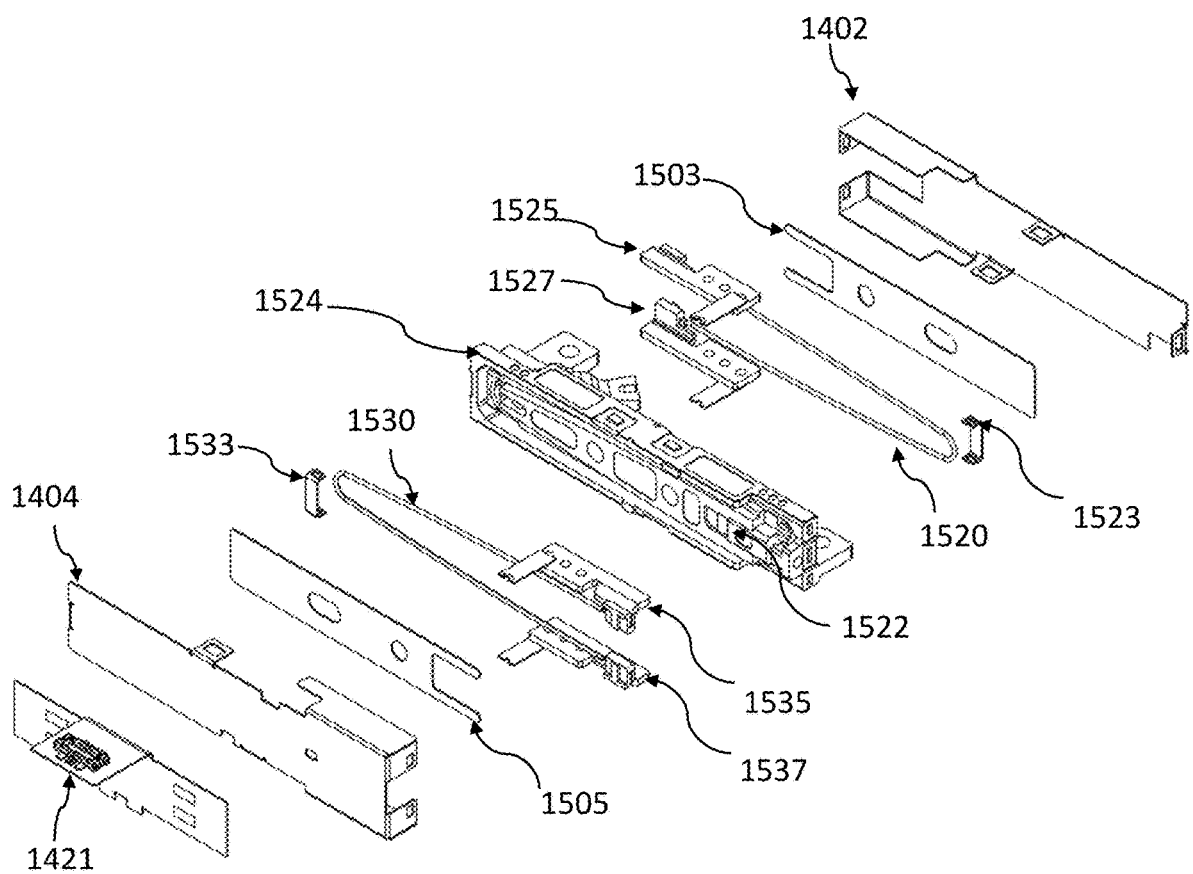
FIG. 15G show pop-out module of FIG. 15A in a pop-out state in yet another exploded view.

FIG. 15F shows pop-out actuator 1420 of FIGS. 15A-E in an exploded view. FIG. 15G shows pop-out actuator 1420 of FIGS. 15A-F in yet another exploded view. Pop-out actuator 1420 further includes a left SMA wire 1530 which is folded at a turning point 1531 (FIGS. 13B-C) and fixedly coupled to pull rod 1522 and a Hall magnet sensor 1508. Hall magnet sensor 1508 is fixedly coupled to flex 1421 and does not move with respect to actuator frame 1524. At turning point 1521 and 1531 respectively, SMA wire 1520 and SMA wire 1530 are covered with wire cover 1523 and wire cover 1533 respectively. SMA wire 1520 is fixedly coupled and electrically connected to actuator frame 1524 via crimp a 1525 and a crimp 1527. SMA wire 1530 is fixedly coupled and electrically connected to actuator frame 1534 via a crimp 1535 and a crimp 1536. Crimps 1525, 1527, 1535 and 1536 may be book crimps as known in the art and may be manufactured as shown in FIG. 17. The folding of SMA wire 1520 and SMA wire 1530 is symmetric. an assembly including a crimp and an SMA wire as above or below may be referred to as "crimp-SMA wire assembly".

Figure 16A:
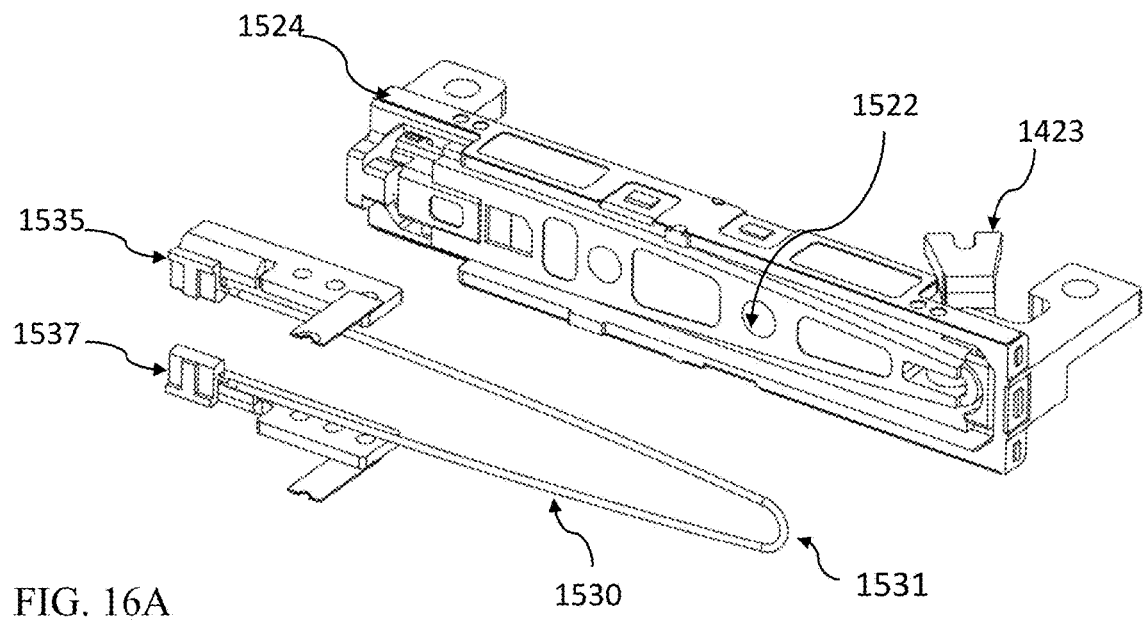
FIG. 16A shows some parts of the ninth SMA wire example disclosed herein in an exploded view.
Figure 16B:
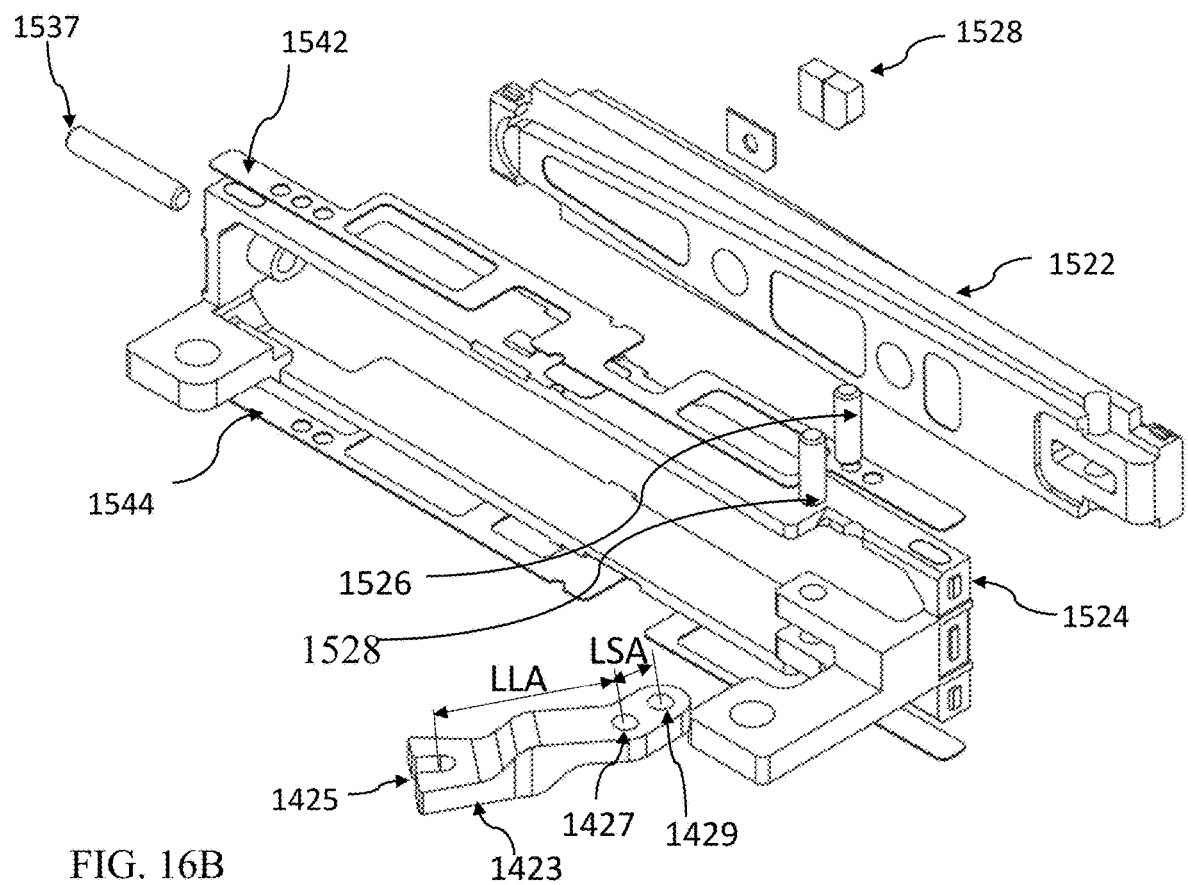
FIG. 16B shows other parts of the ninth SMA wire example in an exploded view.
Figure 16C:
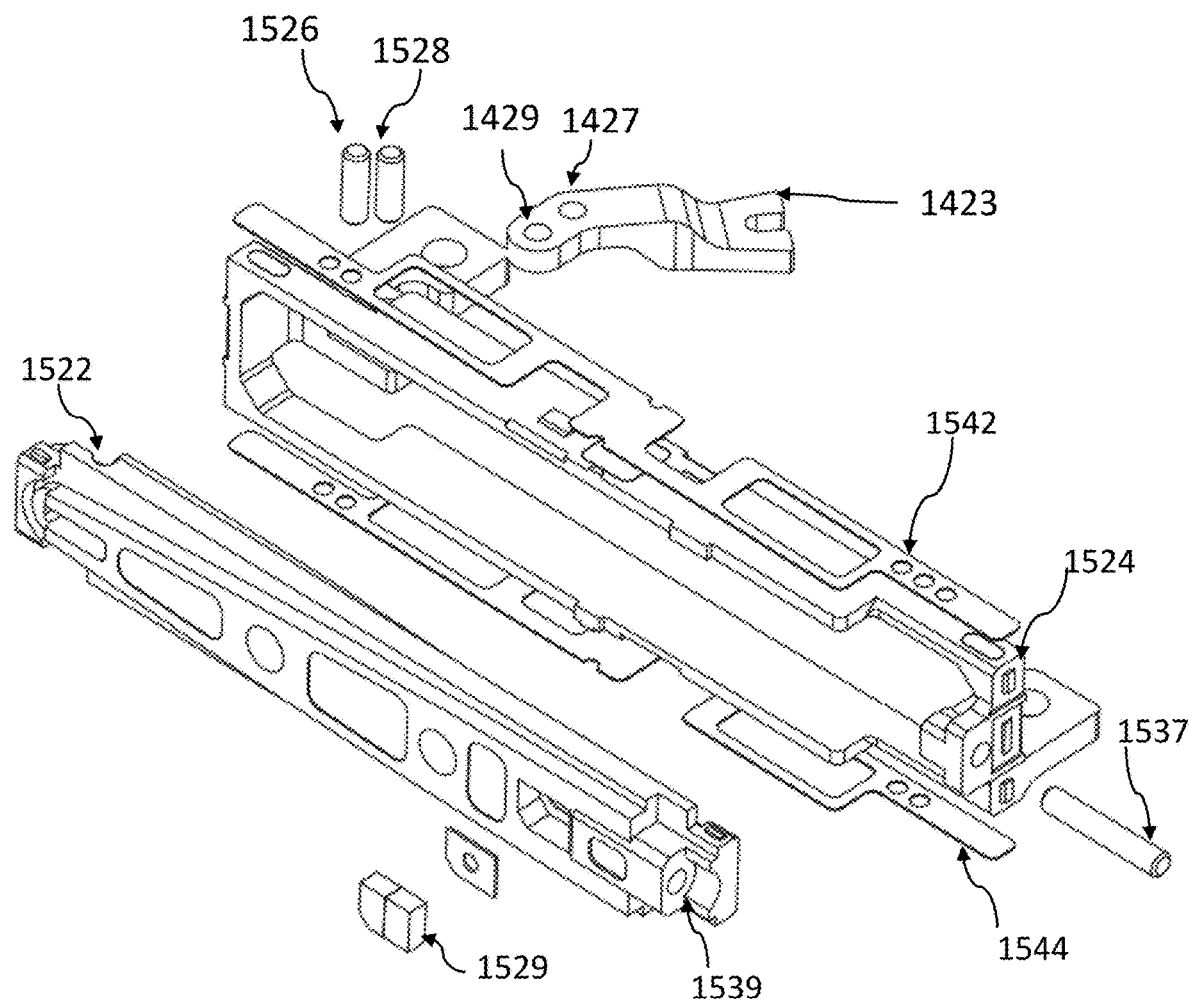
FIG. 16C shows the parts of ninth SMA wire embodiment shown in FIG. 16B in another exploded view.

FIG. 16A shows parts of pop-out actuator 1420 of FIGS. 15A-G in an exploded view. FIG. 16B shows other parts of pop-out actuator 1420 of FIGS. 15A-G in an exploded view. FIG. 16C shows the parts of pop-out actuator 1420 of FIG. 16B in yet another exploded view. Pop-out actuator 1420 further includes a guiding pin 1537, a first insulator 1542, a second insulator 1544, a magnet 1529, a pull rod pin 1526 and a module frame pin 1528. Guiding pin 1537 guides the movement of pull rod 1522 and prevents pull rod 1522 from leaving frame 1524. To achieve this, guiding pin 1537 enters hole 1539 which is part of pull rod 1522. First insulator 1542 and second insulator 1544 electrically insulate SMA wires 1520 and 1530 as well as crimps 1525, 1527, 1535 and 1536 from actuator frame 1524. Magnet 1529 is fixedly coupled to pull rod 1522, i.e. it does not move with respect to the latter. Magnet 1529 interacts with Hall magnet sensor 1508 to measure a position of pull rod 1522 relative to actuator frame 1524. Lever 1423 is connected to pull rod 1522 by pull rod pin 1526 entering lever-rod hole 1429, so that lever 1423 is actuated when pull rod 1522 moves. Lever 1423 is connected to actuator frame 1524 at a pivot point formed where module frame pin 1528 enters lever-frame hole 1427, so that lever 1423 can perform rotational motion around the pivot point. A "short arm" of lever 1423 is formed between lever-frame hole 1427 and lever-rod hole 1429. A "long arm" of lever 1423 is formed between lever-frame hole 1427 and slot 1425. A distance between lever-frame hole 1427 and lever-rod hole 1429 represents a length of lever 1423's short arm named length of short arm and is marked "LSA" in FIG. 16B. A distance between lever-frame hole 1427 and slot 1425 represents a length of lever 1423's long arm named length of long arm and is marked "LLA" in FIG. 16B. A lever ratio, i.e. a ratio of LSA and LLA may be about 1:4 as shown. In other examples, a lever ratio may be 1:10-1:2.

The two ends of top SMA wire 1520 are fixedly coupled and electrically connected to first right contact crimp 1525 and to second right contact crimp 1527. For example, with respect to an image sensor included in the pop-out camera, actuator frame 1524 does not move, but pull rod 1522 does move. Arrow 1431 indicates the direction of the linear movement of pull rod 1522, which is parallel to a symmetry axis of pop-out actuator 1420. For example, pull rod 1522's linear movement is parallel to the y-axis shown in FIGS. 14C-D. Here, this is referred to as a "third antagonistic SMA wire actuator using two SMA wires".

TABLE 2

| Dimension | Range | Preferred range | Details |
|---|---|---|---|
| W | 1-10 | 2-4 | Actuator width |
| H | 2-15 | 5-9 | Actuator height |
| L | 10-50 | 20-40 | Actuator length |

TABLE 2-continued

| Dimension | Range | Preferred range | Details |
|---|---|---|---|
| A | 1-5 | 2-4 | Distance actuator margin – Center of lever |
| R | 2-10 | 4-8 | Length of lever |
| S | 1-5 | 2-4 | Pop-out stroke of lever |

FIG. 17 describes a process numbered 1700 disclosed herein to manufacture a book crimp such as crimp 1525, 1527, 1535 or 1536 that couples (or connects) a SMA wire mechanically and/or electrically to a contact. FIGS. 18A-M show the state of a crimp after various process stages. The process is beneficial as it allows for manufacturing a SMA crimp with a very small size or volume, i.e. a SMA crimp having a small W, H and L such as defined in FIGS. 18L-M, and still providing a strong mechanical connection between a SMA wire such as SMA wire 1520 and a mechanical (and/or electrical) contact. A strong mechanical connection may be characterized by maintaining a high stress force such as e.g. larger than 500 MPa (32 egapascal) without a wire slipping from the crimp.

Figure 18A:
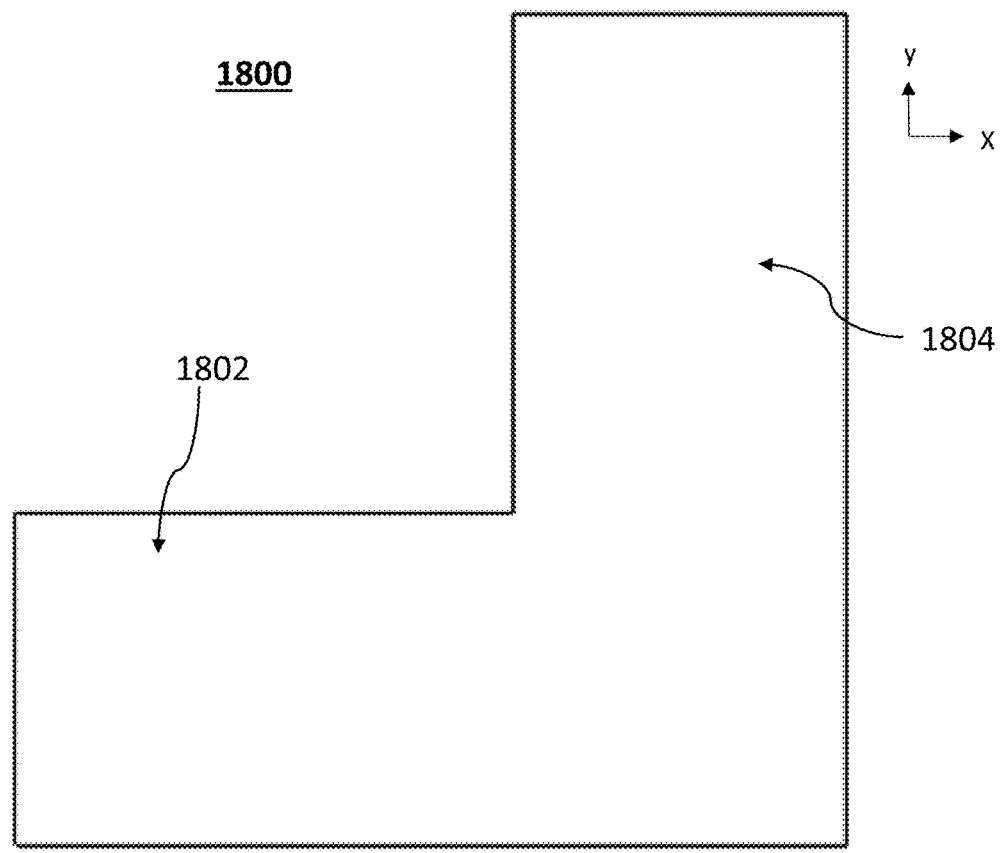
FIG. 18A shows a metal plate used for starting the process of FIG. 17 in a top view.
Figure 18B:
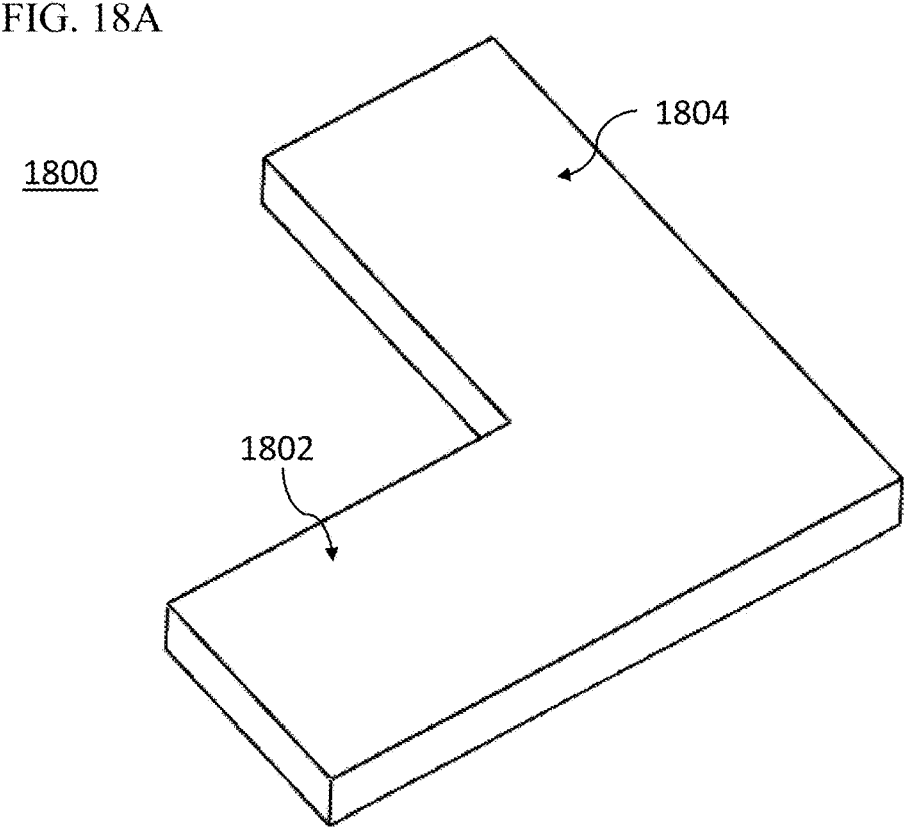
FIG. 18B shows the metal plate of FIG. 18A in a perspective view.

In a first step 1702, a suitable metal plate is provided. FIG. 18A shows exemplary a suitable metal plate 1800 in a top view. FIG. 18B shows metal plate 1800 in a perspective view. Metal plate 1800 has a first region 1802 and a second region 1804, so that metal plate 1800 forms a "L-shape". Metal plate 1800 may e.g. be made of brass. First region 1802 represents the actual crimp area where a SM wire such as 1520 is to be confined, wherein second region 1804 represents an area required as mechanical and electrical anchor (or connectivity) area.

Figure 18C:
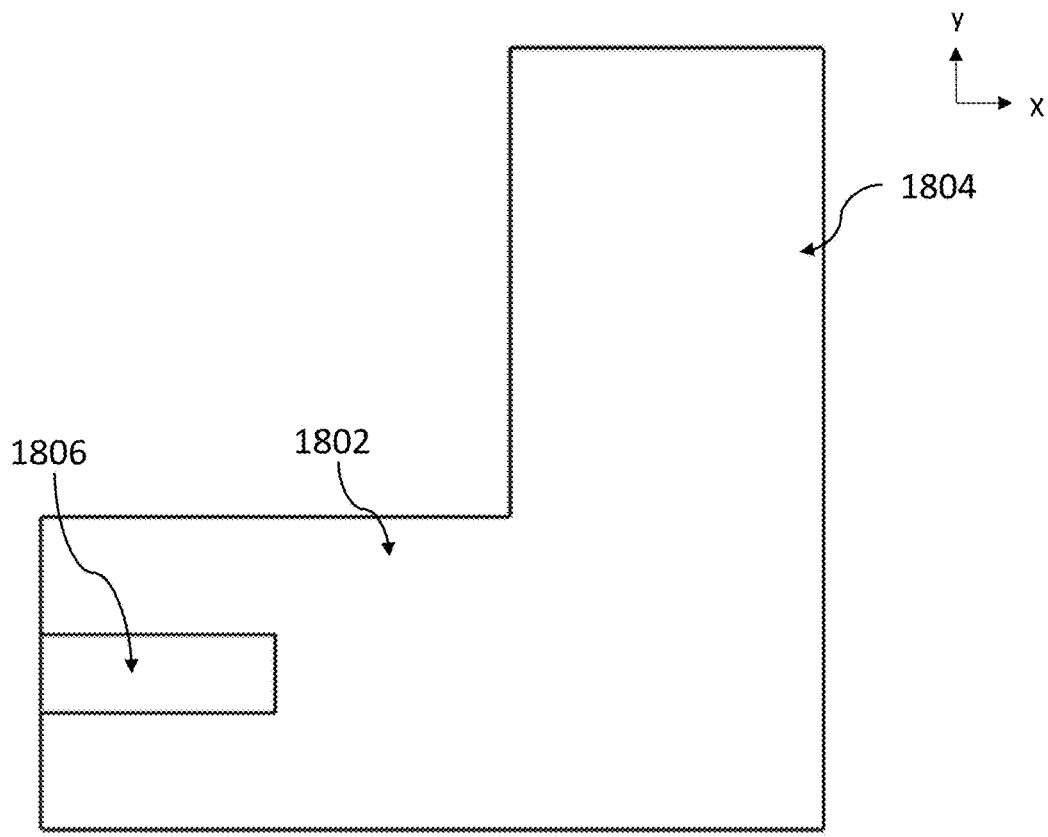
FIG. 18C shows an exemplary first indent applied to a metal plate in a top view.
Figure 18D:
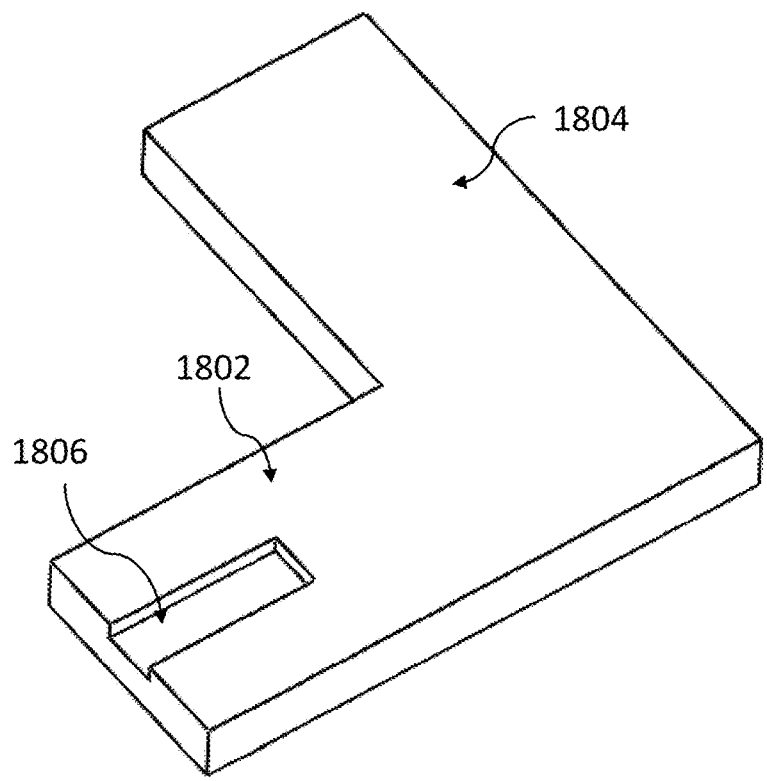
FIG. 18D shows the metal plate including the first indent in a perspective view.

In a second step 1704, a first indent is formed. FIG. 18C shows exemplary a first indent 1806 formed in metal plate 1800 in a top view. FIG. 18D shows metal plate 1800 including first indent 1806 in a perspective view. First indent 1806 is exemplarily formed in first region 1802 of metal plate 1800. For example, first indent 1806 may be rectangular. A stamp having a rectangular shape may be used for forming first indent 1806.

Figure 18E:
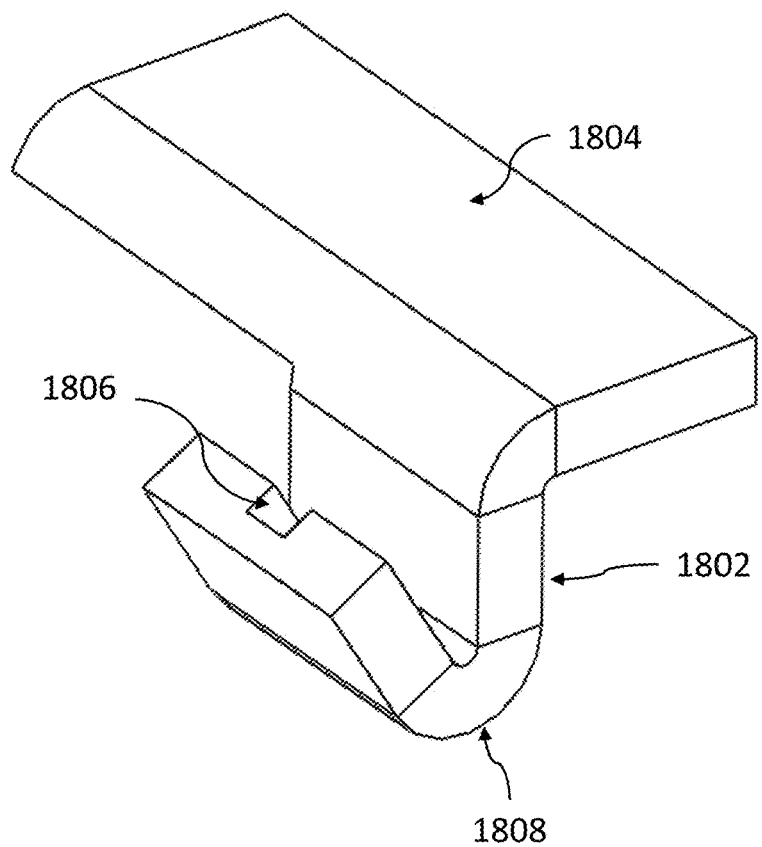
FIG. 18E shows the metal plate in bent form in a top view.
Figure 18F:
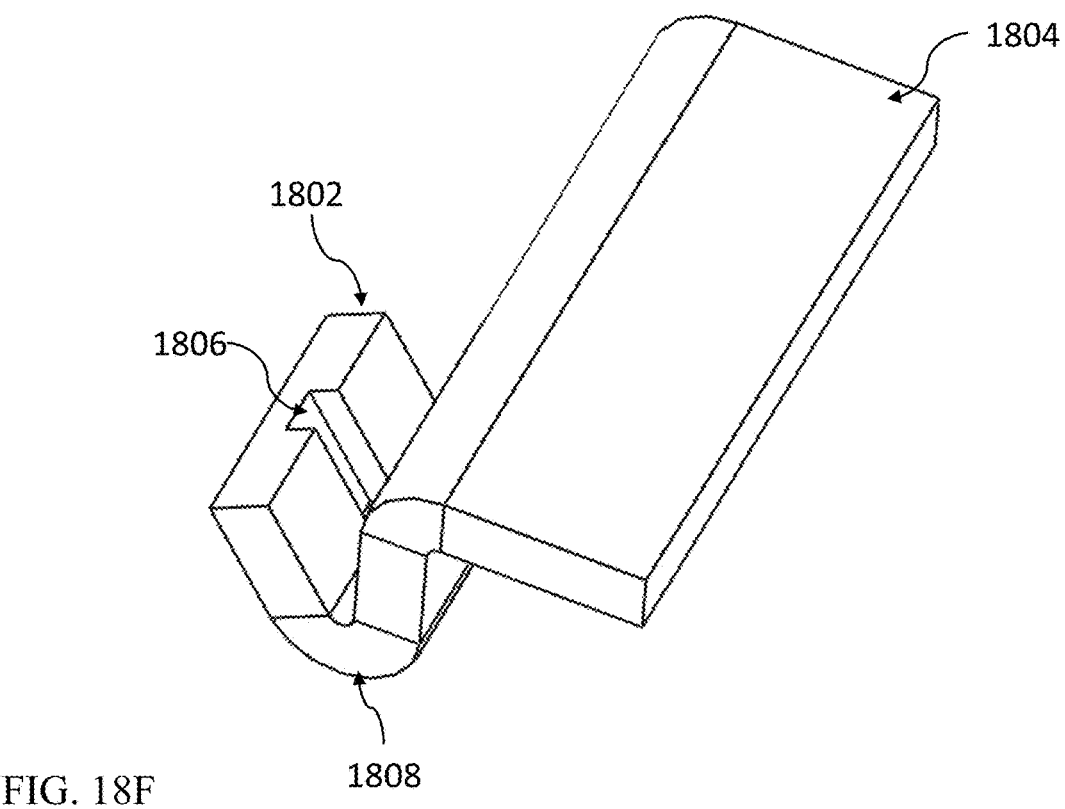
FIG. 18F shows the metal plate in bent form in a perspective view.

In a third step 1706, metal plate 1800 is bent. FIG. 18E shows the bending of step 1706 exemplary in a top view. FIG. 18F shows the bending of step 1706 exemplary in a perspective view. A turning point 1808 is created by the bending. First indent is formed in first region 1802 of metal plate 1800.

Figure 18G:
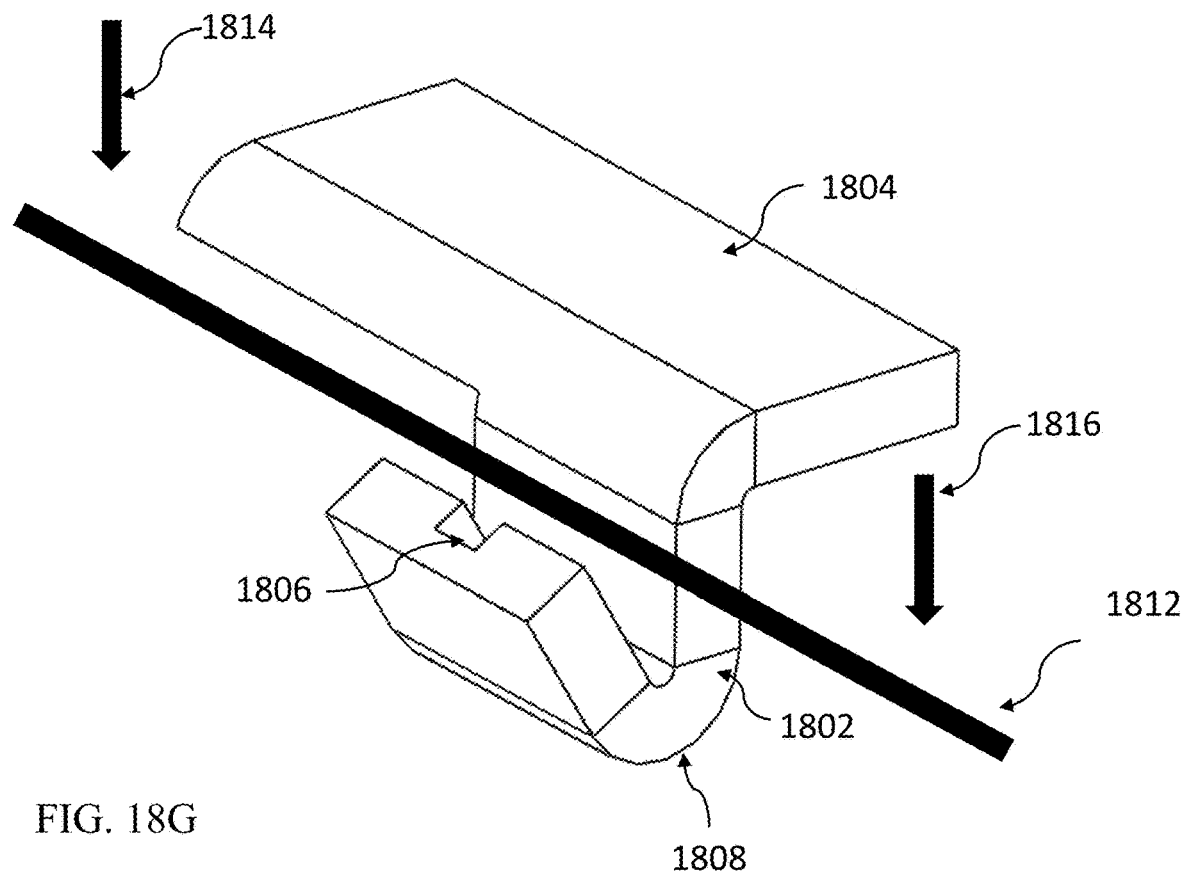
FIG. 18G shows the metal plate with a second indent and an auxiliary wire in a perspective view.
Figure 18H:
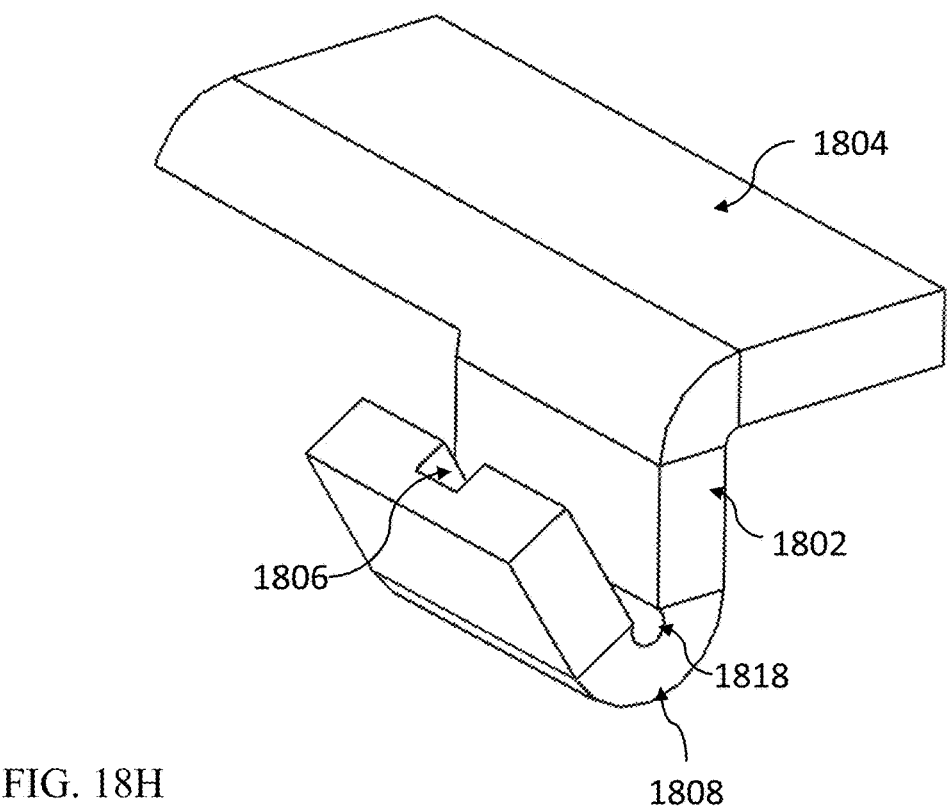
FIG. 18H shows the metal plate including the second indent in a perspective view.

In a fourth step 1708, a second indent is applied. FIG. 18G shows exemplary how the second indent 1818 (FIG. 18H) may be formed. By using an auxiliary wire 1812 in a perspective view. Auxiliary wire 1812 may be made of steel or any other metal that is stronger than the metal that the metal plate 1800 is made of. Auxiliary wire 1812 may be pressed uniformly into a groove formed at turning point 1808 by a movement as indicated by arrow 1814 and arrow 1816. This is done to form the second indent 1818. FIG. 18H shows metal plate 1800 including second indent 1818 in a perspective view. Second indent 1818 is located in first region 1802 of metal plate 1800. Preferably, second indent 1818 may be circular, adapted to be used to include a circular SMA wire such as 1520.

Figure 18I:
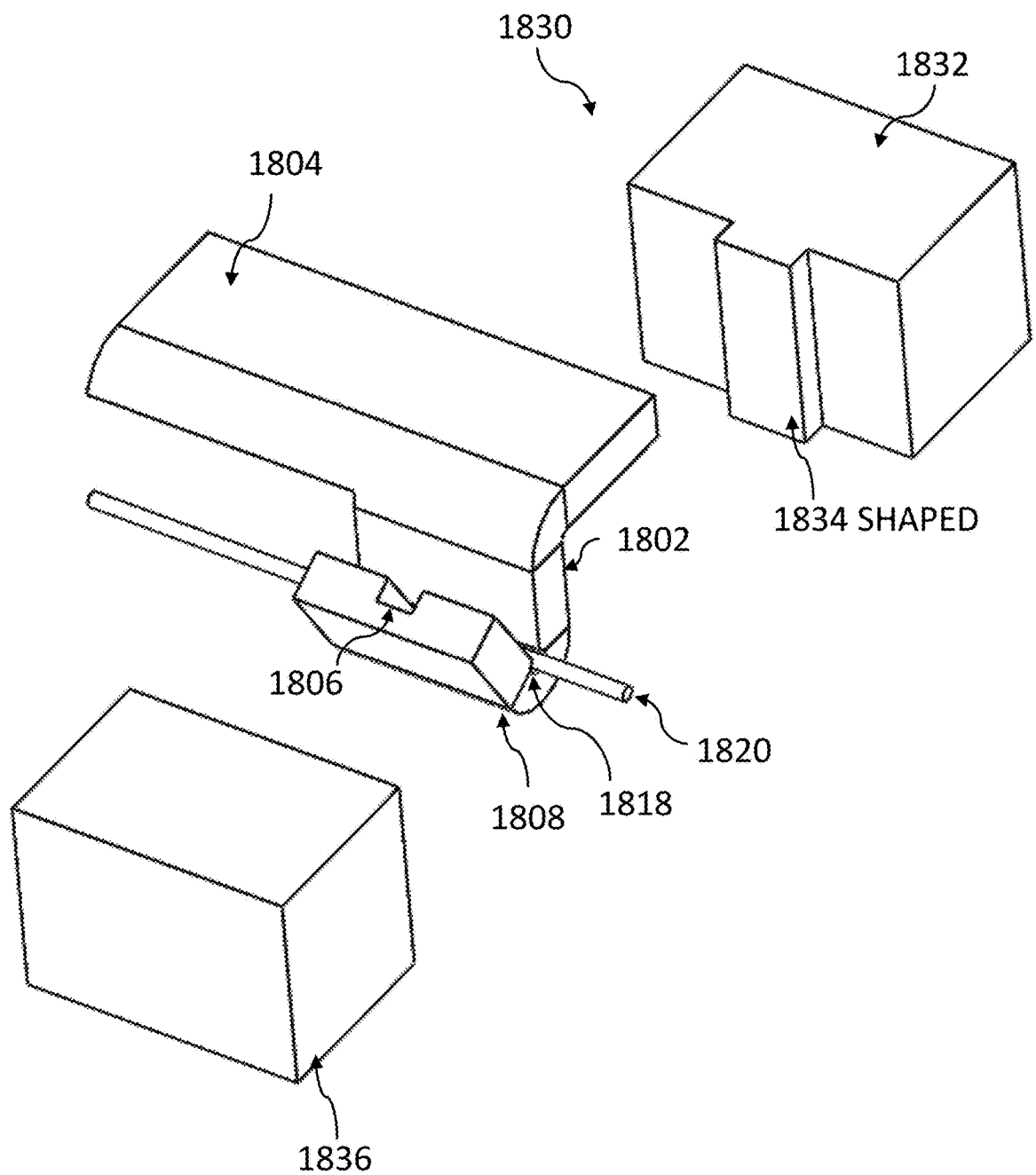
FIG. 18I shows the metal plate of FIG. 18G with an SMA wire introduced into the second indent and with a shaped stamp.
Figure 18J:
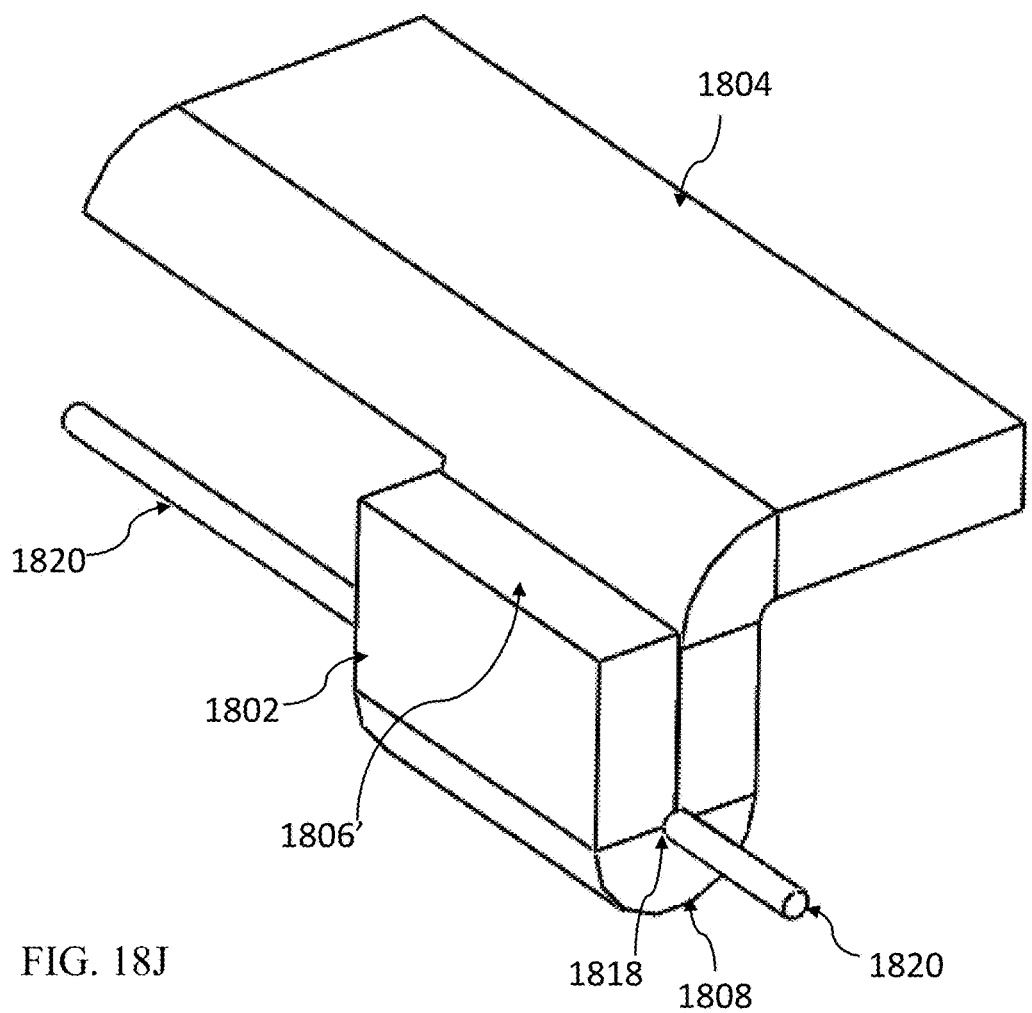
FIG. 18J shows the shaped stamp fixing the SMA wire into the second indent.
Figure 18K:
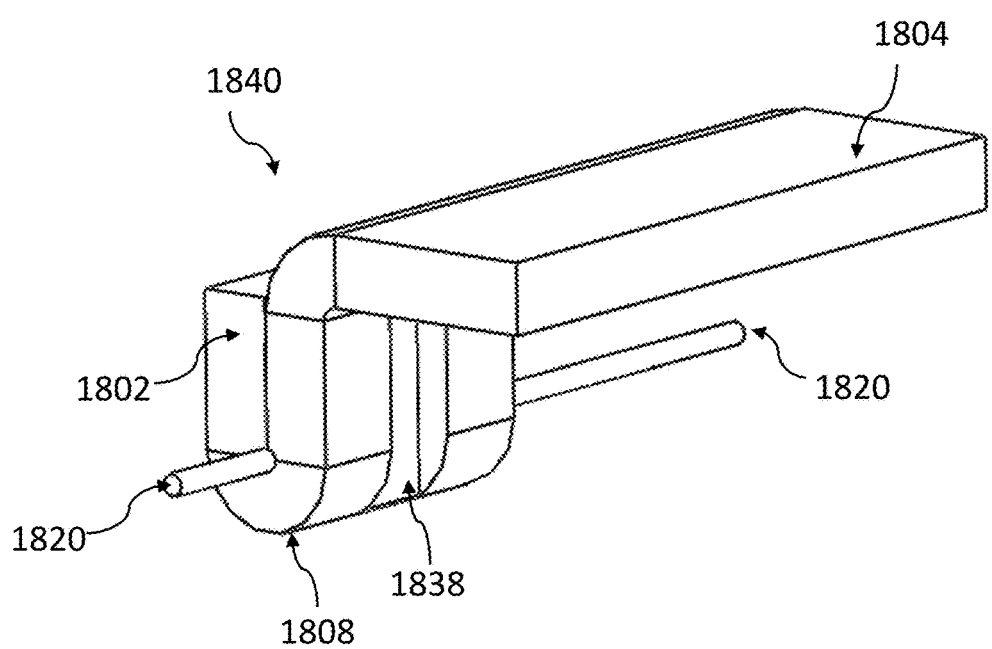
FIG. 18K shows a finished crimp including the SMA wire and a third indent formed by shaped stamp surface.
Figure 18L:
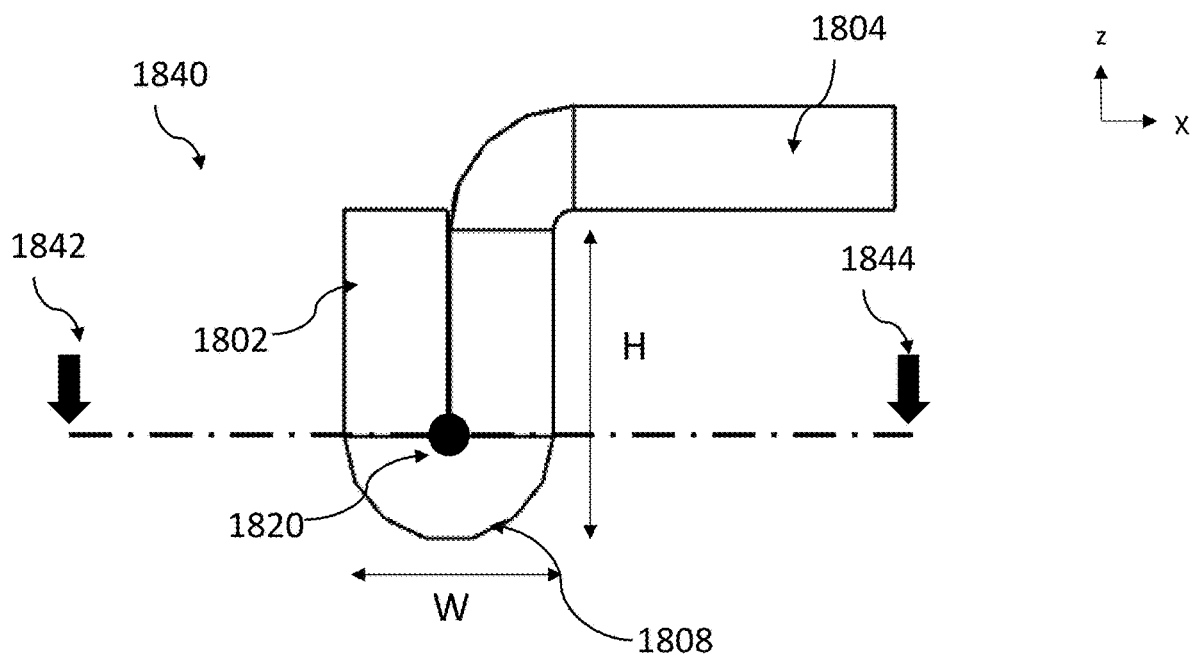
FIG. 18L shows the finished crimp including the SMA wire in a side view.
Figure 18M:
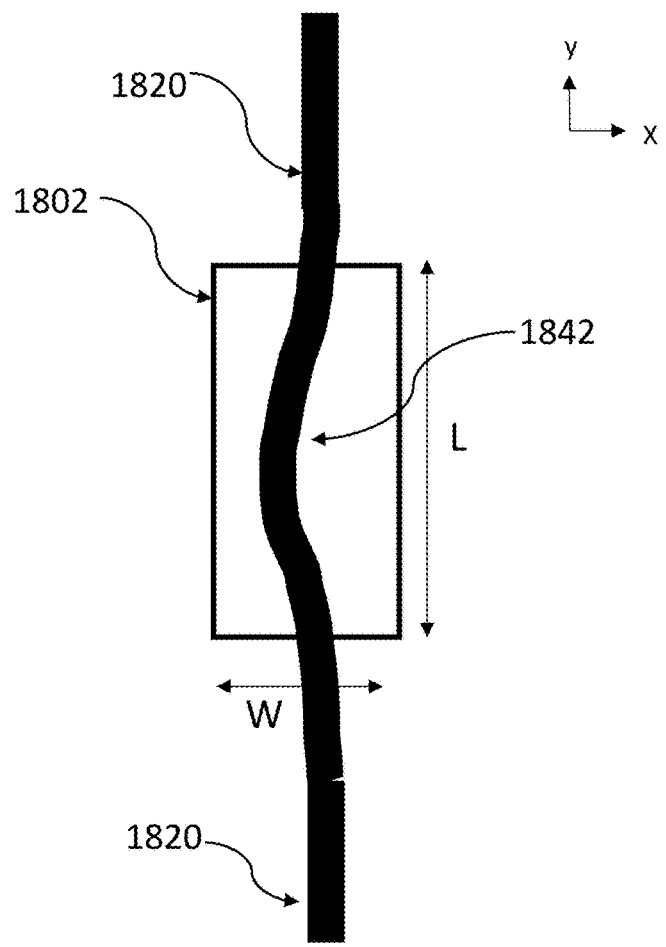
FIG. 18M shows the finished crimp in a cross-sectional view.

In a fifth step 1712, a SMA wire is fixed and a crimp formed. As a first substep and as shown in FIG. 18I, an SMA wire 1820 is introduced into second indent 1818 and a shaped stamp 1830 is provided. "Shaped" refers here to the fact that stamp 1830 does not have a rectangular shape, but shaped stamp 1830 includes a first part 1832 including a shaped stamp surface 1834 and a second part 1836. As a second substep and as shown in FIG. 18J, shaped stamp 1830 fixes SMA wire 1820 into second indent 1818 by applying a pressure onto second region 1802. By the pressure, first indent 1806 disappears, as indicated by 1806'. As shown in FIG. 18K showing finished crimp 1840 including SMA wire 1820, a third indent 1838 is formed by shaped stamp surface 1834. FIG. 18L shows finished crimp 1840 including SMA wire 1820 in a side view. Arrows 1842 and 1844 indicate a cut surface for providing a cross-sectional view as shown in FIG. 18M. A width ("W") and a height ("H") of crimp 1840 is indicated. FIG. 18M shows crimp 1840 in a cross-sectional view as indicated by arrows 1842 and 1844. A length ("L") of crimp 1840 is indicated. L may be in the range L=0.5-10 mm (preferably L=1.5-3.0 mm), W may be in the range W=0.25-7.5 mm (preferably W=0.5-2.0 mm), H may be in the range H=0.25-7.5 mm (preferably W=0.5-2.0 mm). It is visible that by applying first indent 1806 and using shaped stamp 1830, an arc (or wave) shape 1842 is imposed on SMA wire 1820. A center 1104 of lever 1023 with respect to the x-axis is shown. FIG. 11B exemplarily shows dimensions of SMA actuator 1020 in a side view. Table 2 shows values and ranges of the dimensions of pop-out actuator 1420 (given in mm). For the definition of A, R and S it is referred to FIG. 11A.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

Furthermore, for the sake of clarity the term "substantially" is used herein to imply the possibility of variations in values within an acceptable range. According to one example, the term "substantially" used herein should be interpreted to imply possible variation of up to 5% over or under any specified value. According to another example, the term "substantially" used herein should be interpreted to imply possible variation of up to 2.5% over or under any specified value. According to a further example, the term "substantially" used herein should be interpreted to imply possible variation of up to 1% over or under any specified value.

All patents and patent applications mentioned in this specification are herein incorporated in their entirety by reference into the specification, to the same extent as if each individual patent or patent application was specifically and individually indicated to be incorporated herein by reference. In addition, citation or identification of any reference in this application shall not be construed as an admission that such reference is available as prior art to the present disclosure.

While this disclosure has been described in terms of certain examples and generally associated methods, alterations and permutations of the examples and methods will be apparent to those skilled in the art. The disclosure is to be understood as not limited by the specific examples described herein, but only by the scope of the appended claims.

What is claimed is:
1. A camera, comprising:
a lens including a plurality of lens elements separated by air-gaps therebetween;
an image sensor;
a pop-out mechanism configured to control at least one air-gap between the lens elements or between a lens element and the image sensor, to bring the camera to an operative pop-out state and to a collapsed state; and a shape-memory alloy (SMA) actuator that includes two antagonistic SMA springs, each antagonistic SMA spring attached to two pins, wherein the two antagonistic SMA springs have the same thermal characteristics, wherein the SMA actuator is configured to move the pop-out mechanism to bring the camera to the operative pop-out state and to the collapsed state using the at least two antagonistic SMA springs and the attached pins by alternately activating the at least two antagonistic SMA springs.

2. The camera of claim 1, wherein the camera further includes a locking mechanism, wherein the locking mechanism is configured to prevent a movement of the pop-out mechanism when the camera is in the pop-out state or in the collapsed state.

3. The camera of claim 2, wherein the locking mechanism is a mechanical locking mechanism.

4. The camera of claim 3, wherein the mechanical locking mechanism includes a first dent, a second dent, and a circular margin, wherein the circular margin is configured to enter the first dent in the pop-out state and to enter the second dent in the collapsed state to prevent the movement of the pop-out mechanism.

5. The camera of claim 4, wherein the circular margin is further configured to perform a rotational movement around a pivot point.

6. The camera of claim 2, wherein the locking mechanism is a magnetic locking mechanism.

7. The camera of claim 6, wherein the magnetic locking mechanism includes at least one magnetic locker, the at least one magnetic locker including a magnet and a yoke.

8. The camera of claim 6, wherein the magnetic locking mechanism includes at least one magnetic locker, the at least one magnetic locker including two magnets.

9. The camera of claim 1, wherein the two antagonistic SMA springs have an SMA wire diameter (DW) in the range of 0.1-0.2 mm.

10. The camera of claim 1, wherein the two antagonistic SMA springs are made of Nitinol.

11. The camera of claim 1, wherein the two antagonistic SMA springs are attached to a heat sink.

12. The camera of claim 1, wherein the pop-out mechanism translates a first linear motion into a second linear motion, wherein the first linear motion is oriented perpendicular to a lens optical axis, and wherein the second linear motion is oriented parallel to the lens optical axis.

13. The camera of claim 1, wherein the SMA actuator has a width W, a height H and a length L, wherein W=1-10 mm, wherein H=2-15 mm and wherein L=10-50 mm.

14. The camera of claim 1, wherein the SMA actuator has a width W, a height H and a length L, wherein W=2-4 mm, wherein H=5-9 mm and wherein L=20-40 mm.

15. The camera of claim 1, wherein the camera is included in a multi-camera together with at least one additional camera.

16. The camera of claim 1, wherein the camera is included in a smartphone.

* * * * *